(12) United States Patent
Hudak

(10) Patent No.: US 12,362,387 B2
(45) Date of Patent: *Jul. 15, 2025

(54) CARBON FIBER BATTERY ELECTRODES WITH IONIC LIQUID AND GEL ELECTROLYTES

(71) Applicant: The MITRE Corporation, McLean, VA (US)

(72) Inventor: Nicholas Hudak, Washington, DC (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,725

(22) Filed: Apr. 4, 2024

(65) Prior Publication Data
US 2024/0363897 A1    Oct. 31, 2024

Related U.S. Application Data

(63) Continuation of application No. 17/894,635, filed on Aug. 24, 2022, now Pat. No. 11,978,855, which is a
(Continued)

(51) Int. Cl.
| | |
|---|---|
| *H01M 10/0565* | (2010.01) |
| *H01M 4/587* | (2010.01) |
| *H01M 10/0525* | (2010.01) |
| *H01M 10/058* | (2010.01) |
| *H01M 50/116* | (2021.01) |
| *H01M 50/121* | (2021.01) |

(Continued)

(52) U.S. Cl.
CPC ....... *H01M 10/0565* (2013.01); *H01M 4/587* (2013.01); *H01M 10/0525* (2013.01); *H01M 10/058* (2013.01); *H01M 50/116* (2021.01); *H01M 50/121* (2021.01); *H01M 50/119* (2021.01); *H01M 50/122* (2021.01); *H01M 50/124* (2021.01); *H01M 2220/30* (2013.01); *H01M 2300/0082* (2013.01)

(58) Field of Classification Search
CPC .......... H01M 10/0565; H01M 50/121; H01M 50/116; H01M 4/587
See application file for complete search history.

(56) References Cited

U.S. PATENT DOCUMENTS

| | | | |
|---|---|---|---|
| 5,965,054 A | 10/1999 | McEwen et al. | |
| 11,456,483 B2 * | 9/2022 | Hudak | ................ H01M 4/133 |

(Continued)

OTHER PUBLICATIONS

Lopez, J., et al., "Metal Sulfide/Carbon Composite fibers as Anode Materials for Lithium Ion Batteries," *ECS Transactions* 85(13):275-284, The Electrochemical Society, United States (Jun. 2018).

(Continued)

*Primary Examiner* — Jane J Rhee
(74) *Attorney, Agent, or Firm* — Sterne, Kessler, Goldstein & Fox P.L.L.C.

(57) ABSTRACT

The present invention is directed to liquid monomer mixtures that comprise at least one metal salt, at least one ionic liquid, at least one monomer, and at least one polymer initiator. The present invention is also directed to methods of making gel polymer electrolytes from the liquid monomer mixtures and methods of using the gel polymer electrolytes in batteries and other electrochemical technologies.

20 Claims, 21 Drawing Sheets

Related U.S. Application Data continuation of application No. 16/291,435, filed on Mar. 4, 2019, now Pat. No. 11,456,483.

(51) Int. Cl.
*H01M 50/119* (2021.01)
*H01M 50/122* (2021.01)
*H01M 50/124* (2021.01)

(56) References Cited

U.S. PATENT DOCUMENTS

| | | |
|---|---|---|
| 11,978,855 B2* | 5/2024 | Hudak ................ H01M 4/583 |
| 2005/0053843 A1 | 3/2005 | Takahashi |
| 2006/0280948 A1 | 12/2006 | Moreshead |
| 2013/0288138 A1 | 10/2013 | Tikhonov et al. |
| 2016/0149212 A1 | 5/2016 | Zaghib et al. |
| 2017/0214083 A1 | 7/2017 | Darolles et al. |
| 2017/0288179 A1 | 10/2017 | Keates et al. |
| 2018/0055175 A1 | 3/2018 | Rho et al. |
| 2018/0063968 A1 | 3/2018 | Holec et al. |
| 2018/0184727 A1 | 7/2018 | Petruschka et al. |
| 2018/0260072 A1 | 9/2018 | Franklin et al. |
| 2019/0033602 A1 | 1/2019 | Lee et al. |
| 2019/0157683 A1 | 5/2019 | Salomon et al. |
| 2020/0287240 A1 | 9/2020 | Hudak |
| 2022/0407107 A1 | 12/2022 | Hudak |

OTHER PUBLICATIONS

Lopez, J., et al., "Mixed Organic/Ionic Liquid Electrolytes Compatible with Forcespun Carbon Microfiber Electrodes in Lithium Ion Batteries," *ECS Meeting Abstracts*: Abstract MA2018-01 414, Tuesday Poster Session, May 15, 2018, The Electrochemical Society, United States (Apr. 2018).

Villarreal, J., et al., "The use of Mixed Organic/Ionic Liquid Electrolytes with Forcespun Metal Oxides/Carbon Microfiber Electrodes in Lithium Ion Batteries," *ESC Transactions* 85(13):387-394, The Electrochemical Society, United States (Jun. 2018).

Snyder et al., "Electrochemical and Mechanical Behavior in Mechanically Robust Solid Polymer Electrolytes for Use in Multifunctional Structural Batteries," Chemistry of Materials, vol. 19, No. 15, Jun. 22, 2007; pp. 3793-3801.

* cited by examiner

CARBON FIBER BATTERY ELECTRODES WITH IONIC LIQUID AND GEL ELECTROLYTES

CROSS-REFERENCE TO RELATED APPLICATIONS

This application is a continuation of U.S. application Ser. No. 17/894,635, filed Aug. 24, 2022, which is a continuation of U.S. application Ser. No. 16/291,435, filed Mar. 4, 2019, which is now U.S. Pat. No. 11,456,483, the contents of which are incorporated herein by reference in its entirety.

BACKGROUND OF THE INVENTION

Field of the Invention

The present invention is directed to liquid monomer mixtures that comprise at least one metal salt, at least one ionic liquid, at least one monomer, and at least one polymer initiator. The present invention is also directed to methods of making gel polymer electrolytes from the liquid monomer mixtures and methods of using the gel polymer electrolytes in batteries and other electrochemical technologies.

Background of the Invention

Lithium-ion batteries (LIBs) are extensively used in various applications due to their long cycle life, low maintenance, high energy density, and low self-discharge. However LIBs suffer from several drawbacks including safety, cost, and low energy density. In particular conventional LIBs using organic liquid electrolytes possess drawbacks such as flammability, leakage, and toxicity which hinder their application. In this regard, replacing organic liquid electrolytes with ionic liquid gel (also called an "ionogel") electrolytes seems to be a solution for preventing these drawbacks. Compared with organic liquid electrolytes, ionic liquid gel electrolytes have outstanding advantages in terms of mechanical strength, thermal tolerance, and electrochemical stability. Furthermore, flexible batteries made with gel electrolytes can perform more reliably than batteries made with liquid electrolytes.

There is a need to produce a gel polymer electrolyte that can be used with a carbon fiber electrode to produce thin and flexible electrochemical cells. There is also a need to produce thin and flexible electrochemical cells that are wearable and can be used in low-power applications.

BRIEF SUMMARY OF THE INVENTION

The present invention describes an electrochemical cell, comprising:
(a) a positive electrode;
(b) a negative electrode; and
(c) an electrolyte between and/or infiltrating the (a) positive electrode and (b) the negative electrode comprising:
  (i) at least one metal salt; and
  (ii) at least one ionic liquid;
wherein at least one electrode comprises carbon fiber, and wherein the diameter of the carbon fiber is between about 2 µm and about 22 µm.

In some embodiments, the electrolyte in the electrochemical cell further comprises:
(iii) at least one polymerized monomer.

In some embodiments, the at least one metal salt in the electrochemical cell comprises an anion selected from the group consisting of bis(trifluoromethane sulfonyl)imide ($TFSI^-$), trifluoromethane sulfonate ($TF^-$), bis(fluorosulfonyl) imide ($FSI^-$), tetrafluorophosphate ($BF_4^-$), hexafluorophosphate ($PF_6^-$), bis(pentafluoroethane sulfonyl)imide ($BETI^-$), 4,5-dicyano-2-trifluoromethanoimidazole ($DCMI^-$), [fluoro (nonafluorobutane)sulfonyl]imide ($FNF^-$), perchlorate ($ClO_4^-$), sulfate ($SO_4^-$), and nitrate ($NO_3^-$).

In some embodiments, the at least one metal salt in the electrochemical cell comprises a metal ion selected from the group consisting of $Li^+$, $Na^+$, $K^+$, $Mg^{2+}$, and $Al^{3+}$.

In some embodiments, the at least one metal salt in the electrochemical cell is selected from the group consisting of LiTFSI, LiTF, NaTFSI, NaFSI, KTFSI, KBETI, and $Mg(TFSI)_2$.

In some embodiments, the at least one ionic liquid in the electrochemical cell comprises a cation selected from the group consisting of imidazolium, pyrrolidinium, pyridinium, phosphonium, ammonium, and sulfonium.

In some embodiments, the at least one ionic liquid in the electrochemical cell comprises an anion selected from the group consisting of tosylate ($-SO_2C_6H_4CH_3$), methanesulfonate ($-OSO_2CH_3$), bis(trifluoromethylsulfonyl) imide ($TFSI^-$), tetrafluorophosphate ($BF_4^-$), hexafluorophosphate ($PF_6^-$), halide, triflate ($TF^-$), [fluoro(nonafluorobutane)sulfonyl]imide ($FNF^-$), chlorate ($ClO_4^-$), and sulfate ($SO_4^-$).

In some embodiments, the at least one ionic liquid in the electrochemical cell comprises 1-ethyl-3-methylimidazolium bis(trifluoromethanesulfonyl)imide or 1-ethyl-3-methylimidazolium bis(fluorosulfonyl) imide.

In some embodiments, the at least one polymerized monomer in the electrochemical cell is a polymerized acrylic monomer or a polymerized epoxide monomer.

In some embodiments, the weight averaged molecular weight of the at least one monomer before polymerizing in the electrochemical cell is between about 50 g/mol and about 10,000 g/mol.

In some embodiments, the electrolyte further comprises:
(iv) at least one polymer initiator.

In some embodiments, the polymer initiator in the electrochemical cell is a thermal initiator selected from the group consisting of tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy) butane, 1,1-bis(tert-butylperoxy) cyclohexane, 2,5-bi (tert-butylperoxy)-2,5-dimethylhexane, 2,5-bi (tert-butylperoxy)2,5-dimethylhexane, 2,5-bi (tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

In some embodiments, the positive electrode in the electrochemical cell comprises lithium, magnesium, aluminum, zinc, chromium, iron, nickel, tin, lead, copper, silver, palladium, mercury, platinum, gold, a metal alloy, a metal oxide, graphite, carbon fiber, carbon powder, carbon black, acetylene black, or a combination thereof.

In some embodiments, the positive electrode in the electrochemical cell comprises graphite.

In some embodiments, the negative electrode in the electrochemical cell comprises lithium, magnesium, aluminum, zinc, chromium, iron, nickel, tin, lead, copper, silver, palladium, mercury, platinum, gold, silicon, a metal alloy, a metal oxide, graphite, carbon fiber, carbon powder, carbon black, acetylene black, or a combination thereof.

In some embodiments, the negative electrode in the electrochemical cell comprises carbon fiber.

In some embodiments, the electrochemical cell further comprises:
 (d) a separator between the (a) positive electrode and (b) negative electrode.

In some embodiments, the separator in the electrochemical cell comprises cotton, a synthetic fiber, linen, a polymer fiber, a fiberglass fiber, a microporous polymer material, or a combination thereof.

In some embodiments, the positive electrode in the electrochemical cell comprises graphite, the negative electrode comprises carbon fiber, and the electrolyte comprises the metal salt LiTFSI, the ionic liquid 1-ethyl-3-methylimidazolium bis(trifluoromethanesulfonyl) imide, and the monomer tetraethylene glycol dimethacrylate.

In some embodiments, the positive electrode in the electrochemical cell comprises graphite, the negative electrode comprises carbon fiber, and the electrolyte comprises the metal salt LiTFSI, the ionic liquid 1-ethyl-3-methylimidazolium bis(trifluoromethanesulfonyl) imide, the monomer tetraethylene glycol dimethacrylate, and the monomer methoxy polyethylene glycol methacrylate.

The present invention describes a method of preparing an electrolyte comprising:
 (a) admixing at least one metal salt, at least one ionic liquid, at least one monomer, and at least one polymer initiator; and
 (b) heating the admixture of (a) or subjecting the admixture of (a) to ultraviolet light.

In some embodiments, the method of preparing an electrolyte further comprises:
 (c) cutting the mixture formed in (b) to form a shape.

In one embodiment, the shape is a solid disc. In another embodiment, the shape is a square, a rectangle or a strip.

The present invention also describes an electrochemical device comprising:
 (a) an electrochemical cell comprising a positive electrode, a negative electrode, and an electrolyte between the positive electrode and the negative electrode, wherein at least one electrode comprises carbon fiber, wherein the diameter of the carbon fiber is between about 2 µm and about 22 µm, and wherein the electrolyte comprises:
  (i) at least one metal salt; and
  (ii) at least one ionic liquid;
 (b) at least one electronic device; and
 (c) at least one wire connecting the electrochemical cell and the electronic device.

In some embodiments, electrochemical cell of the electrochemical device further comprises:
 (iii) at least one polymerized monomer.

In some embodiments, the electrochemical device is flexible.

In some embodiments, the electrochemical device can be worn about an appendage of a wearer. In some embodiments, the electrochemical device is a wrist watch, health monitor, or media player that have embedded therein the electrochemical cell.

In some embodiments, the electrochemical device is goggles or glasses that have embedded therein the electrochemical cell. Such goggles or glasses may further comprise at least one of a display unit including at least one of an augmented reality display, a fog prevention unit, a communication module, a GPS module, a sensor module, and a camera unit.

In some embodiments, the electrochemical device is a flexible laptop computer, tablet computer, or smart phone. In some embodiments, the electrochemical device comprises flexible components such as a flexible display, flexible housing, flexible printed circuit as well as the flexible electrochemical cell.

In some embodiments, the electronic device of the electrochemical device is a health-related sensor, a communications device, an environmental sensor, an electronic display, an electrochromic device, or a combination thereof.

In some embodiments, the electronic device of the electrochemical device is a strain sensor, a pressure sensor, a light sensor, an external temperature sensor, a body-temperature sensor, a sweat sensor, a vibration sensor, an antenna, a light emitting diode, a liquid crystal display, a quantum dot display, an electrochromic device, a cooling device, a heating device, a supercapacitor, or a combination thereof.

In some embodiments, the electrochemical device is embedded, placed, or otherwise incorporated into an apparel product. The apparel product may be a jacket, shirt, pant leg of shorts or pants, in a shirt, jacket, coat, dress, hat, gloves, socks, or shoes, or any sports apparel such as running shoes. In some embodiments, the apparel product is a bag such as a handbag, a hiking bag, a backpack, a briefcase, and a bookbag. In some embodiments, the apparel product further comprises an electronic device that can sense biometrics and transmit the biometrics to a connected wireless computing device, such as a smart phone, tablet computer, and the like. In some embodiments, the apparel product further comprises an electronic device that heats the apparel product. For example, the electronic device may be a heater in a jacket, in gloves, or in shoes.

In some embodiments, the electrochemical device is embedded, placed, or otherwise incorporated into sports equipment. In some embodiments, the sports equipment is a ball or jersey. In some embodiments, the sports equipment is a golf club; tennis, racketball, squash, pickelball, or paddleball racket; a baseball bat, baseball glove, or ball; a football, football helmet, football jersey, or padding; a basketball or basketball jersey; or a soccer ball or jersey. In some embodiments, the sports equipment further comprises a GPS device, an accelerometer and/or an electronic device that can sense biometrics and transmit data concerning althletic performance to a connected wireless computing device, such as a smart phone, tablet computer, and the like.

In some embodiments, the electrochemical device is implanted into a wearer.

In some embodiments, the electronic device of the electrochemical device is an electrode, a cardiac temperature sensor, an optogenetic light delivery sensor, a biodegradable microsupercapacitor, a biodegradable battery, an energy harvestor, or a combination thereof.

In some embodiments, the electronic device of the electrochemical device is an electrode that monitors electromyography (EMG) data, electrooculography (EOG) data, stimulation, blood pressure, blood-sugar levels, electrolyte levels, metabolite levels, brain activity, muscle activity, electrocardiogramata, biventricular pacing, or a combination thereof.

In some embodiments, the electrochemical device further comprises:

(d) a casing covering the electrochemical cell.

In some embodiments, the casing covering the electrochemical cell comprises a polymer film.

In some embodiments, the polymer film of the casing comprises at least one polymer selected from the group consisting of polypropylene resin, polyurethane resin, silane-terminated polymer, silicone, unsaturated polyester resin, vinyl ester resin, acrylate, polyvinyl acetate, polyvinyl alcohol, polyvinyl ether, ethylene vinyl acetate, ethylene acrylic acid copolymer, polystyrene, polyvinyl chloride, styrene-butadiene rubber, chloroprene rubber, nitrile rubber, butyl rubber, polysulfide, polyethylene, fluorinated hydrocarbon, phenol-formaldehyde resin, liquid crystal polymer, nylon, polyamide, polyimide, polyethylene terephthalate, cellulose, polymethylmethacrylate, polyolefin, polyester, cresol-formaldehyde novolac resin, cresol-formaldehyde epoxy resin, resorcinol-formaldehyde resin, urea-formaldehyde resin, melamine-formaldehyde resin, polybenzimidazole, polyamide-imide, and polysulfone.

In some embodiments, the electrochemical device is integrated into a fabric.

The present invention also describes a gel polymer electrolyte obtained by the method described herein.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention. The following drawings are given by way of illustration only, and thus are not intended to limit the scope of the present invention.

DETAILED DESCRIPTION OF THE INVENTION

Figure 1:
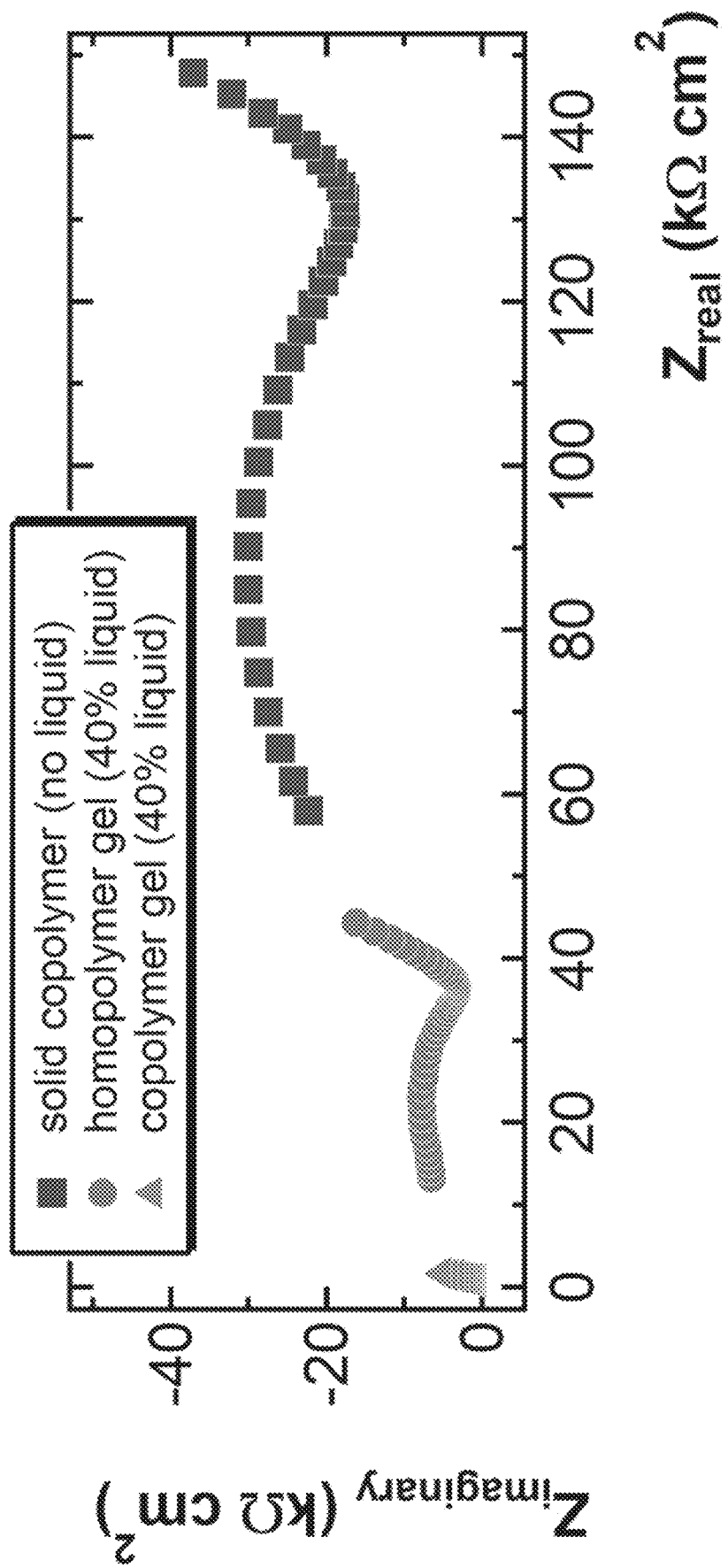
FIG. 1 shows a Nyquist plot of a solid copolymer electrolyte (14 wt % lithium bis(trifluoromethanesulfonyl) imide (LiTFSI), 29 wt % tetraethylene glycol dimethacrylate, and 57 wt % methoxy polyethylene glycol (550) monoacrylate), a 40% liquid homopolymer gel electrolyte (15 wt % LiTFSI, 40 wt % 1-ethyl-3-methylimidazolium bis(trifluoromethanesulfonyl) imide, and 45 wt % tetraethylene glycol dimethacrylate), and a 40% liquid copolymer gel electrolyte (17 wt % LiTFSI, 40 wt % 1-ethyl-3-methylimidazolium bis (trifluoromethanesulfonyl)imide, 14 wt % tetraethylene glycol dimethacrylate, and 27 wt % methoxy polyethylene glycol (550) monoacrylate) collected at 0 V direct current (DC) with 10 mV alternating current (AC) amplitude.
Figure 2:
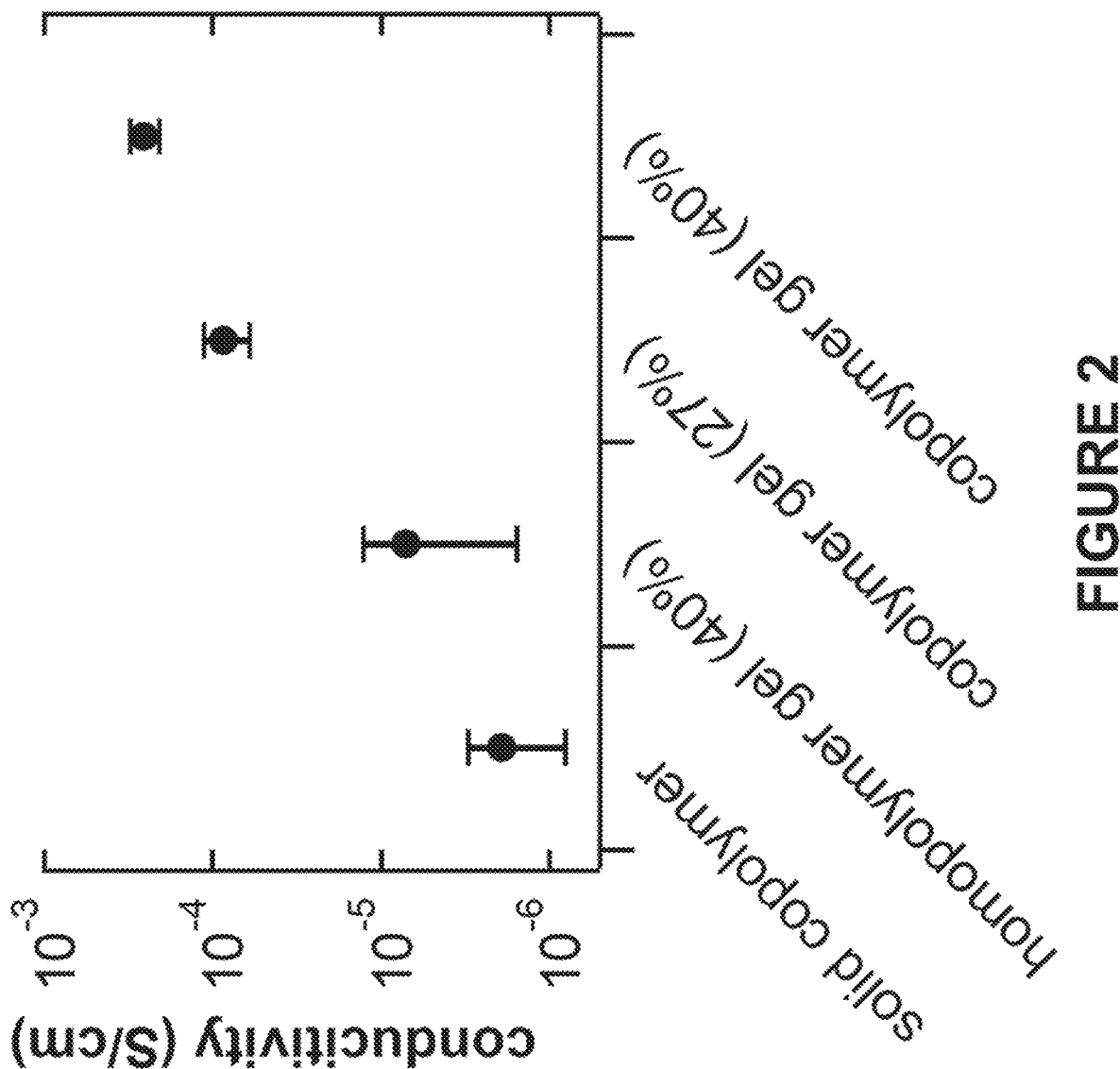
FIG. 2 shows a graph of the conductivity of a solid copolymer electrolyte (14 wt % lithium bis(trifluoromethanesulfonyl) imide (LiTFSI), 29 wt % tetraethylene glycol dimethacrylate, and 57 wt % methoxy polyethylene glycol (550) monoacrylate), a 40% liquid homopolymer gel electrolyte (15 wt % LiTFSI, 40 wt % 1-ethyl-3-methylimidazolium bis(trifluoromethanesulfonyl) imide), a 27% liquid copolymer gel electrolyte (16 wt % LiTFSI, 27 wt % 1-ethyl-3-methylimidazolium bis(trifluoromethanesulfonyl) imide, 15 wt % tetraethylene glycol methacrylate, and 43 wt % methoxy polyethylene glycol (550) monoacrylate), and a 40% liquid copolymer gel electrolyte (17 wt % LiTFSI, 40 wt % 1-ethyl-3-methylimidazolium bis(trifluoromethanesulfonyl)imide, 14 wt % tetraethylene glycol dimethacrylate, and 27 wt % methoxy polyethylene glycol (550) monoacrylate) measured using impedance spectroscopy. Markers and error bars are the average and standard deviation, respectively, of measurements from three samples.
Figure 3:
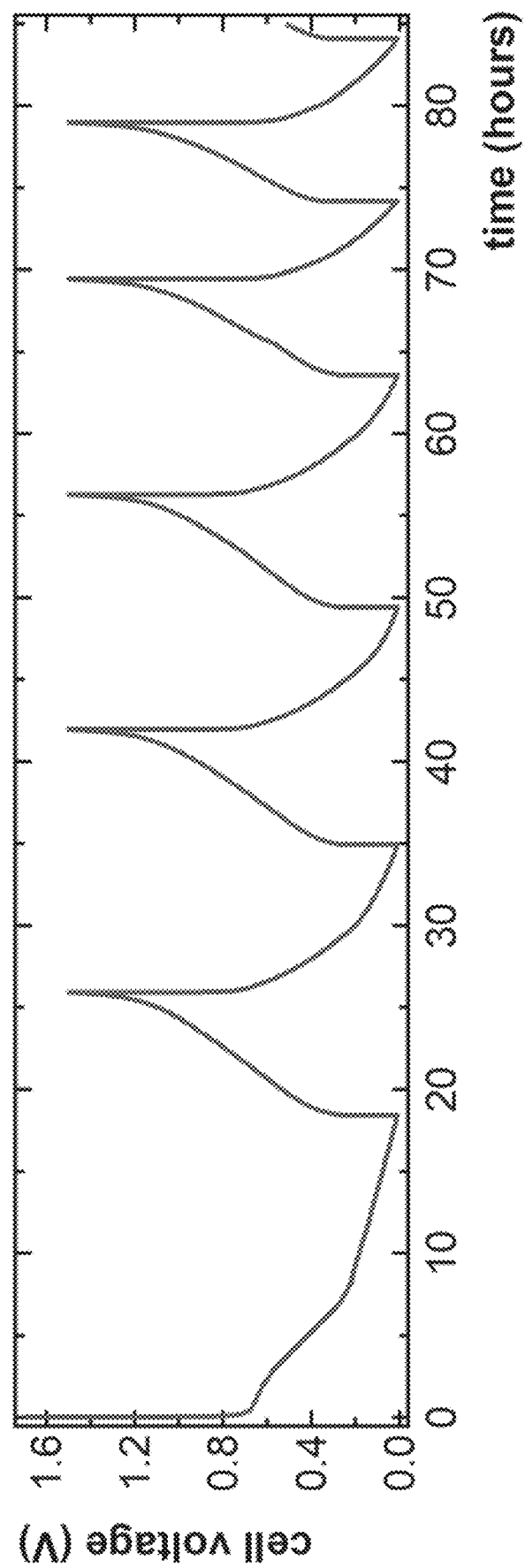
FIG. 3 shows a voltage profile during galvanostatic cycling of a carbon fiber electrode ("1K" plain weave carbon fiber fabric) versus a lithium counter-electrode with liquid electrolyte (19 wt % LiTFSI and 81 wt % 1-ethyl-3-methylimidazolium bis(trifluoromethanesulfonyl) imide) in a coin cell. The cycling current was 10 milliamps per gram of carbon fiber with an upper voltage limit of 1.5 V and a lower voltage limit of 0.1 V.
Figure 4:
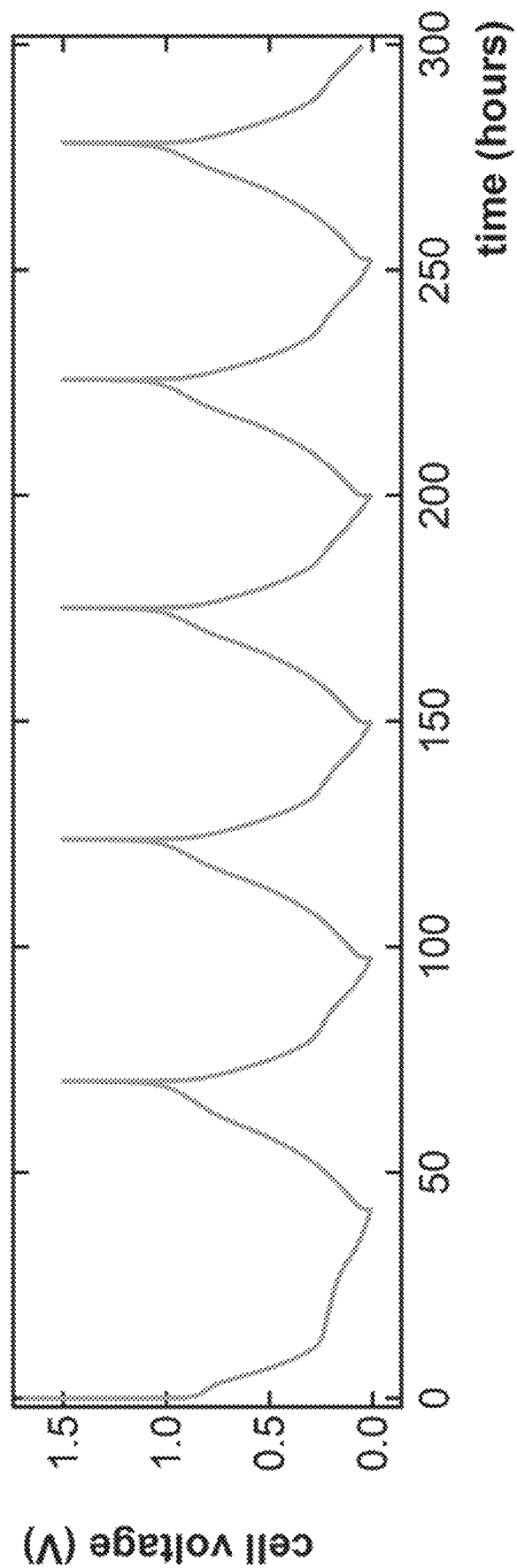
FIG. 4 shows a voltage profile during galvanostatic cycling of a carbon fiber electrode ("1K" plain weave carbon fiber fabric) versus a lithium counter-electrode with liquid electrolyte (21 wt % LiTFSI and 79 wt % 1-ethyl-3-methylimidazolium bis(fluorosulfonyl) imide) in a coin cell. The cycling current was 10 milliamps per gram of carbon fiber with an upper voltage limit of 1.5 V and a lower voltage limit of 0.1 V.

As used herein, the singular terms "a" and "the" are synonymous and used interchangeably with "one or more" and "at least one," unless the language and/or context clearly indicates otherwise. As used herein, the term "comprising" means including, made up of, and composed of.

All numbers in this description indicating amounts, ratios of materials, physical properties of materials, and/or use are to be understood as modified by the word "about," except as otherwise explicitly indicated. The term "about" as used herein includes the recited number ±10%. Thus, "about ten" means 9 to 11.

The term "molecular compound" as used herein, refers to any compound that does not dissociate into ions under normal (ambient) conditions.

The term "ionic compound" as used herein, refers to any compound that dissociates into ions under normal (ambient) conditions.

The term "metal compound" as used herein, refers to any metal from the alkali metals (e.g., Li, Na), the alkali earth metals (e.g., Mg, Ca), the transition metals (e.g., Fe, Zn), or the post-transition metals (e.g., Al, Sn). In some embodiments, the metal compound is Li, Na, K, Mg, or Al.

The term "metal salt" as used herein, refers to any compound that can be dissociated by solvents into metal ions and corresponding anions.

The "molality" (m) of a solution is defined as the amount of substance (in moles) of solute, $n_{solute}$, divided by the mass (in kg) of the solvent, $m_{solvent}$.

$$\text{molality} = n_{solute}/m_{solvent}$$

The unit for molality (m) is moles per kilogram (mol/kg).

Liquid Monomer Mixture

The present invention describes a liquid monomer mixture comprising:
(a) at least one metal salt;
(b) at least one ionic liquid; and
(c) at least one monomer.

The present invention also describes a liquid monomer mixture comprising:
(a) at least one metal salt;
(b) at least one ionic liquid;
(c) at least one monomer; and
(d) at least one polymer initiator.

Gel Polymer Electrolyte

The present invention describes a gel polymer electrolyte comprising:
(a) at least one metal salt;
(b) at least one ionic liquid; and
(c) at least one polymerized monomer.

The gel polymer electrolyte is formed by polymerizing and crosslinking the at least one monomer in the liquid monomer mixture using a polymer initiator.

Metal Salt

In some embodiments, the liquid monomer mixture or gel polymer electrolyte comprises one, two, three, four, or five metal salts. In some embodiments, the liquid monomer mixture or gel polymer electrolyte comprises between 1 and 5, 1 and 4, 1 and 3, 1 and 2, 2 and 5, 2 and 4, 2 and 3, 3 and 5, 3 and 4, or 4 and 5 metal salts. In some embodiments, the liquid monomer mixture or gel polymer electrolyte comprises one metal salt.

In some embodiments, the at least one metal salt comprises a metal ion selected from the group consisting of $Li^+$, $Na^+$, $K^+$, $Mg^{2+}$, and $Al^{3+}$.

In some embodiments, the at least one metal salt comprises an anion selected from the group consisting of bis(trifluoromethane sulfonyl)imide ($TFSI^-$), trifluoromethane sulfonate ($TF^-$), bis(fluorosulfonyl) imide ($FSI^-$), tetrafluorophosphate ($BF_4^-$), hexafluorophosphate ($PF_6^-$), bis(pentafluoroethane sulfonyl)imide ($BETI^-$), 4,5-dicyano-2-trifluoromethanoimidazole ($DCMI^-$), [fluoro(nonafluorobutane) sulfonyl]imide ($FNF^-$), perchlorate ($ClO_4^-$), sulfate ($SO_4^-$), and nitrate ($NO_3^-$).

In some embodiments, the at least one metal salt comprises an anion comprising at least one fluorine atom.

In some embodiments, the at least one metal salt comprises an anion selected from the group consisting of bis(trifluoromethane sulfonyl)imide ($TFSI^-$), trifluoromethane sulfonate ($TF^-$), bis(fluorosulfonyl) imide ($FSI^-$), tetrafluorophosphate ($BF_4^-$), hexafluorophosphate ($PF_6^-$), bis(pentafluoroethane sulfonyl)imide ($BETI^-$), 4,5-dicyano-2-trifluoromethanoimidazole ($DCMI^-$), and [fluoro(nonafluorobutane) sulfonyl]imide ($FNF^-$).

In some embodiments, the at least one metal salt is selected from the group consisting of LiTFSI, LiTF, LIFSI, LiBETI, LiDCMI, LiFNF, LiClO$_4$, LiSO$_4$, LiNO$_3$, NaTFSI, NaTF, NaFSI, NaBETI, NaDCMI, NaFNF, NaClO$_4$, NaSO$_4$, NaNO$_3$, KTFSI, KTF, KFSI, KBETI, KDCMI, KFNF, KClO$_4$, KSO$_4$, KNO$_3$, Mg(TFSI)$_2$, Mg(TF)$_2$, Mg(FSI)$_2$, Mg(BETI)$_2$, Mg(DCMI)$_2$, Mg(FNF)$_2$, Mg(ClO$_4$)$_2$, Mg(SO$_4$)$_2$, Mg(NO$_3$)$_2$, Al(TFSI)$_3$, Al(TF)$_3$, Al(FSI)$_3$, Al(BETI)$_3$, Al(DCMI)$_3$, Al(FNF)$_3$, Al(ClO$_4$)$_3$, Al(SO$_4$)$_3$, and Al(NO$_3$)$_3$.

In some embodiments, the metal salt is selected from the group consisting of LiTFSI, LiTF, NaTFSI, NaFSI, KTFSI, KBETI, and Mg(TFSI)$_2$.

In some embodiments, the metal salt is a lithium salt. In some embodiments, the metal salt is a lithium salt selected from the group consisting of LiTFSI, LiTF, LiFSI, LiBETI, LiDCMI, LiFNF, LiClO$_4$, LiSO$_4$, and LiNO$_3$. In some embodiments, the metal salt is LiTFSI or LiFSI.

In some embodiments, the weight percentage of the metal salt in the liquid monomer mixture or gel polymer electrolyte is between about 0.5% and about 30%, about 0.5% and about 25%, about 0.5% and about 20%, about 0.5% and about 15%, about 0.5% and about 10%, about 0.5% and about 5%, about 0.5% and about 1%, about 1% and about 30%, about 1% and about 25%, about 1% and about 20%, about 1% and about 15%, about 1% and about 10%, about 1% and about 5%, about 5% and about 30%, about 5% and about 25%, about 5% and about 20%, about 5% and about 15%, about 5% and about 10%, about 10% and about 30%, about 10% and about 25%, about 10% and about 20%, about 10% and about 15%, about 15% and about 30%, about 15% and about 25%, about 15% and about 20%, about 20% and about 30%, about 20% and about 25%, or about 25% and about 30%. In some embodiments, the weight percentage of the metal salt in to the liquid monomer mixture or gel polymer electrolyte is between about 10% and about 20%. In some embodiments, the weight percentage of the metal salt in the liquid monomer mixture or gel polymer electrolyte is between about 14% and about 17%.

Ionic Liquid

In some embodiments, the liquid monomer mixture or gel polymer electrolyte comprises one, two, three, four, or five ionic liquids. In some embodiments, the liquid monomer mixture or gel polymer electrolyte comprises between 1 and 5, 1 and 4, 1 and 3, 1 and 2, 2 and 5, 2 and 4, 2 and 3, 3 and 5, 3 and 4, or 4 and 5 ionic liquids. In some embodiments, the liquid monomer mixture or gel polymer electrolyte comprises one ionic liquid.

In some embodiments, the ionic liquid comprises the cation imidazolium, pyrrolidinum, pyridininum, phosphonium, ammonium, or sulfonium.

In some embodiments, the ionic liquid comprises the anion tosylate ($—SO_2C_6H_4CH_3$), methanesulfonate ($—OSO_2CH_3$), bis(trifluoromethylsulfonyl) imide ($TFSI^-$), tetrafluorophosphate ($BF_4^-$), hexafluorophosphate ($PF_6^-$), halide, triflate ($TF^-$), [fluoro (nonafluorobutane) sulfonyl] imide ($FNF^-$), chlorate ($ClO_4^-$), or sulfate ($SO_4^-$). In some embodiments, the anion in the metal salt is the same as the anion in the ionic liquid. In some embodiments, the anion in the metal salt is different than the anion in the ionic liquid.

In some embodiments, the ionic liquid comprises an imidazolium cation. In some embodiments, the ionic liquid comprising an imidazolium cation is selected from the group consisting of 1-ethyl-3-methylimidazolium chloride, 1-ethyl-3-methylimidazolium bromide, 1-ethyl-3-methylimidazolium iodide, 1-ethyl-3-methylimidazolium hexafluorophosphate, 1-ethyl-3-methylimidazolium tetrafluoroborate, 1-ethyl-3-methylimidazolium dicyanamide, 1-ethyl-3-methylimidazolium ethyl sulfate, 1-ethyl-3-methylimidazolium hydrogen sulfate, 1-ethyl-3-methylimidazolium trifluoro (trifluoromethyl) borate, 1-ethyl-3-methylimidazolium trifluoromethane sulfonate, 1-ethyl-3-methylimidazolium methane sulfonate, 1-butyl-3-methylimidazolium chloride, 1-ethyl-3-methylimidazolium bis(trifluoromethanesulfonyl)imide, 1-ethyl-3-methylimidazolium bis(fluorosulfonyl) imide, 1,3-dimethylimidazolium chloride dimethyl phosphate, 1-butyl-3-methylimidazolium bromide, 1-butyl-3-methylimidazolium chloride 1-butyl-3-methylimidazolium tetrafluoroborate, 1-butyl-3-methylimidazolium hexafluorophosphate, 1-butyl-3-methylimidazolium trifluoromethanesulfonate, 1-butyl-2,3-dimethylimidazolium chloride, 1-butyl-2,3-dimethylimidazolium hexafluorophosphate, 1-butyl-2,3-dimethylimidazolium tetrafluoroborate, 1-butyl-3-methylimidazolium bis(trifluoromethanesulfonyl)imide, 1-butyl-3-methylimidazolium tetrachloroferrate, 1-butyl-3-methylimidazolium iodide, 1-butyl-2,3-dimethylimidazolium bis(trifluoromethanesulfonyl) imide, 1-butyl-3-methylimidazolium trifluoro (trifluoromethyl) borate, 1-butyl-3-methylimidazolium tribromide, 1-butyl-3-methylimidazolium thiocyanate, 1-butyl-2,3-dimethylimidazolium 1,3-trifluoromethanesulfonate, 1,3-dimethylimidazolium dimethyl phosphate, dimethylimidazolium chloride, 1,2-dimethyl-3-propylimidazolium iodide, 2,3-dimethyl-1-propylimidazolium bis(trifluoromethanesulfonyl)imide, 1-decyl-3-methylimidazolium bis(trifluoromethanesulfonyl) imide, 1,3-dimethylimidazolium iodide, 1-hexyl-3-methylimidazolium chloride, 1-hexyl-3-methylimidazolium hexafluorophosphate, 1-hexyl-3-methylimidazolium tetrafluoroborate, 1-hexyl-3-methylimidazolium trifluoromethanesulfonate, 1-hexyl-3-methylimidazolium bromide, 1-hexyl-2,3-dimethylimidazolium iodide, 1-hexyl-3-methylimidazolium bis(trifluoromethanesulfonyl) imide, 1-(2-hydroxyethyl)-3-methylimidazolium tetrafluoroborate, 1-methyl-3-propylimidazolium iodide, 1-methyl-3-n-octylimidazolium bromide, 1-methyl-3-n-octylimidazolium chloride, 1-methyl-3-n-octylimidazolium hexafluorophosphate, 1-methyl-3-n-octylimidazolium trifluoromethanesulfonate, and 1-methyl-3-n-octylimidazolium tetrafluoroborate. In some embodiments, the ionic liquid is 1-ethyl-3-methylimidazolium bis(trifluoromethanesulfonyl)imide or 1-ethyl-3-methylimidazolium bis(fluorosulfonyl) imide.

In some embodiments, the ionic liquid comprises a pyrrolidinium cation. In some embodiments, the ionic liquid comprising a pyrrolidinium cation is selected from the group consisting of 1-butyl-1-methylpyrrolidinium bis(trifluoromethanesulfonyl) imide, 1-butyl-1-methylpyrrolidinium chloride, 1-butyl-1-methylpyrrolidinium bromide, 1-ethyl-1-methylpyrrolidinium tetrafluoroborate, 1-ethyl-1-methylpyrrolidinium bromide, and 1-methyl-1-propylpyrrolidinium bis(trifluoromethanesulfonyl) imide.

In some embodiments, the ionic liquid comprises a piperidinium cation. In some embodiments, the ionic liquid comprising a piperidinium cation is selected from the group consisting of 1-butyl-1-methylpiperidinium bromide, 1-butyl-1-methylpiperidinium bis(trifluoromethanesulfonyl) imide, and 1-methyl-1-propylpiperidinium bromide.

In some embodiments, the ionic liquid comprises a pyridinium cation. In some embodiments, the ionic liquid comprising a pyridinium cation is selected from the group consisting of 1-butylpyridinium chloride, 1-butylpyridinium bromide, 1-butylpyridinium hexafluorophosphate, 1-butyl-4-methylpyridinium bromide, 1-butyl-4-methylpyridinium hexafluorophosphate, 1-butyl-3-methylpyridinium bromide, 1-butylpyridinium tetrafluoroborate, 1-butyl-3-methylpyridinium chloride, 1-butyl-4-methylpyridinium chloride, 1-ethylpyridinium bromide, 1-ethylpyridinium chloride, 1-ethyl-3-methylpyridinium ethyl sulfate, 1-ethyl-3-(hydroxymethyl)pyridinium ethyl sulfate, 1-ethyl-3-methylpyridinium bis(trifluoromethanesulfonyl) imide, 1-hexylpyridinium hexafluorophosphate, and 1-propylpyridinium chloride.

In some embodiments, the ionic liquid comprises a morpholinium cation. In some embodiments, the ionic liquid comprises the morpholinium cation 4-ethyl-4-methylmorpholinium bromide.

In some embodiments, the ionic liquid comprises an ammonium cation. In some embodiments, the ionic liquid comprising an ammonium cation is selected from the group consisting of amyltriethylammonium bis(trifluoromethanesulfonyl) imide, cyclohexyltrimethylammonium bis(trifluoromethanesulfonyl) imide, methyltri-n-octylammonium bis(trifluoromethanesulfonyl) imide, tetrabutylammonium bromide, tetrabutylammonium chloride, tetrabutylammonium iodide, tetrabutylammonium tetrafluoroborate, tetrahexylammonium iodide, tetraamylammonium iodide, tetra-n-octylammonium iodide, tetrabutylammonium hexafluorophosphate, tetraheptylammonium iodide, tetraamylammonium bromide, tetraamylammonium chloride, tetrabutylammonium trifluoromethanesulfonate, tetrahexylammonium bromide, tetraheptylammonium bromide, tetra-n-octylammonium bromide, tetrapropylammonium chloride, tributylmethylammonium bis(trifluoromethanesulfonyl) imide, tetrabutylammonium acetate, and trimethylpropylammonium bis(trifluoromethanesulfonyl) imide.

In some embodiments, the ionic liquid comprises a phosphonium cation. In some embodiments, the ionic liquid comprising a phosphonium cation is selected from the group consisting of tributylhexadecylphosphonium bromide, tributylmethylphosphonium iodide, tributyl-n-octylphosphonium bromide, tetrabutylphosphonium bromide, tetra-n-octylphosphonium bromide, tetrabutylphosphonium tetrafluoroborate, tetrabutylphosphonium hexafluorophosphate, tributyl(2-methoxyethyl)phosphonium bis(trifluoromethanesulfonyl) imide, and tributylmethylphosphonium bis(trifluoromethanesulfonyl) imide.

In some embodiments, the ionic liquid comprises a sulfonium cation. In some embodiments, the ionic liquid comprising sulfonium cation is selected from the group consisting of trimethylsulfonium iodide, tributylsulfonium iodide, and triethylsulfonium bis(trifluoromethanesulfonyl) imide.

In some embodiments, the molality of the metal salt in the ionic liquid is between about 0.1 mol/kg and about 3 mol/kg. In some embodiments, the molality of the metal salt in the ionic liquid is between about 0.1 mol/kg and about 3 mol/kg, about 0.1 mol/kg and about 2.5 mol/kg, about 0.1 mol/kg and about 2 mol/kg, about 0.1 mol/kg and about 1.5 mol/kg, about 0.1 mol/kg and about 1 mol/kg, about 0.1 mol/kg and about 0.5 mol/kg, about 0.5 mol/kg and about 3 mol/kg, about 0.5 mol/kg and about 2.5 mol/kg, about 0.5 mol/kg and about 2 mol/kg, about 0.5 mol/kg and about 1.5 mol/kg, about 0.5 mol/kg and about 1 mol/kg, about 1 mol/kg and about 3 mol/kg, about 1 mol/kg and about 2.5 mol/kg, about 1 mol/kg and about 2 mol/kg, about 1 mol/kg and about 1.5 mol/kg, about 1.5 mol/kg and about 3 mol/kg, about 1.5 mol/kg and about 2.5 mol/kg, about 1.5 mol/kg and about 2 mol/kg, about 2 mol/kg and about 3 mol/kg, about 2 mol/kg and about 2.5 mol/kg, or about 2.5 mol/kg and about 3 mol/kg.

In some embodiments, the weight perecentage of the ionic liquid in the liquid monomer mixture or gel polymer electrolyte is between about 15% and about 80%, about 15% and about 65%, about 15% and about 50%, about 15% and about 45%, about 15% and about 40%, about 15% and about 35%, about 15% and about 30%, about 15% and about 25%, about 15% and about 20%, about 20% and about 80%, about 20% and about 65%, about 20% and about 50%, about 20% and about 45%, about 20% and about 40%, about 20% and about 35%, about 20% and about 30%, about 20% and about 25%, about 25% and about 80%, about 25% and about 65%, about 25% and about 50%, about 25% and about 45%, about 25% and about 40%, about 25% and about 35%, about 25% and about 30%, about 30% and about 80%, about 30% and about 65%, about 30% and about 50%, about 30% and about 45%, about 30% and about 40%, about 30% and about 35%, about 35% and about 80%, about 35% and about 65%, about 35% and about 50%, about 35% and about 45%, about 35% and about 40%, about 40% and about 80%, about 40% and about 65%, about 40% and about 50%, about 40% and about 45%, about 45% and about 80%, about 45% and about 65%, about 45% and about 50%, about 50% and about 80%, about 50% and about 65%, or about 65% and about 80%. In some embodiments, the weight perecentage of the ionic liquid in the liquid monomer mixture or gel polymer electrolyte is between about 25% and about 50%.

Monomer

In some embodiments, the liquid monomer mixture or gel polymer electrolyte comprises at least one monomer. In some embodiments, the liquid monomer mixture or gel polymer electrolyte comprises one, two, three, four, or five monomers. In some embodiments, the liquid monomer mixture or gel polymer electrolyte comprises between 1 and 5, 1 and 4, 1 and 3, 1 and 2, 2 and 5, 2 and 4, 2 and 3, 3 and 5, 3 and 4, or 4 and 5 monomers.

In the gel polymer electrolyte, the monomers have been polymerized using a polymer initiator.

In some embodiments, the monomer is an acrylic monomer.

In some embodiments, the acrylic monomer is a monofunctional acrylic monomer. In some embodiments, the monofunctional acrylic monomer is selected from the group consisting of N-acryloylmorpholine, benzhydryl methacrylate, benzyl acrylate, benzyl methacrylate, N-benzylmethacrylamide, 2-n-butoxyethyl methacrylate, n-butyl acrylate, iso-butyl methacrylate, n-butyl methacrylate, sec-butyl acrylate, sec-butyl methacrylate, tert-butyl acrylate, tert-butyl methacrylate, 4-chlorophenyl acrylate, cylcohexyl acrylate, cyclohexyl methacrylate, iso-decyl acrylate, n-decyl methacrylate, iso-decyl methacrylate, N—N-diethylacrylamide, N,N-dimethylacrylamide, N,N-dimethylmethacrylamide, N-dodecyl acrylate, N-dodecylacrylamide, N-dodecylmethacrylamide, N-dodecyl methacrylate, 2-ethylhexyl acrylate, N-ethylmethacrylamide, 2-(2-cthoxyethoxy)ethyl acrylate, 1-hexadecyl methacrylate, N-hexyl acrylate, N-(isobutoxymethyl) acrylamide, methacryloxyethyl trimethylammonium, 2-methoxyethyl acrylate, 2-methoxyethyl methacrylate, methyl methacrylate, 2-napthyl acrylate, neopentyl methacrylate, N-(n-octadecyl) acrylamide, N-octyl methacrylate, N-tert-octylacrylamide, N-octyl methacrylate, N-tert-octylacrylamide, pentabromophenyl acrylate, pentabromophenyl methacrylate, pentafluorophenyl acrylate, pentafluorophenyl methacrylate, 2-phenoxyethyl methacrylate, phenyl acrylate, phenyl methacrylate, 2-phenylethyl acrylate, 2-phenylethyl methacrylate, n-propyl acrylate, n-propyl methacrylate, N-iso-propylacrylamide, stearyl acrylate, stearyl methacrylate, tetrahydrofurfuryl acrylate, tribromoneopentyl methacrylate, 2,4,6,-tribromophenyl acrylate, tricthylene glycol monomethyl ether monomethacrylate, 3,3,5-trimethylcyclohexyl methacrylate, and undecyl methacrylate.

In some embodiments, the acrylic monomer is a polyethylene glycol monoacrylic monomer. In some embodiments, the acrylic monomer is selected from the group consisting of methoxy polyethylene glycol monoacrylate, octoxy polyethylene glycol monoacrylate, phenoxy polyethylene glycol monoacrylate, polyethylene glycol monomethacrylate 2000, polyethylene glycol monomethacrylate 440, polyethylene glycol monomethacrylate 200, and polyethylene glycol monomethacrylate 400.

In some embodiments, the acrylic monomer is a diacrylic monomer. In some embodiments, the acrylic monomer is selected from the group consisting of polyethylene glycol dimethacrylate 400, polyethylene glycol dimethacrylate 1000, polyethylene glycol dimethacrylate 8000, polyethylene glycol dimethacrylate 20000, 1,6-hexanediol diacrylate, 1,9-nonanediol dimethacrylate, 1,4-butanediol dimethacrylate, 1,3-butanediol dimethacrylate, 1,10-decanediol dimethacrylate, diurethane dimethacrylate, 1,4-butanediol diacrylate, ethylene glycol diacrylate, 1,5-pentanediol dimethacrylate, 1,4-phenylene diacrylate, allyl methacrylate, polyethylene glycol dimethacrylate 600, polyethylene glycol dimethacrylate 200, 2,2-bis [4-(2-hydroxy-3-methacryloxyproxyl)phenyl]propane, tricyclodecane dimethanol diacrylate, tetraethylene glycol diacrylate, polyethylene glycol diacrylate 200, polyethylene glycol diacrylate 400, polyethylene glycol diacrylate 1000, polyethylene glycol diacrylate 4000, polyethylene glycol diacrylate 10000, polyethylene glycol diacrylate 20000, polytetramethylene glycol 250 diacrylate, polytetramethylene 650 diacrylate, bis(2-methacryloxyethyl) phosphate, ethylene glycol dimethacrylate, diethylene glycol diacrylate, diethylene glycol dimethacrylate, triethylene glycol diacrylate, tripropylene glycol diacrylate, polypropylene diacrylate 400, polypropylene diacrylate 700, triethylene glycol dimethacrylate, tetraethylene glycol dimethacrylate, poly(ethylene glycol) diglycidyl ether 200, polyethylene glycol diacrylate 4000, triethylene glycol diacrylate, triethylene glycol dimethacrylate, and N,N-diallylacrylamide.

In some embodiments, the acrylic monomer is a triacrylic monomer. In some embodiments, the acrylic monomer is selected from the group consisting of ethoxylated trimethylolpropane triacrylate, propoxylated trimethylolpropane triacrylate, and ethoxylated glycerin triacrylate.

In some embodiments, the acrylate monomer is a tetraacrylic monomer. In some embodiments, the acrylic monomer is selected from the group consisting of pentaerythritol tetraacrylate and ethoxylate pentaerythritol tetraacrylate.

In some embodiments, the monomer is an epoxide monomer.

In some embodiments, the epoxide monomer is selected from the group consisting of allyl glycidyl ether, bis [4-(glycidyloxy)phenyl]methane, 1,3-butanediene diepoxide, 1,4-butanediol diglycidyl ether, 1,4-butanediol diglycidyl ether, butyl glycidyl ether, tert-butyl glycidyl ether, cyclohexene oxide, cyclopentene oxide, dicyclopentadiene dioxide, 1,2,5,6-diepoxycyclooctane, 1,2,7,8-diepoxyoctane, diglycidyl 1,2-cyclohexanedicarboxylate, N,N-diglycidyl-4-glycidyloxyaniline, 1,2-epoxybutane, cis-2,3-epoxybutane, 3,4-epoxy-1-butene, 3,4-epoxycyclohexylmethyl 3,4-epoxycyclohexylmethylcarboxylate, 1,2-epoxydodecane, 1,2-epoxyhexane, 1,2-epoxy-5-hexane, 1,2-epoxy-2-methylpropane, exo-2,3-epoxynorbornane, 1,2-epoxyoctane, 1,2-epoxypentane, 1,2-epoxy-3-phenoxypropane, (2,3-epoxypropyl)benzene, N-(2,3-epoxypropyl) phthalimide, 1,2-epoxytetradecane, exo-3,6-epoxy-1,2,3,6-tetrahydrophthlaic anhydride, 3,4-epoxytetrahydrothiophene-1,1-dioxide, 2-ethylhexyl glycidyl ether, furfuryl glycidyl ether, glycerol diglycidyl ether, glycidyl hexadecyl ether, glycidyl isopropyl ether, glycidyl 4-methoxyphenyl ether, glycidyl 2-methylphenyl ether, glycidyl 2,2,3,3,4,4,5,5-octafluoropentyl ether, glycidyl 2,2,3,3,3-tetrafluropropyl ether, (2,2,3,3,4,4,5,5,6,6,7,7,8,8,9,9-heptadecafluorononyl) oxirane, 2-hydroxy-3-{3-[2,4,6,8-tetramethyl-4,6,8-tris(propyl glycidyl ether)-2-cyclotetrasiloxanyl]propoxy} propyl methacrylate, isophorone oxide, 4,4'-methylenebis(N,N-diglycidylaniline), methyl trans-3-(4-methoxyphenyl)glycidate, 2-methyl-2-vinyloxirane, neopentyl glycol diglycidyl ether, α-pinene oxide, (±)-propylene oxide, resorcinol giglycidyl ether, cis-stilbene oxide, styrene oxide, tris(2,3-epoxypropyl) isocanurate, tris(4-hydroxyphenyl) methane triglycidyl ether, and urethane epoxy methacrylate.

Additional monomers for polymer electrolytes can be found in Snyder, J. F., et al., *Chemistry of Materials* 19 (15): 3793-3801 (2007).

In some embodiments, the weight averaged molecular weight (Mw) of the at least one monomer is between about 50 g/mol and about 10,000 g/mol. In some embodiments, the molecular weight ($M_w$) of the at least one monomer is between about 50 g/mol and about 10,000 g/mol, about 50 g/mol and about 5,000 g/mol, about 50 g/mol and about 1,000 g/mol, about 50 g/mol and about 750 g/mol, about 50 g/mol and about 500 g/mol, about 50 g/mol and 250 g/mol, about 50 g/mol and about 100 g/ml, about 100 g/mol and about 10,000 g/mol, about 100 g/mol and about 5,000 g/mol, about 100 g/mol and about 1,000 g/mol, about 100 g/mol and about 750 g/mol, about 100 g/mol and about 500 g/mol, about 100 g/mol and about 250 g/mol, about 250 g/mol and about 10,000 g/mol, about 250 g/mol and about 5,000 g/mol, about 250 g/mol and about 1,000 g/mol, about 250 g/mol and about 750 g/mol, about 250 g/mol and about 500 g/mol, about 500 g/mol and about 10,000 g/mol, about 500 g/mol and about 5,000 g/mol, about 500 g/mol and about 1,000 g/mol, about 500 g/mol and about 750 g/mol, about 750 g/mol and about 10,000 g/mol, about 750 g/mol and about 5,000 g/mol, about 750 g/mol and about 1,000 g/mol, about 1,000 g/mol and about 10,000 g/mol, about 1,000 g/mol and about 5,000 g/mol, or about 5,000 g/mol and about 10,000 g/mol. In some embodiments, the molecular weight ($M_w$) of the at least one monomer is about 300 g/mol and about 1,000 g/mol. In some embodiments, the molecular weight ($M_w$) of the at least one monomer is about 300 g/mol to about 700 g/mol. In some embodiments, the molecular weight ($M_w$) of the at least one monomer is about 331 g/mol. In some embodiments, the molecular weight ($M_w$) of the at least one monomer is about 693 g/mol.

In some embodiments, the liquid monomer mixture or gel polymer electrolyte comprises 2 monomers. In some embodiments, the weight ratio of the first monomer to the second monomer is between about 1:1 to about 1:10. In some embodiments, the weight ratio of the first monomer to the second monomer is between about 1:1 to about 1:10, about 1:1 to about 1:8, about 1:1 to about 1:6, about 1:1 to about 1:4, about 1:1 to about 1:2, about 1:2 to about 1:10, about 1:2 to about 1:8, about 1:2 to about 1:6, about 1:2 to about 1:4, about 1:4 to about 1:10, about 1:4 to about 1:8, about 1:4 to about 1:6, about 1:6 to about 1:10, about 1:6 to about 1:8, or about 1:8 to about 1:10.

In some embodiments, the weight ratio of the total monomer weight to the total ionic liquid weight is between about 10:1 to about 1:10. In some embodiments, the total monomer weight to the total ionic liquid weight is between about 10:1 to about 1:10, about 10:1 to about 1:8, about 10:1 to about 1:6, about 10:1 to about 1:4, about 10:1 to about 1:2, about 10:1 to about 1:1, about 8:1 to about 1:10, about 8:1 to about 1:8, about 8:1 to about 1:6, about 8:1 to about 1:4, about 8:1 to about 1:2, about 8:1 to about 1:1, about 6:1 to about 1:10, about 6:1 to about 1:8, about 6:1 to about 1:6, about 6:1 to about 1:4, about 6:1 to about 1:2, about 6:1 to about 1:1, about 4:1 to about 1:10, about 4:1 to about 1:8, about 4:1 to about 1:6, about 4:1 to about 1:4, about 4:1 to about 1:2, about 4:1 to about 1:1, 2:1 to about 1:10, about 2:1 to about 1:8, about 2:1 to about 1:6, about 2:1 to about 1:4, about 2:1 to about 1:2, about 1:1 to about 1:10, about 1:1 to about 1:8, about 1:1 to about 1:6, about 1:1 to about 1:4, or about 1:1 to about 1:2.

In some embodiments, the weight percentage of the at least one monomer in the liquid monomer mixture or gel polymer electrolyte is between 15% and about 70%, about 15% and about 60%, about 15% and about 50%, about 15% and about 45%, about 15% and about 40%, about 15% and about 35%, about 15% and about 30%, about 15% and about 25%, about 15% and about 20%, about 20% and about 60%, about 20% and about 50%, about 20% and about 45%, about 20% and about 40%, about 20% and about 35%, about 20% and about 30%, about 20% and about 25%, about 25% and about 60%, about 25% and about 50%, about 25% and about 45%, about 25% and about 40%, about 25% and about 35%, about 25% and about 30%, about 20% and about 60%, about 20% and about 50%, about 30% and about 45%, about 30% and about 40%, about 30% and about 35%, about 40% and about 60%, about 40% and about 50%, about 40% and about 45%, about 45% and about 60%, about 45% and about 50%, or about 50% and about 60%.

Polymer Initiator

In some embodiments, the liquid monomer mixture or gel polymer electrolyte comprises one, two, three, four, or five polymer initiators. In some embodiments, the liquid monomer mixture or gel polymer electrolyte comprises between 1 and 5, 1 and 4, 1 and 3, 1 and 2, 2 and 5, 2 and 4, 2 and 3, 3 and 5, 3 and 4, or 4 and 5 polymer initiators. In some embodiments, the liquid monomer mixture or gel polymer electrolyte comprises one polymer initiator.

In some embodiments, the polymer initiator is a thermal initiator. The thermal initiator initiates the crosslinking and/or curing (polymerizing) reaction during exposure to heat.

In some embodiments, the polymer initiator is an organic peroxide. In some embodiments, the polymer initiator is a thermal initiator selected from the group consisting of tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy) butane, 1,1-bis(tert-butylperoxy) cyclohexane, 2,5-bi(tert-butylperoxy)-2,5-dimethylhexane, 2,5-bi (tert-butylperoxy)2,5-dimethylhexane, 2,5-bi (tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate. In some embodiments, the polymer initiation is tert-butyl peroxide.

In some embodiments, the polymer initiator is a photoinitiator. The photoinitiator initiates the crosslinking and/or curing reaction of the photosensitive material during exposure to light. In some embodiments, the photoinitiator is acetophenone-based, phosphineoxide-based, benzoin-based, or thioxathenone-based.

In some embodiments, the photoinitiator is a vinyl acrylate-based resin. In some embodiments, the photoinitiator is MINS-311RM (Minuta Technology Co., Ltd, Korea).

In some embodiments, the photoinitiator is IRGACURE 127, IRGACURE 184, IRGACURE 184D, IRGACURE 2022, IRGACURE 2100, IRGACURE 250, IRGACURE 270, IRGACURE 2959, IRGACURE 369, IRGACURE 369 EG, IRGACURE 379, IRGACURE 500, IRGACURE 651, IRGACURE 754, IRGACURE 784, IRGACURE 819, IRGACURE 819Dw, IRGACURE 907, IRGACURE 907 FF, IRGACURE Oxc01, IRGACURE TPO-L, IRGACURE 1173, IRGACURE 1173D, IRGACURE 4265, IRGACURE BP, or IRGACURE MBF (BASF Corporation, Wyandotte, MI). In some embodiments, the photoinitiator is TPO (2,4,6-trimethylbenzoyl-diphenyl-phosphine oxide) or MBF (methyl benzoylformate).

In some embodiments, the weight percentage of the polymer initiator to the liquid monomer mixture or gel polymer electrolyte is between about 0.1% and about 5%. In some embodiments, the weight percentage of the polymer initiator to the liquid monomer mixture or gel polymer electrolyte is between about 0.1% and about 5%, about 0.1% and about 4%, about 0.1% and about 3%, about 0.1% and about 2%, about 0.1% and about 1%, about 0.1% and about 0.5%, about 0.5% and about 5%, about 0.5% and about 4%, about 0.5% and about 3%, about 0.5% and about 2%, about 0.5% and about 1%, about 1% and about 5%, about 1% and about 4%, about 1% and about 3%, about 1% and about 2%, about 2% and about 5%, about 2% and about 4%, about 2% and about 3%, about 3% and about 5%, about 3% and about 4%, or about 4% and about 5%.

Preparation of the Gel Polymer Electrolyte

The present invention describes a method of preparing a gel polymer electrolyte comprising:
(a) admixing at least one metal salt, at least one ionic liquid, at least one monomer, and at least one initiator; and
(b) heating the admixture of (a) to an elevated temperature between about 100° C. and about 310° C.

In some embodiments, heating the admixture to an elevated temperature in (b) causes the at least one monomer in the admixture to polymerize and form a gel polymer electrolyte.

In some embodiments, the at least one metal salt, at least one ionic liquid, at least one monomer, and at least one initiator are admixed at a temperature of between about 0° C. and about 80° C., about 0° C. and about 60° C., about 0° C. and about 40° C., about 0° C. and about 20° C., about 20° C. and about 80° C., about 20° C. and about 60° C., about 20° C. and about 40° C., about 40° C. and about 80° C., about 40° C. and about 60° C., about 40° C. and about 80° C., about 40° C. and about 60° C., or about 60° C. and about 80° C. In some embodiments, the at least one metal salt, at least one ionic liquid, at least one monomer, and at least one initiator are admixed at a temperature of between about 20° C. and about 40° C.

In some embodiments, the at least one metal salt, at least one ionic liquid, at least one monomer, and at least one initiator are admixed for between about 5 minutes and about 24 hours. In some embodiments, the at least one metal salt, at least one ionic liquid, at least one monomer, and at least one initiator are admixed for between about 5 minutes and about 24 hours, about 5 minutes and about 12 hours, about 5 minutes and about 6 hours, about 5 minutes and about 1 hour, about 5 minutes and about 30 minutes, about 5 minutes and about 15 minutes, about 15 minutes and about 24 hours, about 15 minutes and about 12 hours, about 15 minutes and about 6 hours, about 15 minutes and about 1 hour, about 15 minutes and about 30 minutes, about 30 minutes and about 24 hours, about 30 minutes and about 12 hours, about 30 minutes and about 6 hours, about 30 minutes and about 1 hour, about 1 hour and about 24 hours, about 1 hour and about 12 hours, about 1 hour and about 6 hours, about 6 hours and about 24 hours, about 6 hours and about 12 hours, or about 12 hours and about 24 hours.

In some embodiments, after admixing the at least one metal salt, at least one ionic liquid, at least one monomer, and at least one initiator, the temperature of the admixture is increased to an elevated temperature between about 100° C. and about 310° C., about 100° C. and about 250° C., about 100° C. and about 200° C., about 100° C. and about 160° C., about 100° C. and about 130° C., about 130° C. and about 310° C., about 130° C. and about 250° C., about 130° C. and about 200° C., about 130° C. and about 160° C., about 160° C. and about 310° C., about 160° C. and about 250° C., about 160° C. and about 200° C., about 200° C. and about 310° C., about 200° C. and about 250° C., or about 250° C. and about 310° C. In some embodiments, after admixing the at least one metal salt, at least one ionic liquid, at least one monomer, and at least one initiator, the temperature of the admixture is increased to an elevated temperature between about 100° C. and about 160° C.

In some embodiments, after mixing the at least one metal salt, at least one ionic liquid, at least one monomer, and at least one initiator, the temperature of the reaction mixture is maintained at an elevated temperature for between about 10 minutes and about 10 hours, about 10 minutes and about 5 hours, about 10 minutes and about 1 hour, about 10 minutes and about 30 minutes, about 30 minutes and about 10 hours, about 30 minutes and about 5 hours, about 30 minutes and about 1 hour, about 1 hour and about 10 hours, about 1 hour and about 5 hours, or about 5 hours and about 10 hours. In some embodiments, the at least one metal salt, at least one ionic liquid, at least one monomer, and at least one initiator, the temperature of the reaction mixture is maintained at an elevated temperature for between about 30 minutes and about 10 hours. In some embodiments, the at least one metal salt, at least one ionic liquid, at least one monomer, and at least one initiator, the temperature of the reaction mixture is maintained at an elevated temperature for between about 1 hour and about 5 hours.

In some embodiments, the method of preparing a gel polymer electrolyte further comprises:
(c) cutting the heated mixture formed in (b) to form a shape, for example, a disk, a square, a rectangle or strip.

In one embodiment, the cutting is by pressing the heated mixture formed in (b) with a punch.

The present invention describes a method of preparing a gel polymer electrolyte comprising:
(a) admixing at least one metal salt, at least one ionic liquid, at least one monomer, and at least one initiator; and
(b) subjecting the admixture of (a) to ultraviolet (UV) light.

In some embodiments, subjecting the admixture to UV light in (b) causes the at least one monomer in the admixture to polymerize and form a gel polymer electrolyte.

In some embodiments, after admixing the at least one metal salt, at least one ionic liquid, at least one monomer, and at least one initiator, the admixture is subjected to UV light at a wavelength between about 300 nm and about 700 nm, about 300 nm and about 600 nm, about 300 nm and about 500 nm, about 300 nm and about 400 nm, about 400 nm and about 700 nm, about 400 nm and about 600 nm, about 400 nm and about 500 nm, about 500 nm and about 700 nm, about 500 nm and about 600 nm, about 600 nm and about 700 nm.

In some embodiments, after mixing the at least one metal salt, at least one ionic liquid, at least one monomer, and at least one initiator, the admixture is subject to UV light for between about 10 minutes and about 10 hours, about 10 minutes and about 5 hours, about 10 minutes and about 1 hour, about 10 minutes and about 30 minutes, about 30 minutes and about 10 hours, about 30 minutes and about 5 hours, about 30 minutes and about 1 hour, about 1 hour and about 10 hours, about 1 hour and about 5 hours, or about 5 hours and about 10 hours.

In some embodiments, the method of preparing a gel polymer electrolyte further comprises pouring the admixture of (a) into a mold.

In some embodiments, the method of preparing a gel polymer electrolyte further comprises:
(c) cutting the solid mixture formed in (b) to form a shape, for example, a disk, a square, a rectangle or a strip.

In one embodiment, the cutting is by pressing the heated mixture formed in (b) with a punch to form a disk. In another embodiment, the cutting is by use of a knife or other cutting tool to give a square, rectangle, or strip.

In some embodiments, the gel polymer electrolyte in the form of a disk has a diameter between about 0.1 inch and about 1.5 inch, about 0.1 inch and about 1.25 inch, about 0.1 inch and about 1 inch, about 0.1 inch and about 0.5 inch, about 0.1 inch and about 0.25 inch, about 0.25 inch and about 1.5 inch, about 0.25 inch and about 1.25 inch, about 0.25 inch and about 1 inch, about 0.25 inch and about 0.5 inch, about 0.5 inch and about 1.5 inch, about 0.5 inch and about 1.25 inch, about 0.5 inch and about 1 inch, about 1 inch and about 1.5 inch, about 1 inch and about 1.25 inch, or about 1.25 inch and about 1.5 inch. In some embodiments, the heated mixture in (b) forms a gel polymer electrolyte having a diameter between about 0.25 inch and about 0.5 inch.

In some embodiments, the gel polymer electrolyte in the form of a square, rectangle or strip has at least one dimension between about 0.1 inch and about 5 inches, about 0.1 inch and about 3 inches, about 0.1 inch and about 1.5 inch, about 0.1 inch and about 1.25 inch, about 0.1 inch and about 1 inch, about 0.1 inch and about 0.5 inch, about 0.1 inch and about 0.25 inch, about 0.25 inch and about 5 inches, about 0.25 inch and about 3 inches, about 0.25 inch and about 1.5 inch, about 0.25 inch and about 1.25 inch, about 0.25 inch and about 1 inch, about 0.5 inch and about 5 inches, about 0.5 inch and about 3 inches, about 0.5 inch and about 1.5 inch, about 0.5 inch and about 1.25 inch, about 0.5 inch and about 1 inch, about 1 inch and about 5 inches, about 1 inch and about 3 inches, about 1 inch and about 1.5 inch, about 1 inch and about 1.25 inch, about 1.25 inch and about 5 inches, about 1.25 inch and about 3 inches, about 1.25 inch and about 1.5 inch, about 1.5 inch and about 5 inches, about 1.5 inch and about 3 inches, about 3 inches and about 5 inches. In some embodiments, the heated mixture in (b) forms a gel polymer electrolyte having a dimension between about 0.25 inch and about 0.5 inch.

Properties of the Gel Polymer Electrolytes

The conductivity of an electrolyte is its ability to pass an electric current. How well an electrolyte conducts electricity depends on concentration, mobility of ions, valence of ions, and temperature. The ionic conductivity of a gel polymer electrolyte can be measured by electrochemical impedance spectroscopy at room temperature. The conductivity of a gel polymer electrolyte (in S/cm) can be measured using the formula:

Ionic conductivity=$d/(RA)$ wherein:
d=thickness of the gel polymer electrolyte;
R=bulk electrical resistance of the material which is obtained from the intercept on the real axis (or extrapolated to the real impedance axis) at the high frequency end of Nyquist plot of complex impedance or at the value of the real impedance at the minimum imaginary impedance); and
A=surface area of the gel polymer electrolyte.
The Nyquist plot provides the imaginary part of the impedance ($Z_{imaginary}$(k$\Omega$*cm$^2$)) versus the real part of the impedance ($Z_{real}$(k$\Omega$*cm$^2$)).

In some embodiments, the gel polymer electrolyte has a high ionic conductivity. In some embodiments, the ionic conductivity of the gel polymer electrolyte at 25° C. is at least 0.01 mS/cm. In some embodiments, the ionic conductivity of the gel polymer electrolyte at 25° C. is between about 0.01 mS/cm and about 50 mS/cm, about 0.01 mS/cm and about 25 mS/cm, about 0.01 mS/cm and about 10 mS/cm, about 0.01 mS/cm and about 5 mS/cm, about 0.01 mS/cm and about 1 mS/cm, about 0.01 mS/cm and about 0.5 mS/cm, about 0.01 mS/cm and about 0.25 mS/cm, about 0.01 mS/cm and about 0.1 mS/cm, about 0.01 mS/cm and about 0.05 mS/cm, about 0.05 mS/cm and about 50 mS/cm, about 0.05 mS/cm and about 25 mS/cm, about 0.05 mS/cm and about 10 mS/cm, about 0.05 mS/cm and about 5 mS/cm, about 0.05 mS/cm and about 1 mS/cm, about 0.05 mS/cm and about 0.5 mS/cm, about 0.05 mS/cm and about 0.25 mS/cm, about 0.05 mS/cm and about 0.1 mS/cm, about 0.1 mS/cm and about 50 mS/cm, about 0.1 mS/cm and about 25 mS/cm, about 0.1 mS/cm and about 10 mS/cm, about 0.1 mS/cm and about 5 mS/cm, about 0.1 mS/cm and about 1 mS/cm, about 0.1 mS/cm and about 0.5 mS/cm, about 0.1 mS/cm and about 0.25 mS/cm, about 0.25 mS/cm and about 50 mS/cm, about 0.25 mS/cm and about 25 mS/cm, about 0.25 mS/cm and about 10 mS/cm, about 0.25 mS/cm and about 5 mS/cm, about 0.25 mS/cm and about 1 mS/cm, about 0.25 mS/cm and about 0.5 mS/cm, about 0.5 mS/cm and about 50 mS/cm, about 0.5 mS/cm and about 25 mS/cm, about 0.5 mS/cm and about 10 mS/cm, about 0.5 mS/cm and about 5 mS/cm, about 0.5 mS/cm and about 1 mS/cm, about 1 mS/cm and about 50 mS/cm, about 1 mS/cm and about 25 mS/cm, about 1 mS/cm and about 10 mS/cm, about 1 mS/cm and about 5 mS/cm, about 5 mS/cm and about 50 mS/cm, about 5 mS/cm and about 25 mS/cm, about 5 mS/cm and about 10 mS/cm, about 10 mS/cm and about 50 mS/cm, about 10 mS/cm and about 25 mS/cm, or about 25 mS/cm and about 50 mS/cm. In some embodiments, the ionic conductivity of the gel polymer electrolyte at 25° C. is between about 0.1 mS/cm and about 1 mS/cm.

Carbon Fiber Fabric

As used herein, a "carbon fiber" is a fiber containing at least 92 wt % carbon. Carbon fibers generally have excellent tensile properties, low densities, high thermal and chemical stability in the absence of oxidizing agents, good thermal and electrical conductivities, and excellent creep resistance.

Carbon fibers have also been shown to reversibly insert lithium ions, reaching a capacity of around 350 mAh/gm which is comparable to the theoretical maximum of graphite of 372 mAh/g. Furthermore, the conductivity of some carbon fibers have been shown to reach values of around 1000 S/cm, which allows the carbon fibers to be used without a current collector. Furthermore, the mechanical integrity and electrical conductivity of the carbon fibers may allow for the elimination of additivies.

In some embodiments, the precursor for the carbon fiber fabric is polyacrylonitrile (PAN), rayon, or mesophase pitch. In some embodiments, the precursor for the carbon fiber fabric is polyacrylonitrile.

If the precursor is polyacrylonitrile or rayon, the precursor can be drawn or spun into a carbon fiber filament using chemical and mechanical processes to initially align the polymer atoms in a way to enhance the final physical properties of the completed carbon fiber filament. After drawing or spinning, the carbon fiber filaments are then heated to drive off non-carbon atoms and produce the final carbon fiber filament. The carbon fiber filament can be further treated to improve handling qualities, then wound onto a bobbin to produce a carbon fiber fabric.

In some embodiments, the diameter of the carbon fiber is between about 2 µm and about 22 µm, about 2 µm and about 18 µm, about 2 µm about and 14 µm, about 2 µm and about 10 µm, about 2 µm and about 8 µm, about 2 µm and about 6 µm, about 2 µm and about 4 µm, about 4 µm and about 22 µm, about 4 µm and about 18 µm, about 4 µm about and 14 µm, about 4 µm and about 10 µm, about 4 µm and about 8

μm, about 4 μm and about 6 μm, about 6 μm and about 22 μm, about 6 μm and about 18 μm, about 6 μm about and 14 μm, about 6 μm and about 10 μm, about 6 μm and about 8 μm, about 8 μm and about 22 μm, about 8 μm and about 18 μm, about 8 μm about and 14 μm, about 8 μm and about 10 μm, about 10 μm and about 22 μm, about 10 μm and about 18 μm, about 10 μm about and 14 μm, about 14 μm and about 22 μm, about 14 μm and about 18 μm, or about 18 μm and about 22 μm. In some embodiments, the diameter of the carbon fiber is between about 5 μm and about 10 μm. In some embodiments, the diameter of the carbon fiber is about 7 μm.

In some embodiments, the carbon fiber filament is a commercially available carbon fiber from TORAY Carbon Fibers America, Inc., Santa Ana, CA. In some embodiments, the carbon fiber filament is TORAYCA T300 (diameter=7 μm, tensile modulus=33.4 msi, tensile strength=512 ksi). In some embodiments, the carbon fiber filament is TORAYCA T400H (diameter=7 μm, tensile modulus=36.3 msi, tensile strength=640 ksi). In some embodiments, the carbon fiber filament is TORAYCA T700S (diameter=7 μm, tensile modulus=33.4 msi, tensile strength=711 ksi). In some embodiments, the carbon fiber filament is TORAYCA T700G (diameter=7 μm, tensile modulus=34.8 msi, tensile strength=711 ksi). In some embodiments, the carbon fiber filament is TORAYCA T800H (diameter=5 μm, tensile modulus=42.7 msi, tensile strength=796 ksi). In some embodiments, the carbon fiber filament is TORAYCA T800S (diameter=5 μm, tensile modulus=42.7 msi, tensile strength=853 ksi). In some embodiments, the carbon fiber filament is TORAYCA T1000G (diameter=5 μm, tensile modulus=43.0 msi, tensile strength=924 ksi). In some embodiments, the carbon fiber filament is TORAYCA T1100G (diameter=5 μm, tensile modulus=47.0 msi, tensile strength=1017 ksi). In some embodiments, the carbon fiber filament is TORAYCA T1100S (diameter=5 μm, tensile modulus=47.0 msi, tensile strength=1017 ksi). In some embodiments, the carbon fiber filament is TORAYCA M46J (diameter=5 μm, tensile modulus=63.3 msi, 611 ksi).

In some embodiments, the carbon fiber filament is a commercially available carbon fiber filament from TOHO TENAX Europe GmbH, Wuppertal, Germany. In some embodiments, the carbon fiber filament is TENAX HTA40 (diameter=7 μm, tensile modulus=33.8 msi, tensile strength=572 ksi).

In some embodiments, the carbon fiber filament is a commercially available carbon fiber filament from HEXCEL Corporation, Stamford, CT. In some embodiments, the carbon fiber filament is HEXTOW AS4 (diameter=7.1 μm, tensile modulus=33.5 msi, tensile strength=670 ksi). In some embodiments, the carbon fiber filament is HEXTOW IM6 (diameter=5.2 μm, tensile modulus=40.5 msi, tensile strength=830 ksi).

The carbon fiber filament can be used to weave a carbon fiber fabric. The appearance of the fabric depends upon the linear density of the filament and the weave chosen. In some embodiments, the carbon fiber filament is woven into a twill fabric, a satin fabric, or a plain fabric. In some embodiments, the carbon fiber filament is knitted or braided into a carbon fiber fabric.

In some embodiments, the carbon fiber or carbon fiber fabric comprises carbon as a weight percentage of the carbon fiber fabric of between about 92% and about 100%, about 92% and about 99%, about 92% and about 98%, about 92% and about 97%, about 92% and about 96%, about 92% and about 95%, about 92% and about 94%, about 92% and about 93%, about 93% and about 100%, about 93% and about 99%, about 93% and about 98%, about 93% and about 97%, about 93% and about 96%, about 93% and about 95%, about 93% and about 94%, about 94% and about 100%, about 94% and about 99%, about 94% and about 98%, about 94% and about 97%, about 94% and about 96%, about 94% and about 95%, about 95% and about 100%, about 95% and about 99%, about 95% and about 98%, about 95% and about 97%, about 95% and about 96%, about 96% and about 100%, about 96% and about 99%, about 96% and about 98%, about 96% and about 97%, about 97% and about 100%, about 97% and about 99%, about 97% and about 98%, about 98% and about 100%, about 98% and about 99%, or about 99% and about 100%. In some embodiments, the carbon fiber fabric comprises carbon as a weight percentage of the carbon fiber fabric of between about 92% and about 98%. In some embodiments, the carbon fiber fabric comprises carbon as a weight percentage of the carbon fiber fabric of about 93%.

In some embodiments, the carbon fiber fabric is a commercially available carbon fiber fabric. In some embodiments, the carbon fiber fabric is a commercially available carbon fiber fabric from FIBRE GLAST Developments Corp., Brookville, OH. In some embodiments, the carbon fiber fabric is 3K (2×2) twill weave carbon fiber fabric (strength=610-640 ksi, tensile modulus=33.6-34.9 msi). In some embodiments, the carbon fiber fabric is 3K plain weave carbon fiber fabric (strength=610-635 ksi, tensile modulus=33.0-34.9 msi). In some embodiments, the carbon fiber fabric is 1K plain weave ultralight carbon fiber fabric (strength=510-635 ksi, tensile modulus=33.0-34.9 msi). In some embodiments, the carbon fiber fabric is 6K (2×2) twill weave carbon fiber fabric (strength=525-600 ksi, tensile modulus=34.1-35.4 msi). In some embodiments, the carbon fiber fabric is or 12K (2×2) twill weave carbon fiber fabric (strength=620-655 ksi, tensile modulus=33.1-34.4 msi).

In some embodiments, the carbon fiber or carbon fiber fabric further comprises an active material. In some embodiments, the active material is deposited on the carbon fiber.

In some embodiments, the active material deposited on the carbon fiber or carbon fiber fabric is selected from the group consisting of graphite, $LiCoO_2$, $LiMn_2O_4$, $LiNi_xMn_yCo_zO_2$, $LiFePO_4$, $LiNi_xCo_yAl_2O_2$, or $Li_4Ti_5O_{12}$ (wherein x, y, and z are real numbers between 0 and 1).

In some embodiments, the active material is deposited on the carbon fiber or carbon fiber fabric by chemical vapor deposition or physical vapor deposition.

Electrochemical Cell

In some embodiments, a liquid monomer mixture or a gel polymer electrolyte can be used to fabricate an electrochemical cell. In some embodiments, the electrochemical cell is a battery. In some embodiments, the electrochemical cell is a Li-ion battery.

The present invention describes an electrochemical cell comprising:
  (a) a positive electrode;
  (b) a negative electrode; and
  (c) a liquid monomer mixture between the (a) positive electrode and (b) negative electrode comprising:
    (i) at least one metal salt; and
    (ii) at least one ionic liquid;
wherein at least one electrode comprises a carbon fiber, and wherein the diameter of the carbon fiber is between about 2 μm and about 22 μm.

The present invention describes an electrochemical cell comprising:
  (a) a positive electrode;
  (b) a negative electrode; and (c) a gel polymer electrolyte between the (a) positive electrode and the (b) negative electrode.

The present invention describes an electrochemical cell comprising:
(a) a positive electrode;
(b) a negative electrode; and
(c) a gel polymer electrolyte between the (a) positive electrode and the (b) negative electrode comprising:
(i) at least one metal salt;
(ii) at least one ionic liquid; and
(iii) at least one polymerized monomer;
wherein at least one electrode comprises a carbon fiber, and wherein the diameter of the carbon fiber is between about 2 µm and about 22 µm.

The present invention also describes an electrochemical cell comprising:
(a) a positive electrode;
(b) a negative electrode;
(c) a separator between the (a) positive electrode and the (b) negative electrode; and
(d) a gel polymer electrolyte between the (a) positive electrode and the (b) negative electrode.

In some embodiments, the anode (negative electrode) of the electrochemical cell used with the gel polymer electrolyte is selected from the group consisting of metals such as lithium, magnesium, aluminum, zinc, chromium, iron, nickel, tin, lead, copper, silver, palladium, mercury, platinum, gold, and combinations thereof; metal alloys; metal oxides; silicon; a carbonaceous material of varying degrees of graphitization; phosphates; sulfides; and carbon fibers. In some embodiments, the negative electrode comprises carbon fiber, carbon powder, carbon black, acetylene black, or a combination thereof. In some embodiments, carbon powder comprises mesoporous carbon microbeads or coated spherical graphite. In some embodiments, the negative electrode comprises carbon fiber.

In some embodiments, the cathode (positive electrode) of the electrochemical cell used with the gel polymer electrolyte is selected from the group consisting of metals such as lithium, magnesium, aluminum, zinc, chromium, iron, nickel, tin, lead, copper, silver, palladium, mercury, platinum, gold, and combinations thereof; metal alloys; metal oxides; silicon; carbonaceous of varying degrees of graphitization; phosphates; sulfides; and carbon fibers. In some embodiments, the positive electrode comprises carbon fiber, carbon powder, carbon black, acetylene black, or a combination thereof. In some embodiments, carbon powder comprises mesoporous carbon microbeads or coated spherical graphite. In some embodiments, the positive electrode comprises carbon fiber. In some embodiments, the positive electrode comprises graphite.

In some embodiments, the negative electrode and the positive electrode comprise different materials. In some embodiments, the negative electrode and the positive electrode comprise the same material. In some embodiments, the negative electrode and the positive electrode comprise a carbon fiber fabric. In some embodiments, the negative electrode comprises carbon fiber and the positive electrode comprises graphite.

In some embodiments, the electrochemical cell includes a separator between the positive electrode and the negative electrode. In some embodiments, the electrochemical cell does not include a separator. The separator may be any separator that is commonly used in batteries. In some embodiments, the separator comprises an inactive material and/or a non-conductive material. In some embodiments, the separator is a microporous separator. In some embodiments, the separator is a microporous separator comprising nonwoven fibers (e.g., nylon, cotton, polyester, and glass), or a polymer film (e.g,. polyethylene, polypropylene, poly(tetrafluoroethylene), poly(vinyl chloride)). In some embodiments, the separator comprises cotton, a synthetic fiber, linen, a polymer fiber, a fiberglass fiber, a glass microfiber, a microporous polymer material, or a combination thereof. In some embodiments, the separator comprises a fiberglass fiber, a glass microfiber, or a microporous polymer. In some embodiments, the microporous separator is a flat sheet. In some embodiments, the microporous separator comprises a polymer selected from the group consisting of polypropylene, polyethylene, poly-1-methylpentane, poly(tetrafluoroethylene), poly(vinyl chloride), and polyhexane.

In some embodiments, the separator comprises a glass microfiber filter. In some embodiments, the separator comprises a WHATMAN GF/D glass microfiber filter from GE Healthcare, Chicago, IL.

In some embodiments, electrochemical cells that operate using gel polymer electrolytes at high cell voltages are fabricated using techniques known to those of ordinary skill in the art.

In some embodiments, electrochemical cells prepared using the gel polymer electrolytes described herein have improved properties.

In some embodiments, battery performance can be quantified with four parameters: cell voltage, capacity, Coulombic efficiency, and cycling stability. While the first two determine the energy density, the latter two dictate the life and energy efficiency.

In some embodiments, the electrochemical cell has a high specific capacity. The specific capacity is a measure used to define the capacity of a cell in weight, usually displayed in ampere hours per kilogram (Ah/kg). In some embodiments, the electrochemical cells have a high specific power. The specific power reflects the loading capacity of an electrochemical cell: the amount of current that a battery can deliver, usually displayed in watts per kilogram (W/kg). Measuring the specific capacity and the specific power of an electrochemical cell allows for the determination of the performance of the cell.

In some embodiments, the electrochemical cell has a specific energy between about 1 Wh/kg and about 300 Wh/kg, about 1 Wh/kg and about 200 Wh/kg, about 1 Wh/kg and about 100 Wh/kg, about 1 Wh/kg and about 50 Wh/kg, about 50 Wh/kg and about 300 Wh/kg, about 50 Wh/kg and about 200 Wh/kg, about 50 Wh/kg and about 100 Wh/kg, about 100 Wh/kg and about 300 Wh/kg, about 100 Wh/kg and about 200 Wh/kg, or about 200 Wh/kg and about 300 Wh/kg.

In some embodiments, the electrochemical cell has a high cell voltage. The cell voltage is usually reported nominally as an average between the maximum charging voltage and the end of the discharge voltage. The voltage behavior of an electrochemical cell is influenced by several factors: current load, internal resistance, rate of charge or discharge, and temperature.

In some embodiments, the electrochemical cell has a cell voltage between about 2.5 V and and about 5 V, about 2.5 V and about 4.5 V, about 2.5 V and about 4 V, about 2.5 V and about 3.5 V, about 2.5 V and about 3 V, about 3 V and about 5 V, about 3 V and about 4.5 V, about 3 V and about 4 V, about 3 V and about 3.5 V, about 3.5 V and about 5 V, about 3.5 V and about 4.5 V, about 3.5 V and about 4 V, about 4 V and about 5 V, about 4 V and about 4.5 V, or about 4.5 V and about 5 V.

In some embodiments, the electrochemical cell is assembled into a wound design. In a wound design, electrode sheets can be cut to target dimensions and then, with a separator placed in-between, wound into a spiral or jelly-roll and infiltrated with a liquid monomer mixture, mixture of ionic liquid and metal salt, or gel polymer electrolyte and suitably packaged.

In some embodiments, the electrochemical cell is assembled into a stacked design. In a stacked design, electrode sheets, e.g. in the form of a disk, square, rectangle, or strip, are cut to target dimensions, but then can be stacked on top of one another with a separator placed in-between, forming an electrochemical cell comprised of physically discrete electrodes. The stacked assembly can then be infiltrated with liquid monomer mixture, mixture of ionic liquid and metal salt, or gel polymer electrolyte and packaged.

In some embodiments, the electrochemical cell can fit into a small cloth pocket. In some embodiments, the electrochemical cell comprises connectors that provide for the easy and repeated connection and disconnection from a garment. In some embodiments, the connectors on the electrochemical cell are snaps.

In some embodiments, the flexible electrochemical cell is a flexible battery.

In some embodiments, the present invention describes an electrochemical cell comprising:
  (a) a positive electrode, a negative electrode, and a gel polymer electrolyte; and
  (b) a casing covering the electrochemical cell.

In some embodiments, the electrochemical cell is contained within a casing. The casing can perform several functions. In some embodiments, the casing substantially or completely seals the electrochemical cell and prevents leakage of the gel polymer electrolyte into the ambient environment, as well as water and/or oxygen infiltration into the electrochemical cell. In some embodiments, the casing forms a pouch containing the electrochemical cell. In some embodiments, the casing is in the form of a strap containing the electrochemical cell. In some embodiments, the casing is removable. In some embodiments, the casing is integrated into a housing for a portable electrochemical cell. In some embodiments, the casing is integrated into a housing for a flexible electrochemical cell.

In some embodiments, the casing comprises a moisture-proof multi-layered film including a polymer film. In some embodiments, the polymer film comprises at least one polymer selected from the group consisting of polypropylene resin, polyurethane resin, silane-terminated polymer, silicone, polydimethylsiloxane, unsaturated polyester resin, vinyl ester resin, acrylate, polyvinyl acetate, polyvinyl alcohol, polyvinyl ether, ethylene vinyl acetate, ethylene acrylic acid copolymer, polystyrene, polyvinyl chloride, isoprene rubber, butadienace rubber, styrene-butadiene rubber, chloroprene rubber, nitrile rubber, butyl rubber, tetrafluoro ethylene/propylene rubber, polysulfide, polyethylene, fluorinated hydrocarbon, phenol-formaldehyde resin, liquid crystal polymer, nylon, polyamide, polyimide, polyethylene terephthalate, cellulose, polymethylmethacrylate, polyolefin, polyester, cresol-formaldehyde novolac resin, cresol-formaldehyde epoxy resin, resorcinol-formaldehyde resin, urea-formaldehyde resin, melamine-formaldehyde resin, polybenzimidazole, polyamide-imide, and polysulfone. In some embodiments, the polymer film comprises at least one polymer selected from the group consisting of nylon, polyamide, polyimide, polyethylene terephthalate, polyester, polyurethane, polypropylene, and polyethylene.

In some embodiments, casing further comprises a metal layer. In some embodiments, the metal layer comprises at least one metal selected from the group consisting of aluminum, nickel, copper, molybdenum, tantalum, gold, palladium, titanium, stainless steel, and alloys thereof.

In some embodiments, the casing is sealed using a thermal adhesive or another sealant. In some embodiments, 100% of the casing perimeter is sealed. In some embodiments, between about 25% and about 100%, about 25% and about 95%, about 25% and about 90%, about 25% and about 75%, about 25% and about 60%, about 25% and about 45%, about 25% and about 35%, about 35% and about 100%, about 35% and about 95%, about 35% and about 90%, about 35% and about 75%, about 35% and about 60%, about 35% and about 45%, about 45% and about 100%, about 45% and about 95%, about 45% and about 90%, about 45% and about 75%, about 45% and about 60%, about 60% and about 100%, about 60% and about 95%, about 60% and about 90%, about 60% and about 75%, about 75% and about 100%, about 75% and about 95%, about 75% and about 90%, about 90% and about 100%, about 90% and about 95%, or about 95% and about 100% of the casing perimeter is sealed.

In some embodiments, the electrochemical cell or electrochemical cell and casing can be integrated into fabric. In some embodiments, the electrochemical cell or electrochemical cell and casing can fit into a small cloth pocket.

In some embodiments, the electrochemical cell or electrochemical cell and casing can be used as a patch or a strap attached to another piece of fabric. In some embodiments, the electrochemical cell or electrochemical cell and casing comprise connectors that provide for the easy and repeated connection and disconnection from a garment. In some embodiments, the connectors on the electrochemical cell or electrochemical cell and casing are snaps. In some embodiments, the electrochemical cell or electrochemical cell and casing can be sewn into a garment. In some embodiments, the electrochemical cell or electrochemical cell and casing can be attached using an adhesive or VELCRO.

In some embodiments, the patch or strap can be concealed in the seam of a shirt, a blouse, pants, or a skirt; can be applied as decoration to garments; can be worns as a belt or suspenders; can be incorporated into a waist pack, a knapsack, a technical vest; or can be used as a strap for luggage, a purse or a bag.

Uses of Electrochemical Devices

In some embodiments, the electrochemical cell comprises at least one wire that allows the communication of power and signals between the electrochemical cell and an attached electronic device. In some embodiments, the electrochemical cell comprises one, two, three, four, or five wires. In some embodiments, the electrochemical cell comprises between 1 and 5, 1 and 4, 1 and 3, 1 and 2, 2 and 5, 2 and 4, 2 and 3, 3 and 5, 3 and 4, or 4 and 5 wires. In some embodiments, the electrochemical cell comprises two wires.

In some embodiments, the at least one wire is flexible. In some embodiments, the flexible wire comprises a conductive fiber. In some embodiments, the at least one wire comprises carbon fiber or metallic fiber. In some embodiments, the at least one wire is sown into the fabric to connect the electrochemical cell with the fabric-embedded electronic device. In some embodiments, the at least one wire is embedded between two pieces of fabric or sewn into the lining of a multilayer fabric to connect the electrochemical cell or battery to the electronic device.

In some embodiments, flexible wires may be formed of one or more conductive materials including, but not limited to, Au, Pd, Pt, Ag, Cu, Al, aluminum alloys, Ni, Zn, carbon, titanium, Cr, W, doped amorphous or polycrystalline silicon, Mo, Ta, steel, stainless steel, carbon, conductive polymers, and combinations thereof. Exemplary conductive polymers include polyacetylene, polypyrrole, polyaniline, and copolymers thereof. Other examples of conductive polymers include poly(p-phenylene vinylene) and its soluble derivatives. In one embodiment, the conductive Ag wires are nanowires. In another embodiment, the conductive materials are impregnated into a woven material. In another embodiment, the conductive material comprises a thin carbon fiber that may be woven.

In some embodiments, the present invention describes an electrochemical device comprising:
  (a) an electrochemical cell, wherein the electrochemical cell comprises a positive electrode, a negative electrode, and a gel polymer electrolyte;
  (b) at least one electronic device; and
  (c) at least one connection between the electrochemical cell and the electronic device.

In some embodiments, the conection is by wire. In other embodiments, the connection is by components that may utilize wireless connectivity for the exchange of data signals, such as radio frequency, infrared, sound, and/or other mechanical or electromagnetic medium.

In some embodiments, the present invention describes an electrochemical device comprising:
  (a) an electrochemical cell, wherein the electrochemical cell comprises a positive electrode, a negative electrode, and a gel polymer electrolyte;
  (b) at least one electronic device;
  (c) a casing covering the electrochemical cell; and
  (d) at least one connection between the electrochemical cell and the electronic device.

In some embodiments, the conection is by wire. In other embodiments, the connection is by components that may utilize wireless connectivity for the exchange of data signals, such as radio frequency, infrared, sound, and/or other mechanical or electromagnetic medium.

In some embodiments, the electrochemical cell used in the electrochemical device is flexible and can be worn about an appendage of a wearer such as the wrist, the forearm, the bicep, the ankle, or the leg. In some embodiments, the electrochemical cell and the electrochemical device are flexible. In some embodiments, the electrochemical cell, the electronic device, and the electrochemical device are flexible. The flexibility of the electrochemical cell or electrochemical device can be determined by measuring the bend angle (degree of bend) which can range from about 0° C. to about 180° C. The bend angle measures the angle through which a material is bent. In some embodiments, the bend angle of the electrochemical cell or electrochemical device is between about 30° C. and about 180° C., about 30° C. and about 150° C., about 30° C. and about 120° C., about 30° C. and about 90° C., about 30° C. and about 60° C., about 60° C. and about 180° C., about 60° C. and about 150° C., about 60° C. and about 120° C., about 60° C. and about 90° C., about 90° C. and about 180° C., about 90° C. and about 150° C., about 90° C. and about 120° C., about 120° C. and about 180° C., about 120° C. and about 150° C., or about 150° C. and about 180° C.

In some embodiments, the electrochemical device comprising an electrochemical cell and an electronic device is used for real-time monitoring of biomarkers. In some embodiments, the electrochemical device is wearable.

In some embodiments, the wearable electrochemical device is non-invasive and comprises an electronic device that is a sensor, a soft actuator, a flexible electronic display, a flexible electronic device, a low-profile energy storage system, or a miniaturized wireless communication device. In some embodiments, the wearable electrochemical device comprises an electronic device that is a health-related sensor, a communications device, an environmental sensor, an electronic display, or an electrochromic device. In some embodiments, the wearable non-invasive electrochemical device comprises an electronic device that is a strain sensor, a pressure sensor, a light sensor, an external temperature sensor, a body-temperature sensor, a sweat sensor, a vibration sensor, an antenna, a light emitting diode, a liquid crystal display, a quantum dot display, an electrochromic device, a cooling device, a supercapacitor, or a combination thereof. In some embodiments, the wearable non-invasive electrochemical device comprises an electronic device that is a strain sensor that measures motion, blood pulse, breathing, bending, or a combination thereof. In some embodiments, the wearable non-invasive electrochemical device comprises an electronic device that is a skin-mounted electrode for recording biopotentials for human health monitoring, disease diagnostics, and machine interfaces.

In some embodiments, the light emitting diode (LED) utilizes the electrochemical device as a power source. In some embodiments, the LED or flexible array of LEDs requires a minimum voltage and current, supplied externally, to be activated and to be lighted to the required brightness. For example, a LED may require a minimum 1.8 volts voltage and 100 microamperes current. The positive and the negative terminals of the electrochemical cell or battery would be connected to the positive and negative terminals, respectively, of the LED, via wires or conductive fibers, thus supplying the required voltage and current.

In some embodiments, the electrochemical device is a non-invasive device for health monitoring, diagnostics, and therapeutics. In some embodiments, the electrochemical device comprises an electronic device that is an electrode, a cardiac temperature sensor, an optogenetic light delivery sensor, a biodegradable microsupercapacitor, a biodegradable battery, or an energy harvestor. In some embodiments, the electrochemical device comprises an electronic device that is an electrode that monitors electromyography (EMG) data, electrooculography (EOG) data, stimulation, blood pressure, blood-sugar levels, electrolyte levels, metabolite levels, brain activity, muscle activity, electrocardiogramata, biventricular pacing, or a combination thereof.

In some embodiments, the electrochemical device is an implantable device for health monitoring, diagnostics, and therapeutics. In some embodiments, the implantable electrochemical device comprises an electronic device that is an electrode, a cardiac temperature sensor, an optogenetic light delivery sensor, a biodegradable microsupercapacitor, a biodegradable battery, or an energy harvestor. In some embodiments, the implantable electrochemical device comprises an electronic device that is an electrode that monitors electromyography (EMG) data, electrooculography (EOG) data, stimulation, blood pressure, blood-sugar levels, electrolyte levels, metabolite levels, brain activity, muscle activity, electrocardiogramata, biventricular pacing, or a combination thereof.

In some embodiments, the wearable electrochemical device is used to non-invasively enable disease diagnosis and health monitoring. In some embodiments, the wearable electrochemical device is used to monitor therapy and treatment of health conditions.

In some embodiments, the electrochemical device is non-wearable. In some embodiments, the electrochemical device is used in an asset-monitoring tag (e.g., RFID tags), tents, sails, and banknotes (e.g., to power security features).

Figure 14:
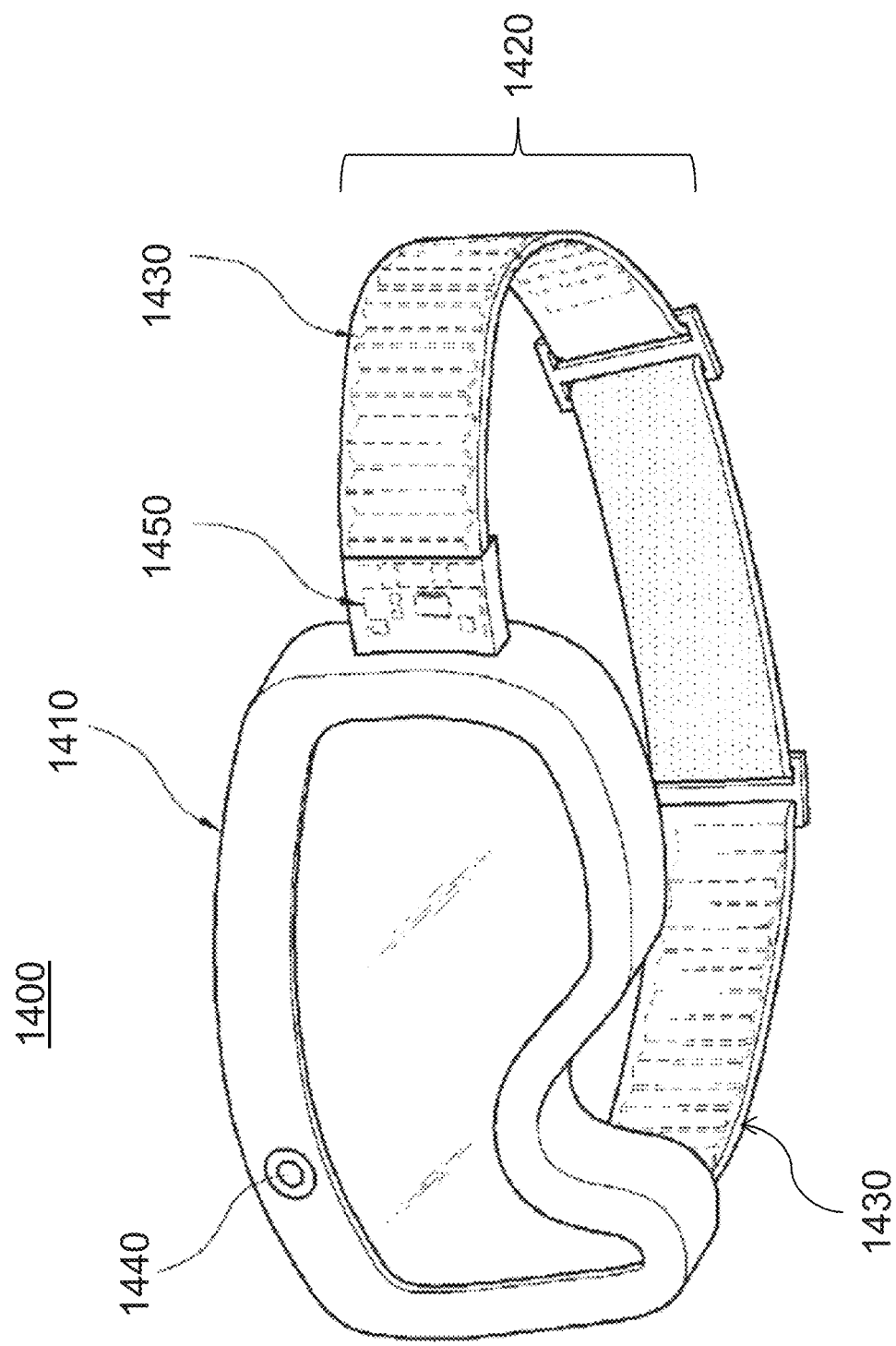
FIG. 14 is a depiction of a wearable electrochemical device of the goggles type that comprises a body unit comprising at least one electronic device including a display unit 1410 and a flexible electrochemical cell 1430 embedded in wearing unit 1420.

FIG. 14 depicts a wearable device of the goggles type which comprises a body unit comprising at least one function module 1410; a control unit 1450; a wearing unit 1420 that has a predetermined length and is connected to the body unit such that the body unit remains worn on the user's face; and at least one flexible electrochemical cell 1430 described herein embedded in the wearing unit 1420 so as to provide the body unit with power such that the function module 1410 can be driven. In one embodiment, the function module 1410 further includes at least one of a display unit including at least one of an augmented reality display and a virtual reality display, a fog prevention unit, a communication module, a GPS module, a sensor module, and a camera unit 1440. In another embodiment, the body unit includes an augmented reality device or a virtual reality device. See US 2019/0033602, which is incorporated by reference in its entirety, for further information regarding the construction of such wearable devices.

Figure 15:
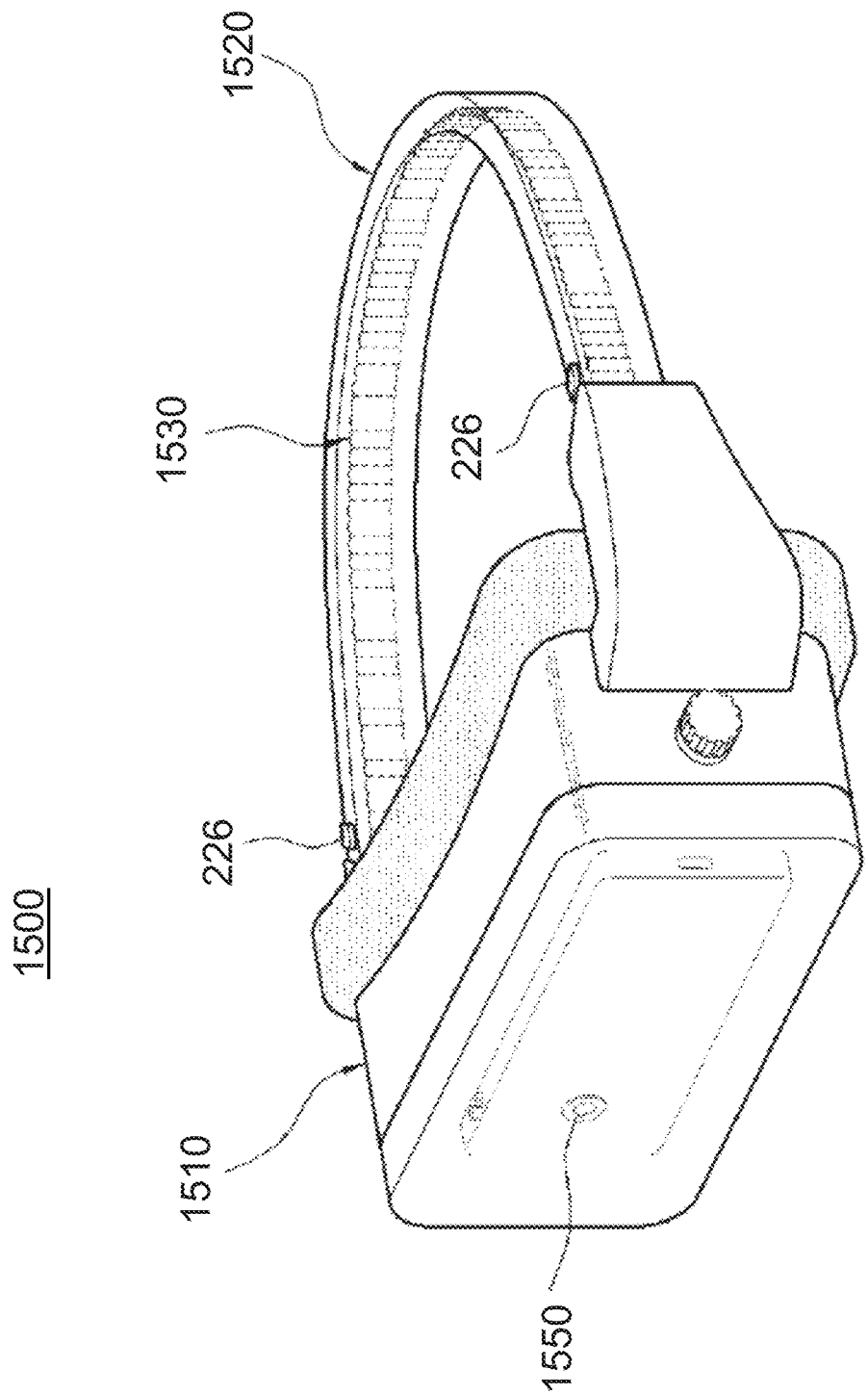
FIG. 15 is a depiction of a wearable electrochemical device that comprises a body unit 1510 comprising a smart phone 1550 and a flexible electrochemical cell 1530 embedded in the wearing unit 1520.

FIG. 15 depicts a wearable device which comprises a body unit 1510 comprising at least one function module 1550 in the form of a smart phone; a control unit 226; a wearing unit 1520 that has a predetermined length and is connected to the body unit such that the body unit remains worn on the user's face; and at least one flexible electrochemical cell 1530 described herein embedded in the wearing unit 1520 so as to provide the body unit with power such that the function module 1550 can be driven. In one embodiment, the function module 1550 further includes at least one of a display unit including at least one of an augmented reality display and a virtual reality display, a fog prevention unit, a communication unit, a GPS module, a sensor module, and a camera unit. In another embodiment, the body unit includes an augmented reality device or a virtual reality device. See, US 2019/0033602, which is incorporated by reference in its entirety, for further information regarding the construction of such wearable devices.

Figure 16:
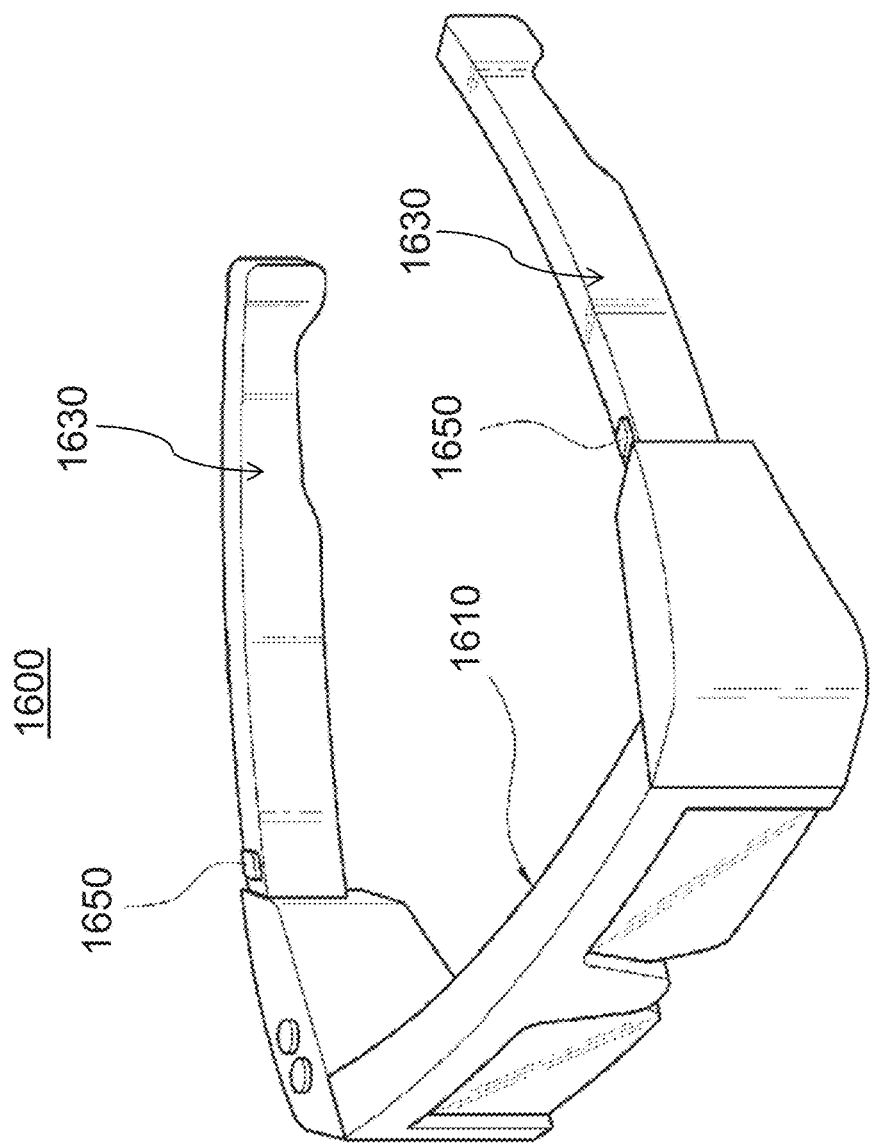
FIG. 16 is a depiction of a wearable electrochemical device of the glasses type that comprises a body unit comprising at least one function module 1610 and a flexible electrochemical cell 1630 embedded in the wearing unit.

FIG. 16 depicts a wearable device of the glasses type which comprises a body unit comprising at least one function module 1610; a control unit 1650; a wearing unit that has a predetermined length and is connected to the body unit such that the body unit remains worn on the user's face; and at least one flexible electrochemical cell 1630 described herein embedded in the wearing unit so as to provide the body unit with power such that the function module 1610 can be driven. In one embodiment, the function module 1610 further includes at least one of a display unit including at least one of an augmented reality display and a virtual reality display, a fog prevention unit, a communication module, a GPS module, a sensor module, and a camera unit. In another embodiment, the body unit includes an augmented reality device or a virtual reality device. See US 2019/0033602, which is incorporated by reference in its entirety, for further information regarding the construction of such wearable devices.

In some embodiments, the flexible electrochemical cell is contained within a wearable device such as a smartwatch and/or a watch strap.

Figure 17:
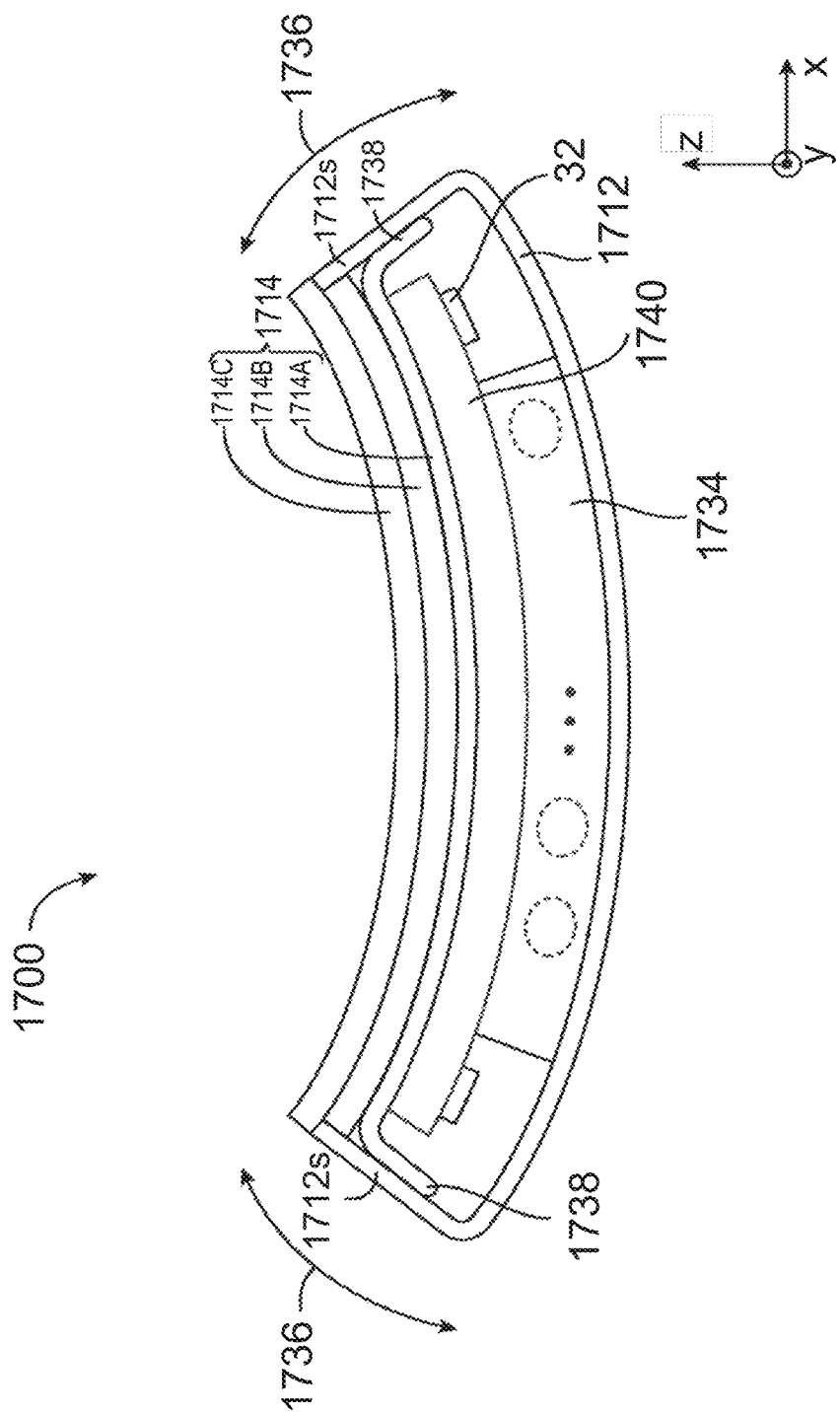
FIG. 17 is a depiction of a flexible device 1700 that may be a laptop computer, a tablet computer, a wrist watch, a pendant device, a media player, etc. The flexible device includes a flexible display 1714, a flexible housing 1712, a flexible logic board 1740, and a flexible electronic cell 1734. The flexible electronic cell may comprise one or more layers.

FIG. 17 depicts a flexible electronic 1700 that may be a laptop computer, a tablet computer, a wrist-watch, pendant device, a cellular telephone, media player, etc. FIG. 17 is cross-sectional side view of an illustrative embodiment of device 1700 with flexible internal and external components. As shown in FIG. 17, flexible internal and external components of device 1700 may include a flexible display such as flexible display 1714, a flexible housing such as flexible housing 1712, a flexible logic board such as flexible printed circuit 1740, and a flexible electrochemical cell 1734 as described herein. As shown in FIG. 17, flexible electrochemical cell 1734 may, if desired, include one or more layers. In more detail, FIG. 17 depicts a flexible display 1714 that may include bent sidewall portions 1738 that are bent to be mounted adjacent to a flexible housing sidewall such as sidewall portions 1712S of housing 1712. Housing 1712 may include a rear portion such as flexible rear housing wall that provides device 1700 with a flexible rear surface. Flexible housing 1712, flexible display 1714, flexible electrochemical cell 1734, and flexible printed circuit 1740 may allow flexible device 1700 to be flexed out of, for example, an x-y plane into a z dimension as shown in FIG. 17. Flexible housing 1712, flexible display 1714, flexible electrochemical cell 1734 and flexible printed circuit 1740 may be able to be flexed about an axis that is parallel to the y-axis (shown in FIG. 17), about an axis that is parallel to the x-axis, and/or about an axis that is parallel to the z-axis. See US 2018/0260072, which is incorporated by reference in its entirety, for further information regarding the construction of such flexible electronic devices, which is incorporated by reference in its entirety. See also US 2018/0063968, which is incorporated by reference in its entirety, regarding methods of making flexible circuit boards.

Figure 18:
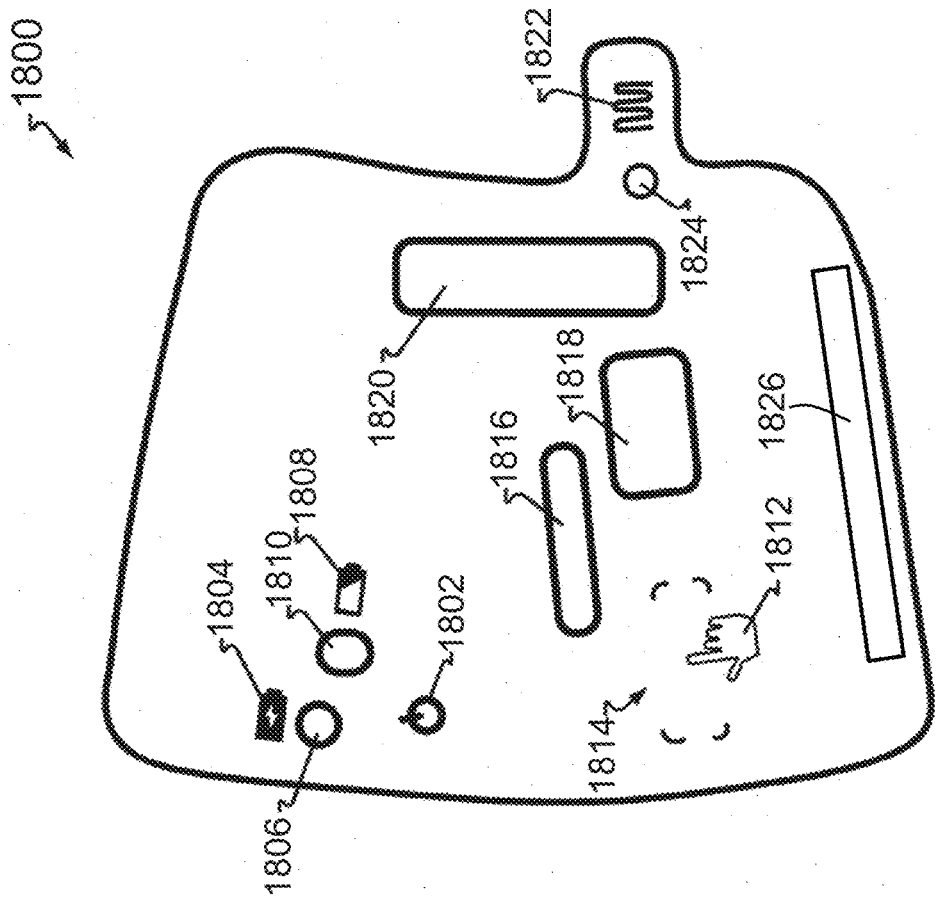
FIG. 18 is a depiction of a wearable electrochemical device 1800 that can be embedded, placed or incorporated into an apparel product.

FIG. 18 depicts a smart wearable sensing and illumination integrated fabric electrochemical device that can be embedded, placed, or incorporated into an apparel product, such as a sleeve of a jacket or shirt, a pant leg of shorts or pants, or a shirt, jacket, coat, dress, hat gloves, socks, or shoes, or any sports apparel such as running shoes. The component may comprise a GPS, an accelerometer, or device that can detect user biometrics and transmit the data to a connected wireless computing device, such as a smart phone, tablet computer, and the like, and provide illumination for identification in darkness or low light conditions or illumination to indicate a sensing function is occurring. In one embodiment, the wearable electrochemical device comprises a flexible electrochemical cell 1826 described herein providing electrical power to the wearable device; a flexible output providing a data output; a flexible input receiving a data input; and a processor to provide the data output in response to the data input and powered by the flexible electrochemical cell. In one embodiment, wearable electrochemical device 1800 is a thin, flexible form factor, such as fabric or textile and is operable to attach to a user and/or attach to or be embedded into a user's clothing. Wearable electrochemical device 1800 comprises a flexible printed circuit board (PCB) assembly, illuminating components, pressure sensor, LED matrix display, rechargeable flexible electrochemical cell, wireless charging antenna, and Bluetooth Low Energy (BLE) connectivity. Wearable electrochemical device 1800 comprises a number of components. The number of components may be interconnected with flexible wiring for the conduction of power and/or data signals between any two or more of the number of components. Alternatively, at least two of the number of components may utilize wireless connectivity for the exchange of data signals, such as radio frequency, infrared, sound, and/or other mechanical or electromagnetic medium. In one embodiment, components may include one or more of on-off button 1802, charging indicator icon 1804, charging indicator 1806, battery status icon 1808, battery status indicator 1810, plastic fiber optic (POF) lighting 1816, display 1818, electroluminescent tape (EL) lighting 1820, wakeup button 1824, heater/temperature sensor 1822, pressure sensor icon 1812, and/or pressure sensor area 1814. The wearable electrochemical device 1800 further comprises or is attached to a flexible electrochemical cell. In another embodiment, the number of components or at least a portion of one or more of the number of components, of wearable electrochemical device 1800 may be encapsulated between two plastic films. The film may include, but is not limited to, 3M 8673 Polyurethane Protective Tape and Argotec 46510 Thermoplastic Polyurethane. In another embodiment, high form components, such as those protruding out of the encapsulation, may be coated with an epoxy, including but not limited to 3M DP105 epoxy adhesive, such as to maintain waterproofing. Ultrasonic welding and/or other fusing/adhering may be implemented such as to increase waterproofing of the encapsulation of the one or more components. In another embodiment, the apparel product further comprises an electronic device that heats the apparel product. See, US 2018/0184727, which is incorporated by reference in its entirety, for further information regarding the construction of such flexible fabric containing electrochemical devices.

Figure 19:
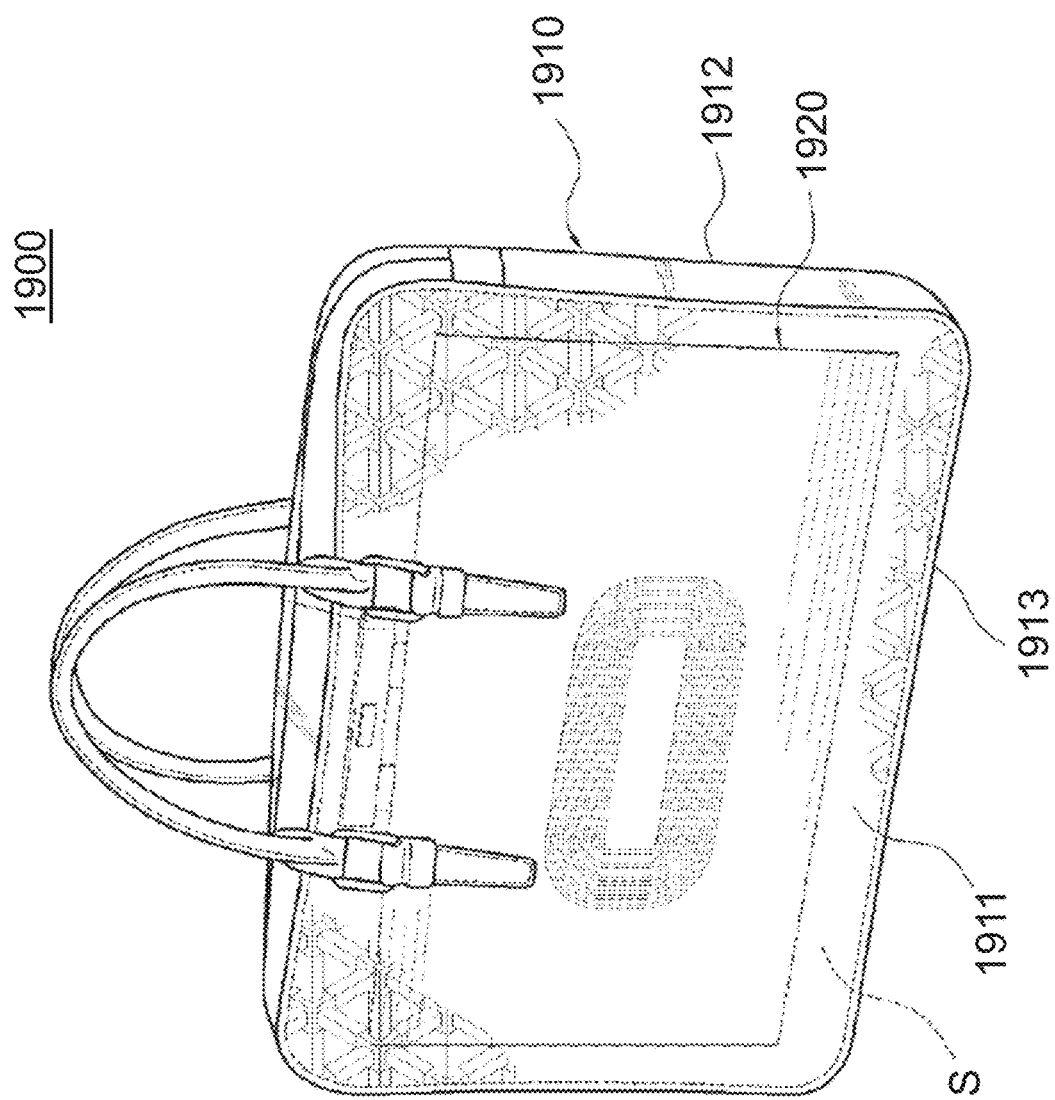
FIG. 19 depicts a portable article container including an accommodation main body and a flexible electrochemical cell 1920.

FIG. 19 depicts a portable article container 1900 including: a accommodation main body which is portable and includes an accommodation portion configured to accommodate an article; a flexible electrochemical cell 1920 as described herein configured to provide power to charge a main battery of a portable electronic device; and at least one charging unit configured to transmit power stored in the battery to the portable electronic device through at least one method of a wireless method and a wired method. The accommodation main body may be a bag body including one among a hiking bag, a backpack, a handbag, a briefcase, and a bookbag. Each of the accommodation main bodies includes a front portion 1911, a rear portion 1912, and a bottom portion 1913, which form an exterior thereof, and an accommodation portion S for storing articles is formed by the front portion 1911, the rear portion 1912, and the bottom portion 1913. As illustrated in FIG. 19, the portable article container may be a type of handbag including a shoulder bag, a cross bag, a clutch bag, a tote bag, and the like. A electrochemical cell having flexibility is used as the battery 1920 to reduce a total weight and to achieve thinning. See US 2018/0055175, which is incorporated by reference in its entirety, for more information regarding the construction of such portable articles.

Figure 20:
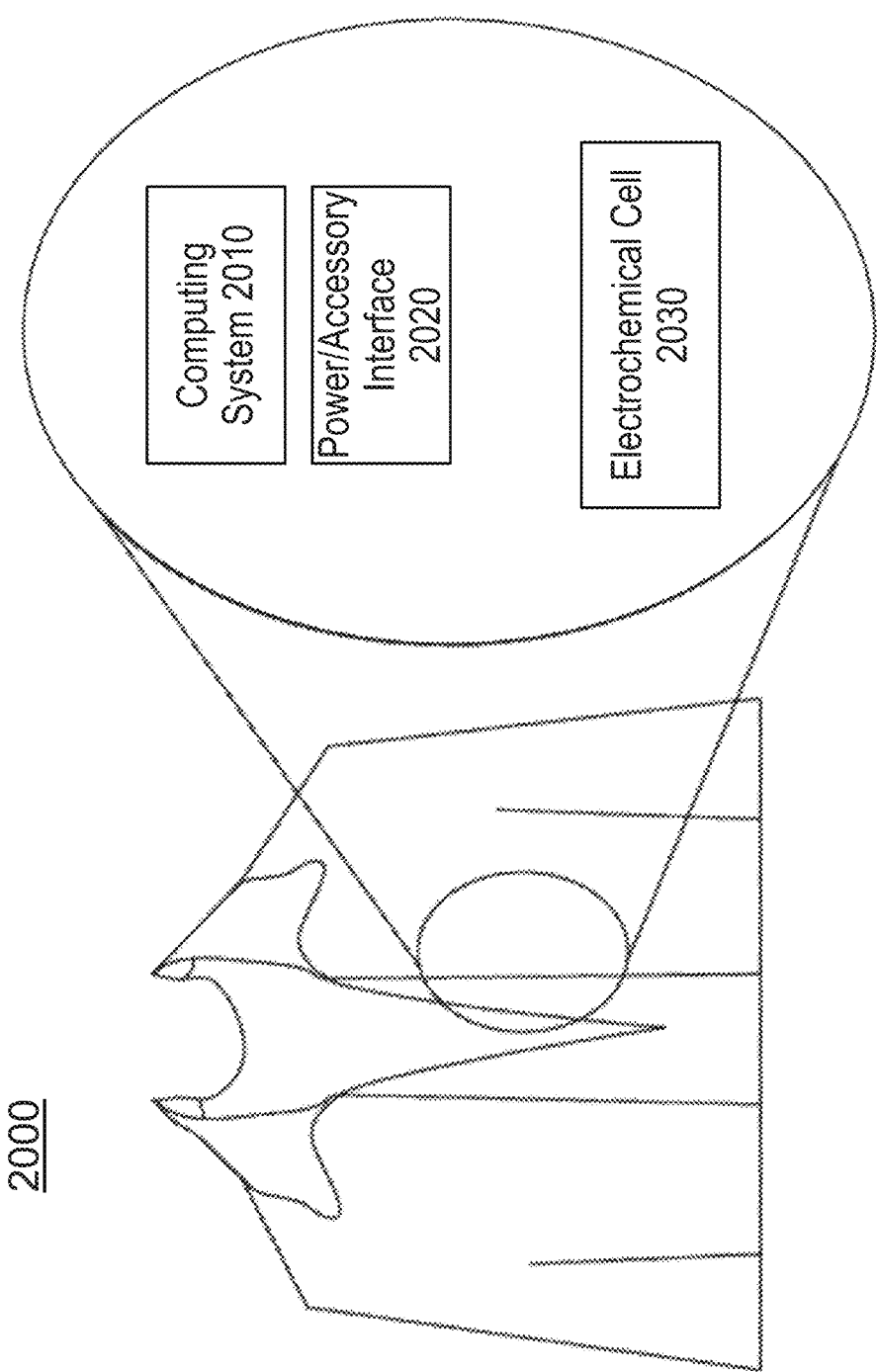
FIG. 20 depicts a wearable article of clothing 2000 depicted as a coat comprising an electrochemical device comprising a computing system 2010, a power accessory interface 2020, a flexible electrochemical cell 2030, all disposed within a housing.
Figure 21:
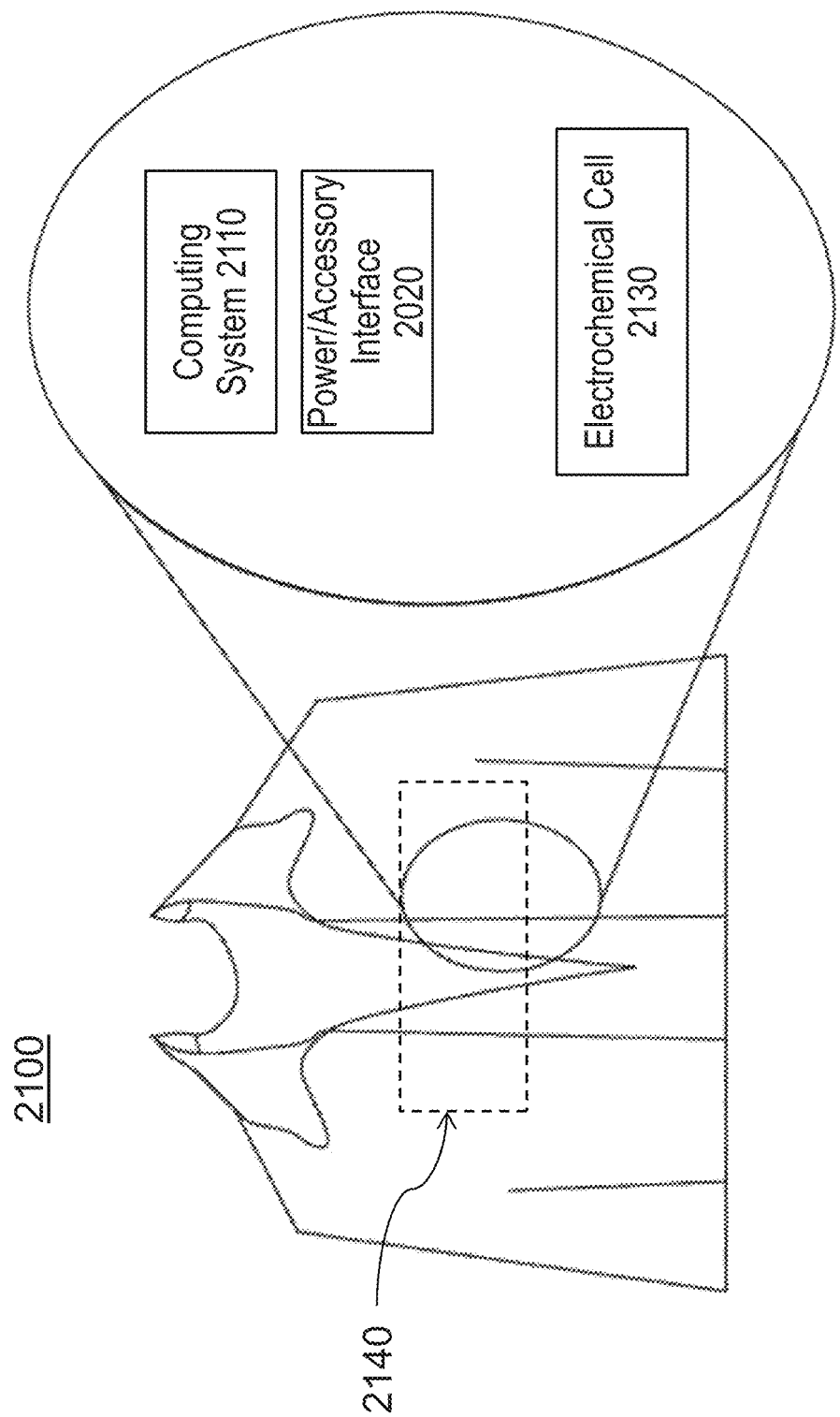
FIG. 21 depicts a wearable article of clothing 2100 depicted as a coat comprising an electrochemical device comprising a computing system 2110, a power accessory interface 2020, a flexible electrochemical cell 2130, all disposed within a housing, the article of clothing further comprising a heating element 2140.

FIG. 20 depicts an article of clothing 2000 comprising a wearable device comprising: a computing system 2010, a power accessory interface 2020, and a flexible electrochemical cell 2030 as described herein, all disposed within a housing. The electrical contact between the electrical components may be wired or wireless. The article of clothing 2000 is depicted as a coat. However, the article of clothing 2000 can be implemented in any type of clothing or other wearable device. For example, the article of clothing can be a jacket, shirt, pant leg of shorts or pants, in a shirt, jacket, coat, dress, hat, gloves, socks, or shoes, or any sports apparel such as running shoes. FIG. 21 also depicts the article of clothing 2100 in the form of a coat and further comprising a heating element 2140 in electrical contact with the flexible electronic cell 2130. The electrical contact may be wired or wireless. See US 2017/0288179, which is incorporated by reference in its entirety, for more information regarding the construction of such werable devices.

In addition to the various embodiments described above, the present disclosure includes the following specific embodiments numbered E1 through E121. This list of embodiments is presented as an exemplary list and the application is not limited to these embodiments.

E1. An electrochemical cell, comprising:
(a) a positive electrode;
(b) a negative electrode; and
(c) an electrolyte between and/or infiltrating the (a) positive electrode and (b) the negative electrode comprising:
(i) at least one metal salt; and
(ii) at least one ionic liquid;
wherein at least one electrode comprises carbon fiber, and wherein the diameter of the carbon fiber is between about 2 μm and about 22 μm.

E2. The electrochemical cell of E1, wherein the electrolyte further comprises: (iii) at least one polymerized monomer.

E3. The electrochemical cell of E1 or E2, wherein the diameter of the carbon fiber is between about 5 μm and about 10 μm.

E4. The electrochemical cell of any one of E1-E3, wherein the at least one metal salt comprises an anion selected from the group consisting of bis(trifluoromethane sulfonyl)imide (TFSI$^-$), trifluoromethane sulfonate (TF$^-$), bis(fluorosulfonyl) imide (FSI$^-$), tetrafluorophosphate (BF$_4^-$), hexafluorophosphate (PF$_6^-$), bis (pentafluoroethane sulfonyl)imide (BETI$^-$), 4,5-dicyano-2-trifluoromethanoimidazole (DCMI$^-$), [fluoro (nonafluorobutane) sulfonyl]imide (FNF$^-$), perchlorate (ClO$_4^-$), sulfate (SO$_4^-$), and nitrate (NO$_3^-$).

E5. The electrochemical cell of any one of E1-E4, wherein the at least one metal salt comprises a metal ion selected from the group consisting of Li$^+$, Na$^+$, K$^+$, Mg$^{2+}$, and Al$^{3+}$.

E6. The electrochemical cell of any one of E1-E5, wherein the at least one metal salt comprises an anion selected from the group consisting of bis(trifluoromethane sulfonyl)imide (TFSI$^-$), trifluoromethane sulfonate (TF$^-$), bis(fluorosulfonyl) imide (FSI$^-$), tetrafluorophosphate (BF$_4^-$), hexafluorophosphate (PF$_6^-$), bis (pentafluoroethane sulfonyl)imide (BETI$^-$), 4,5-dicyano-2-trifluoromethanoimidazole (DCMI$^-$), and [fluoro (nonafluorobutane) sulfonyl]imide (FNF$^-$).

E7. The electrochemical cell of any one of E1-E6, wherein the at least one metal salt is selected from the group consisting of LiTFSI, LiTF, LiFSI, LiBETI, LiDCMI, LiFNF, LiClO$_4$, LiSO$_4$, LiNO$_3$, NaTFSI, NaTF, NaFSI, NaBETI, NaDCMI, NaFNF, NaClO$_4$, NaSO$_4$, NaNO$_3$, KTFSI, KTF, KFSI, KBETI, KDCMI, KFNF, KClO$_4$, KSO$_4$, KNO$_3$, Mg(TFSI)$_2$, Mg(TF)$_2$, Mg(FSI)$_2$, Mg(BETI)$_2$, Mg(DCMI)$_2$, Mg(FNF)$_2$, Mg(ClO$_4$)$_2$, Mg(SO$_4$)$_2$, Mg(NO$_3$)$_2$, Al(TFSI)$_3$, Al(TF)$_3$, Al(FSI)$_3$, Al(BETI)$_3$, Al(DCMI)$_3$, Al(FNF)$_3$, Al(ClO$_4$)$_3$, Al(SO$_4$)$_3$, and Al(NO$_3$)$_3$.

E8. The electrochemical cell of any one of E1-E7, wherein the at least one metal salt is selected from the group consisting of LiTFSI, LiTF, NaTFSI, NaFSI, KTFSI, KBETI, and Mg(TFSI)$_2$.

E9. The electrochemical cell of any one of E1-E8, wherein the at least one metal salt is LiTFSI or LiFSI.

E10. The electrochemical cell of any one of E1-E9, wherein the weight percentage of the at least one metal salt in the electrolyte is between about 0.5% and about 30%.

E11. The electrochemical cell of any one of E1-E10, wherein the weight percentage of the at least one metal salt in the electrolyte is between about 10% and about 20%.

E12. The electrochemical cell of any one of E1-E11, wherein the at least one ionic liquid comprises a cation selected from the group consisting of imidazolium, pyrrolidinium, pyridinium, phosphonium, ammonium, and sulfonium.

E13. The electrochemical cell of any one of E1-E12, wherein the ionic liquid comprises an anion selected from the group consisting of tosylate ($-SO_2C_6H_4CH_3$), methanesulfonate ($-OSO_2CH_3$), bis(trifluoromethylsulfonyl) imide ($TFSI^-$), tetrafluorophosphate ($BF_4^-$), hexafluorophosphate ($PF_6^-$), halide, triflate ($TF^-$), [fluoro (nonafluorobutane) sulfonyl]imide ($FNF^-$), chlorate ($ClO_4^-$), and sulfate ($SO_4^-$).

E14. The electrochemical cell of any one of E1-E13, wherein the at least one ionic liquid comprises 1-ethyl-3-methylimidazolium bis(trifluoromethanesulfonyl) imide or 1-ethyl-3-methylimidazolium bis(fluorosulfonyl) imide.

E15. The electrochemical cell of any one of E1-E14, wherein the molality of the at least one metal salt in the at least one ionic liquid is between about 0.1 mol/kg and about 3 mol/kg.

E16. The electrochemical cell of any one of E1-E15, wherein the weight percentage of the ionic liquid in the electrolyte is between about 15% and about 80%.

E17. The electrochemical cell of any one of E1-E16, wherein the weight percentage of the ionic liquid in the electrolyte is between about 25% and about 65%.

E18. The electrochemical cell of any one of E1-E17, wherein the electrolyte comprises between 1 and 5 polymerized monomers.

E19. The electrochemical cell of any one of E1-E18, wherein the electrolyte comprises 1 polymerized monomer.

E20. The electrochemical cell of any one of E1-E19, wherein the at least one polymerized monomer is a polymerized acrylic monomer or a polymerized epoxide monomer.

E21. The electrochemical cell of any one of E1-E20, wherein the at least one polymerized monomer is a polymerized acrylic monomer selected from the group consisting of polymerized tetraethylene glycol dimethacrylate, polymerized methoxy polyethylene glycol monoacrylate, polymerized ethoxylated pentaerythritol tetraacrylate, and polymerized propoxylated glyceryl triacrylate.

E22. The electrochemical cell of any one of E1-E21, wherein the at least one polymerized monomer is a polymerized epoxide monomer selected from the group consisting of polymerized allyl glycidyl ether, polymerized bis [4-(glycidyloxy)phenyl]methane, polymerized 1,3-butanediene diepoxide, polymerized 1,4-butanediol diglycidyl ether, polymerized 1,4-butanediol diglycidyl ether, polymerized butyl glycidyl ether, polymerized tert-butyl glycidyl ether, polymerized cyclohexene oxide, polymerized cyclopentene oxide, polymerized dicyclopentadiene dioxide, polymerized 1,2,5,6-diepoxycyclooctance, polymerized 1,2,7,8-diepoxyoctane, polymerized diglycidyl 1,2-cyclohexanedicarboxylate, polymerized N,N-diglycidyl-4-glycidyloxyaniline, polymerized 1,2-epoxybutane, polymerized cis-2,3-epoxybutane, polymerized 3,4-epoxy-1-butene, polymerized 3,4-epoxycyclohexylmethyl 3,4-epoxylcyclohexylmethylcarboxylate, polymerized 1,2-epoxydodecane, polymerized 1,2-epoxyhexane, polymerized 1,2-epoxy-5-hexane, polymerized 1,2-epoxy-2-methylpropane, polymerized exo-2,3-epoxynorbornane, 1,2-epoxyoctane, polymerized 1,2-epoxypentane, polymerized 1,2-epoxy-3-phenoxypropane, (2,3-epoxypropyl)benzene, polymerized N-(2,3-epoxypropyl) phthalimide, polymerized 1,2-epoxytetradecane, polymerized exo-3,6-epoxy-1,2,3,6-tetrahydrophthlaic anhydride, polymerized 3,4-epoxytetrahydrothiophene-1,1-dioxide, polymerized 2-ethylhexyl glycidyl ether, polymerized furfuryl glycidyl ether, polymerized glycerol diglycidyl ether, polymerized glycidyl hexadecyl ether, polymerized glycidyl isopropyl ether, polymerized glycidyl 4-methoxyphenyl ether, polymerized glycidyl 2-methylphenyl ether, polymerized glyciyl 2,2,3,3,4,4,5,5-octafluoropentyl ether, glycidyl 2,2,3,3-tetrafluropropyl ether, polymerized (2,2,3,3,4,4,5,5,6,6,7,7,8,8,9,9,9-heptadecafluorononyl) oxirane, polymerized 2-hydroxy-3-{3-[2,4,6,8-tetramethyl-4,6,8-tris(propyl glycidyl ether)-2-cyclotetrasiloxanyl]propoxy} propyl methacrylate, polymerized isophorone oxide, polymerized 4,4'-methylenebis(N,N-diglycidylaniline), polymerized methyl trans-3-(4-methoxyphenyl)glycidate, polymerized 2-methyl-2-vinyloxirane, polymerized neopentyl glycol diglycidyl ether, polymerized α-pinene oxide, polymerized (±)-propylene oxide, polymerized resorcinol giglycidyl ether, polymerized cis-stilbene oxide, polymerized styrene oxide, polymerized tris(2,3-epoxypropyl) isocanurate, polymerized tris(4-hydroxyphenyl) methane triglycidyl ether, and polymerized urethane epoxy methacrylate.

E23. The electrochemical cell of any one of E1-22, wherein the weight averaged molecular weight of the at least one monomer before polymerizing is between about 50 g/mol and about 10,000 g/mol.

E24. The electrochemical cell of any one of E1-E23, wherein the weight averaged molecular weight of the at least one monomer before polymerizing is between about 300 g/mol and about 700 g/mol.

E25. The electrochemical cell of any one of E1-E24, wherein the electrolyte comprises 2 polymerized monomers.

E26. The electrochemical cell of E25, wherein the weight ratio of the first monomer before crosslinking to the second monomer before polymerizing is between about 1:1 to 1:10.

E27. The electrochemical cell of E1-E26, wherein the weight ratio of the total polymerized monomer weight to the total ionic liquid weight is between about 10:1 to 1:10.

E28. The electrochemical cell of any one of E1-E27, wherein the weight percentage of the at least one polymerized monomer to the electrolyte is between about 15% and about 70%.

E29. The electrochemical cell of any one of E1-E28, wherein the weight percentage of the at least one polymerized monomer to the electrolyte is between about 30% and about 60%.

E30. The electrochemical cell of any one of E1-E29, wherein the electrolyte further comprises:
(iv) at least one polymer initiator.

E31. The electrochemical cell of E30, wherein the electrolyte comprises one polymer initiator.

E32. The electrochemical cell of E30 or E31, wherein the polymer initiator is a thermal initiator or a photoinitiator.

E33. The electrochemical cell of any one of E30-E32, wherein the polymer initiator is a thermal initiator selected from the group consisting of tert-amyl peroxybenzoate, 4,4-azobis(4-cyanovaleric acid), 1,1'-azobis (cyclohexanecarbonitrile), 2,2'-azobisisobutyronitrile (AIBN), benzoyl peroxide, 2,2-bis(tert-butylperoxy) butane, 1,1-bis(tert-butylperoxy) cyclohexane, 2,5-bi (tert-butylperoxy)-2,5-dimethylhexane, 2,5-bi (tert-butylperoxy)2,5-dimethylhexane, 2,5-bi (tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

E34. The electrochemical cell of any one of E30-E33, wherein the polymer initiator is tert-butyl peroxide.

E35. The electrochemical cell of any one of E30-E34, wherein the weight percentage of the polymer initiator to the electrolyte is between about 0.1% and about 5%.

E36. The electrochemical cell of any one of E1-E35, wherein the ionic conductivity of the electrolyte at 25° C. is between about 0.1 mS/cm and about 2 mS/cm.

E37. The electrochemical cell of any one of E1-E36, wherein the ionic conductivity of the electrolyte at 25° C. is between about 0.1 mS/cm and about 1 mS/cm.

E38. The electrochemical cell of any one of E1-E37, wherein the positive electrode comprises lithium, magnesium, aluminum, zinc, chromium, iron, nickel, tin, lead, copper, silver, palladium, mercury, platinum, gold, a metal alloy, a metal oxide, a phosphate, a sulfide, graphite, carbon fiber, carbon powder, carbon black, acetylene black, or a combination thereof.

E39. The electrochemical cell of any one of E1-E38, wherein the positive electrode comprises graphite.

E40. The electrochemical cell of any one of E1-E38, wherein the positive electrode comprises carbon fiber.

E41. The electrochemical cell of any one of E1-E40, wherein the negative electrode comprises lithium, magnesium, aluminum, zinc, chromium, iron, nickel, tin, lead, copper, silver, palladium, mercury, platinum, gold, a metal alloy, a metal oxide, silicon, graphite, carbon fiber, carbon powder, carbon black, acetylene black, or a combination thereof.

E42. The electrochemical cell of any one of E1-E41, wherein the negative electrode comprises carbon fiber.

E43. The electrochemical cell of any one of E1-E42, wherein the negative electrode comprises carbon fiber and the positive electrode comprises graphite.

E44. The electrochemical cell of any one of E1-E43, further comprising:
(d) a separator between the (a) positive electrode and (b) negative electrode.

E45. The electrochemical cell of E44, wherein the separator comprises cotton, a synthetic fiber, linen, a polymer fiber, a fiberglass fiber, a microporous polymer material, or a combination thereof.

E46. The electrochemical cell of any one of E1-E45, wherein the carbon fiber or carbon fiber fabric further comprises further comprises an active material.

E47. The electrochemical cell of E46, wherein the active material is selected from the group consisting of graphite, $LiCoO_2$, $LiMn_2O_4$, $LiNiMnCoO_2$, $LiFePO_4$, $LiNiCoAlO_2$, and $Li_4Ti_5O_{12}$.

E48. The electrochemical cell of any one of E1-E47, wherein the positive electrode comprises graphite, the negative electrode comprises carbon fiber, and the electrolyte comprises the metal salt LiTFSI, the ionic liquid 1-ethyl-3-methylimidazolium bis(trifluoromethanesulfonyl) imide, and the monomer tetraethylene glycol dimethacrylate.

E49. The electrochemical cell of any one of E1-E47, wherein the positive electrode comprises graphite, the negative electrode comprises carbon fiber, and the electrolyte comprises the metal salt LiTFSI, the ionic liquid 1-ethyl-3-methylimidazolium bis(trifluoromethanesulfonyl) imide, the monomer tetraethylene glycol dimethacrylate, and the monomer methoxy polyethylene glycol methacrylate.

E50. A method of preparing the electrolyte of E30 comprising:
(a) admixing at least one metal salt, at least one ionic liquid, at least one monomer, and at least one initiator; and
(b) heating the admixture of (a) or subjecting the admixture of (a) to ultraviolet light.

E51. The method of E50, wherein the admixing in (a) is at a temperature between about 0° C. and about 80° C.

E52. The method of E50 or E51, wherein the admixing in (a) is for a time between about 5 minutes and about 24 hours.

E53. The method of any one of E50-E52, wherein the heating in (b) is to an elevated temperature between about 100° C. and about 310° C.

E54. The method of any one of E50-E53, wherein the heating in (b) is to an elevated temperature between about 100° C. and about 160° C.

E55. The method of any one of E50-E54, wherein the heating in (b) is maintained for between about 10 minutes and about 10 hours.

E56. The method of any one of E50-E55, wherein the heating in (b) is maintained for between about 1 hour and about 5 hours.

E57. The method of any one of E50-E56, further comprising:
(c) cutting the mixture formed in (b) to form a shape, for example, a disk, a square, a rectangle or a strip.

E58. An electrochemical device comprising:
(a) an electrochemical cell comprising a positive electrode, a negative electrode, and an electrolyte between the positive electrode and the negative electrode, wherein at least one electrode comprises carbon fiber, wherein the diameter of the carbon fiber is between about 2 μm and about 22 μm, and wherein the electrolyte comprises:
(i) at least one metal salt;
(ii) at least one ionic liquid; and
(b) at least one electronic device; and
(c) at least one wire connecting the electrochemical cell and the electronic device.

E59. The electrochemical device of E58, wherein the electrolyte further comprises:
(iii) at least one polymerized monomer.

E60. The electrochemical device of E58 or E59, wherein the diameter of the carbon fiber is between about 5 μm and about 10 μm.

E61. The electrochemical device of any one of E58-E60, wherein the at least one metal salt comprises an anion selected from the group consisting of bis(trifluoromethane sulfonyl)imide (TFSI$^-$), trifluoromethane sulfonate (TF$^-$), bis(fluorosulfonyl) imide (FSI$^-$), tetrafluorophosphate (BF$_4^-$), hexafluorophosphate (PF$_6^-$), bis (pentafluoroethane sulfonyl)imide (BETI$^-$), 4,5-dicyano-2-trifluoromethanoimidazole (DCMI$^-$), [fluoro (nonafluorobutane) sulfonyl]imide (FNF$^-$), perchlorate (ClO$_4^-$), sulfate (SO$_4^-$), and nitrate (NO$_3^-$).

E62. The electrochemical device of any one of E58-E61, wherein the at least one metal salt comprises a metal ion selected from the group consisting of Li$^+$, Na$^+$, K$^+$, Mg$^{2+}$, and Al$^{3+}$.

E63. The electrochemical device of any one of E58-E62, wherein the at least one metal salt comprises an anion selected from the group consisting of bis(trifluoromethane sulfonyl)imide (TFSI$^-$), trifluoromethane sulfonate (TF$^-$), bis(fluorosulfonyl) imide (FSI$^-$), tetrafluorophosphate (BF$_4^-$), hexafluorophosphate (PF$_6^-$), bis (pentafluoroethane sulfonyl)imide (BETI$^-$), 4,5-dicyano-2-trifluoromethanoimidazole (DCMI$^-$), and [fluoro (nonafluorobutane) sulfonyl]imide (FNF$^-$).

E64. The electrochemical device of any one of E58-E63, wherein the at least one metal salt is selected from the group consisting of LiTFSI, LiTF, LIFSI, LiBETI, LiDCMI, LiFNF, LiClO$_4$, LiSO$_4$, LiNO$_3$, NaTFSI, NaTF, NaFSI, NaBETI, NaDCMI, NaFNF, NaClO$_4$, NaSO$_4$, NaNO$_3$, KTFSI, KTF, KFSI, KBETI, KDCMI, KFNF, KClO$_4$, KSO$_4$, KNO$_3$, Mg(TFSI)$_2$, Mg(TF)$_2$, Mg(FSI)$_2$, Mg(BETI)$_2$, Mg(DCMI)$_2$, Mg(FNF)$_2$, Mg(ClO$_4$)$_2$, Mg(SO$_4$)$_2$, Mg(NO$_3$)$_2$, Al(TFSI)$_3$, Al(TF)$_3$, Al(FSI)$_3$, Al(BETI)$_3$, Al(DCMI)$_3$, Al(FNF)$_3$, Al(ClO$_4$)$_3$, Al(SO$_4$)$_3$, and Al(NO$_3$)$_3$.

E65. The electrochemical device of any one of E58-E64, wherein the at least one metal salt is selected from the group consisting of LiTFSI, LiTF, NaTFSI, NaFSI, KTFSI, KBETI, and Mg(TFSI)$_2$.

E66. The electrochemical device of any one of E58-E65, wherein the at least one metal salt is LiTFSI or LiFSI.

E67. The electrochemical device of any one of E58-E66, wherein the weight percentage of the at least one metal salt in the electrolyte is between about 0.5% and about 30%.

E68. The electrochemical device of any one of E58-E67, wherein the weight percentage of the at least one metal salt in the electrolyte is between about 10% and about 20%.

E69. The electrochemical device of any one of E58-E68, wherein the at least one ionic liquid comprises a cation selected from the group consisting of imidazolium, pyrrolidinium, pyridinium, phosphonium, ammonium, and sulfonium.

E70. The electrochemical device of any one of E58-E69, wherein the ionic liquid comprises an anion selected from the group consisting of tosylate (—SO$_2$C$_6$H$_4$CH$_3$), methanesulfonate (—OSO$_2$CH$_3$), bis(trifluoromethylsulfonyl) imide (TFSI$^-$), tetrafluorophosphate (BF$_4^-$), hexafluorophosphate (PF$_6^-$), halide, triflate (TF$^-$), [fluoro (nonafluorobutane) sulfonyl]imide (FNF$^-$), chlorate (ClO$_4^-$), and sulfate (SO$_4^-$).

E71. The electrochemical device of any one of E58-E70, wherein the at least one ionic liquid comprises 1-ethyl-3-methylimidazolium bis(trifluoromethanesulfonyl) imide or 1-ethyl-3-methylimidazolium bis(fluorosulfonyl) imide.

E72. The electrochemical device of any one of E58-E71, wherein the molality of the at least one metal salt in the at least one ionic liquid is between about 0.1 mol/kg and about 3 mol/kg.

E73. The electrochemical device of any one of E58-E72, wherein the weight percentage of the ionic liquid in the electrolyte is between about 15% and about 60%.

E74. The electrochemical device of any one of E58-E73, wherein the weight percentage of the ionic liquid in the electrolyte is between about 25% and about 50%.

E75. The electrochemical device of any one of E58-E74, wherein the electrolyte comprises between 1 and 5 polymerized monomers.

E76. The electrochemical device of any one of E58-E75, wherein the electrolyte comprises 1 polymerized monomer.

E77. The electrochemical device of any one of E58-E76, wherein the at least one polymerized monomer is a polymerized acrylic monomer or a polymerized epoxide monomer.

E78. The electrochemical device of any one of E58-E77, wherein the at least one polymerized monomer is an acrylic monomer selected from the group consisting of polymerized tetraethylene glycol dimethacrylate, polymerized methoxy polyethylene glycol monoacrylate, polymerized ethoxylated pentaerythritol tetraacrylate, and polymerized propoxylated glyceryl triacrylate.

E79. The electrochemical device of any one of E58-E78, wherein the at least one polymerized monomer is a polymerized epoxide monomer selected from the group consisting of polymerized allyl glycidyl ether, polymerized bis [4-(glycidyloxy)phenyl]methane, polymerized 1,3-butanediene diepoxide, polymerized 1,4-butanediol diglycidyl ether, polymerized 1,4-butanediol diglycidyl ether, polymerized butyl glycidyl ether, polymerized tert-butyl glycidyl ether, polymerized cyclohexene oxide, polymerized cyclopentene oxide, polymerized dicyclopentadiene dioxide, polymerized 1,2,5,6-diepoxycyclooctance, polymerized 1,2,7,8-diepoxyoctane, polymerized diglycidyl 1,2-cyclohexanedicarboxylate, polymerized N,N-diglycidyl-4-glycidyloxyaniline, polymerized 1,2-epoxybutane, polymerized cis-2,3-epoxybutane, polymerized 3,4-epoxy-1-butene, polymerized 3,4-epoxycyclohexylmethyl 3,4-epoxylcyclohexylmethylcarboxylate, polymerized 1,2-epoxydodecane, polymerized 1,2-epoxyhexane, polymerized 1,2-epoxy-5-hexane, polymerized 1,2-epoxy-2-methylpropane, polymerized exo-2,3-epoxynorbornane, polymerized 1,2-epoxyoctane, polymerized 1,2-epoxypentane, polymerized 1,2-epoxy-3-phenoxypropane, polymerized (2,3-epoxypropyl)benzene, polymerized N-(2,3-epoxypropyl) phthalimide, polymerized 1,2-epoxytetradecane, polymerized exo-3,6-epoxy-1,2,3,6-tetrahydrophthlaic anhydride, polymerized 3,4-epoxytetrahydrothiophene-1,1-dioxide, polymerized 2-ethylhexyl glycidyl ether, polymerized furfuryl glycidyl ether, polymerized glycerol diglycidyl ether, polymerized glycidyl hexadecyl ether, polymerized glycidyl isopropyl ether, polymerized glycidyl 4-methoxyphenyl ether, polymerized glycidyl 2-methylphenyl ether, polymerized glyciyl 2,2,3,3,4,4,5,5-octafluoropentyl ether, polymerized glycidyl 2,2,3,3-tetrafluropropyl ether, polymerized (2,2,3,3,4,4,5,5,6,6,7,7,8,8,9,9,9-heptadecafluorononyl) oxirane, polymerized 2-hydroxy-3-{3-[2,4,6,8-tetramethyl-4,6,8-tris(propyl glycidyl ether)-2-cyclotetrasiloxanyl]propoxy} propyl methacrylate, polymerized isophorone oxide, polymerized 4,4'-methylenebis(N,N-diglycidylaniline), polymerized methyl trans-3-(4-methoxyphenyl)glycidate, polymerized 2-methyl-2-vinyloxirane, polymerized neopentyl glycol diglycidyl ether, polymerized a-pinene oxide, polymerized (±)-propylene oxide, polymerized resorcinol giglycidyl ether, polymerized cis-stilbene oxide, polymerized styrene oxide, polymerized tris(2,3-epoxypropyl) isocanurate, polymerized tris(4-hydroxyphenyl) methane triglycidyl ether, and polymerized urethane epoxy methacrylate.

E80. The electrochemical device of any one of E58-E79, wherein the weight averaged molecular weight of the at least one monomer before polymerizing is between about 50 g/mol and about 10,000 g/mol.

E81. The electrochemical device of any one of E58-E80, wherein the weight averaged molecular weight of the at least one monomer before polymerizing is between about 300 g/mol and about 700 g/mol.

E82. The electrochemical device of any one of E58-E81, wherein the electrolyte comprises 2 polymerized monomers.

E83. The electrochemical device of E82, wherein the weight ratio of the first polymerized monomer to the second polymerized monomer is between about 1:1 to 1:10.

E84. The electrochemical device of any one of E58-E83, wherein the weight ratio of the total polymerized monomer weight to the total ionic liquid weight is between about 10:1 to 1:10.

E85. The electrochemical device of any one of E58-E84, wherein the weight percentage of the at least one polymerized monomer to the electrolyte is between about 15% and about 70%.

E86. The electrochemical device of any one E58-E85, wherein the weight percentage of the at least one polymerized monomer to the electrolyte is between about 30% and about 60%.

E87. The electrochemical device of any one of E58-E86, wherein the ionic conductivity of the electrolyte at 25° C. is between about 0.1 mS/cm and about 2 mS/cm.

E88. The electrochemical device of any one of E58-E87, wherein the ionic conductivity of the electrolyte at 25° C. is between about 0.1 mS/cm and about 1 mS/cm.

E89. The electrochemical device of any one of E58-E88, wherein the positive electrode comprises lithium, magnesium, aluminum, zinc, chromium, iron, nickel, tin, lead, copper, silver, palladium, mercury, platinum, gold, a metal alloy, a metal oxide, silicon, graphite, carbon fiber, carbon powder, carbon black, acetylene black, or a combination thereof.

E90. The electrochemical device of any one of E58-E89, wherein the positive electrode comprises graphite.

E91. The electrochemical device of any one of E58-E90, wherein the positive electrode comprises carbon fiber.

E92. The electrochemical device of any one of E58-E91, wherein the negative electrode comprises lithium, magnesium, aluminum, zinc, chromium, iron, nickel, tin, lead, copper, silver, palladium, mercury, platinum, gold, a metal alloy, a metal oxide, silicon, graphite, carbon fiber, carbon powder, carbon black, acetylene black, or a combination thereof.

E93. The electrochemical device of any one of E58-E92, wherein the negative electrode comprises carbon fiber.

E94. The electrochemical device of any one of E58-E93, wherein the negative electrode comprises carbon fiber and the positive electrode comprises graphite.

E95. The electrochemical device of any one of E58-E94, wherein the electrochemical cell further comprises a separator between the positive electrode and the negative electrode.

E96. The electrochemical device of E95, wherein the separator comprises cotton, a synthetic fiber, linen, a polymer fiber, a fiberglass fiber, a microporous polymer material, or a combination thereof.

E97. The electrochemical device of any one of E58-E96, wherein the carbon fiber further comprises further comprises an active material.

E98. The electrochemical device of E97, wherein the active material is selected from the group consisting of graphite, $LiCoO_2$, $LiMn_2O_4$, $LiNiMnCoO_2$, $LiFePO_4$, $LiNiCoAlO_2$, and $Li_4Ti_5O_{12}$.

E99. The electrochemical device of any one of E58-E98, wherein the positive electrode comprises graphite, the negative electrode comprises carbon fiber, and the electrolyte comprises the metal salt LiTFSI, the ionic liquid 1-ethyl-3-methylimidazolium bis(trifluoromethanesulfonyl) imide, and the polymerized monomer tetraethylene glycol dimethacrylate.

E100. The electrochemical device of any one of E58-E99, wherein the positive electrode comprises graphite, the negative electrode comprises carbon fiber, and the electrolyte comprises the metal salt LiTFSI, the ionic liquid 1-ethyl-3-methylimidazolium bis(trifluoromethanesulfonyl) imide, the polymerized monomer tetraethylene glycol dimethacrylate, and the polymerized monomer methoxy polyethylene glycol methacrylate.

E101. The electrochemical device of any one of E58-E100, wherein the electrochemical device is flexible.

E102. The electrochemical device of any one of E58-E101, wherein the electrochemical device can be worn about an appendage of a wearer.

E103. The electrochemical device of any one of E58-E102, wherein the electrochemical device can be worn about a wrist, a bicep, an ankle, or a leg of a wearer.

E104. The electrochemical device of any one of E58-E103, wherein the electronic device is a health-related sensor, a communications device, an environmental sensor, an electronic display, an electrochromic device, or a combination thereof.

E105. The electrochemical device of any one of E58-E104, wherein the electronic device is a strain sensor, a pressure sensor, a light sensor, an external temperature sensor, a body-temperature sensor, a sweat sensor, a vibration sensor, an antenna, a light emitting diode, a liquid crystal display, a quantum dot display, an electrochromic device, a cooling device, a supercapacitor, or a combination thereof.

E106. The electrochemical device of any one of E58-E105, wherein the electronic device is a strain sensor that measures motion, blood pulse, breathing, bending, or a combination thereof.

E107. The electrochemical device of any one of E58-E106, wherein the electrochemical device is implanted into a wearer.

E108. The electrochemical device of E107, wherein the electronic device is an electrode, a cardiac temperature sensor, an optogenetic light delivery sensor, a biodegradable microsupercapacitor, a biodegradable battery, an energy harvestor, or a combination thereof.

E109. The electrochemical device of any one of E58-E108, wherein the electronic device is an electrode that monitors electromyography (EMG) data, electrooculography (EOG) data, stimulation, blood pressure, blood-sugar levels, electrolyte levels, metabolite levels, brain activity, muscle activity, electrocardiogramata, biventricular pacing, or a combination thereof.

E110. The electrochemical device of any one of E58-E109, wherein the electrochemical device is non-wearable.

E111. The electrochemical device of E110, wherein the electrochemical device is used in an asset-monitoring tag, in a tent, on a sail, or in banknotes.

E112. The electrochemical device of any one of E58-E111, further comprising:
(d) a casing covering the electrochemical cell.

E113. The electrochemical device of E112, wherein the casing comprises a polymer film.

E114. The electrochemical device of E113, wherein the polymer film comprises at least one polymer selected from the group consisting of polypropylene resin, polyurethane resin, silane-terminated polymer, silicone, unsaturated polyester resin, vinyl ester resin, acrylate, polyvinyl acetate, polyvinyl alcohol, polyvinyl ether, ethylene vinyl acetate, ethylene acrylic acid copolymer, polystyrene, polyvinyl chloride, styrene-butadiene rubber, chloroprene rubber, nitrile rubber, butyl rubber, polysulfide, polyethylene, fluorinated hydrocarbon, phenol-formaldehyde resin, liquid crystal polymer, nylon, polyamide, polyimide, polyethylene terephthalate, cellulose, polymethylmethacrylate, polyolefin, polyester, cresol-formaldehyde novolac resin, cresol-formaldehyde epoxy resin, resorcinol-formaldehyde resin, urea-formaldehyde resin, melamine-formaldehyde resin, polybenzimidazole, polyamide-imide, and polysulfone.

E115. The electrochemical device of any one of E58-E114, wherein the electrochemical device is integrated into a fabric.

E116. The electrochemical device of any one of E58-E115, wherein the electrochemical device is a patch or a strap that can be attached to another piece of fabric.

E117. The electrochemical device of E116, wherein the electrochemical device comprises connectors that can connect and disconnect from a fabric.

E118. The electrochemical device of any one of E58-E117, wherein the electrochemical device is sewn into a fabric.

E119. The electrochemical device of any one of E58-E118, wherein the electrochemical device comprises between 1 and 5 wires.

E120. The electrochemical device of any one of E58-E119, wherein the electrochemical device comprises 2 wires.

E121. A gel polymer electrolyte obtained by the method of any one of E50-E57.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Synthesis of a Liquid Monomer Mixture

A sample of liquid monomer mixture for conductivity testing or cell fabrication was prepared by mixing a liquid acrylic or epoxide monomer(s), a metal salt, an ionic liquid, and a polymer initiator. The metal salt can be lithium bis(trifluoromethanesulfonyl) imide or lithium bis(fluorosulfonyl) imide. The ionic liquid can be 1-ethyl-3-methylimidazolium bis(trifluoromethanesulfonyl) imide or 1-ethyl-3-methylimidazolium bis(fluorosulfonyl) imide. The polymer initiator can be tert-butyl peroxide.

The weight ratio of one monomer to another monomer can range from 1:1 to 1:10. The weight ratio of total monomer weight to ionic liquid weight can range from 10:1 to 1:10. The weight percent of salt dissolved in the other components can range from 0.5% to 30%. The weight percent of initiator chemical in the other components can range from 0.1% to 5%. The four components (metal salt, ionic liquid, monomer, and polymer initiator) can be mixed in any order using an electric stirrer and stir bar, a planetary centrifugal mixer, or a combination of both. The four components can be mixed at room temperature until the salt is completely dissolved, as evidenced by a completely clear liquid. This mixing time can range from 5 minutes to 24 hours.

The liquid mixture was poured or dispensed with an eyedropper into a mold or the other components of a battery. The liquid mixture was placed at an oven set to a temperature high enough to activate the initiator (140° C. when tert-butyl peroxide was used) for 30 minutes to 10 hours. After this period of heating, the liquid mixture polymerized and became a solid polymer gel.

Example 2

Ionic Conductivity of Liquid Monomer Mixture

The liquid monomer mixture of Example 1 was poured into a round silicone mold. Following the heating step, the disk of polymer gel electrolyte was removed from the mold and punched into a smaller disk with a diameter ranging from ¼ inch to ½ inch. The thickness of the disk was measured using a micrometer. This disk was placed in a Swagelok-type battery cell fixture with two electrode disks made of stainless steel. The disk can also be clamped between two stainless steel disks by any other means, as long as all components are in close contact and the two electrodes can be connected via leads to electrical instrumentation. Electrochemical impedance spectroscopy measurements were performed on the battery cell fixture with a DC current of zero amperes and an AC voltage of 10 mV with frequency ranging from 100,000 Hz to 1 Hz or a narrower frequency range. The resulting Nyquist plot is shown in FIG. 1. Impedance values are normalized to the disk area by multiplying the impedance value by the area (units of kiloohms times centimeter-squared). The value used for conductivity calculation is the value of $Z_{real}$ (normalized real impedance) where $Z_{imaginary}$ (normalized imaginary impedance) is at a minimum.

Example 3

Fabrication of Half Cells for Carbon Fiber Electrodes with Ionic Liquid and Metal Salt Electrolyte All materials and assembly occured in a dry glove box filled with argon or helium gas. "1K" Plain Weave Carbon Fiber fabric (FIBRE GLAST Developments Corporation) was punched or cut into a disk ranging in diameter from 6 mm to 16 mm. Other carbon fiber fabrics such as the following can be used: 3K Plain Weave Carbon Fiber, 3K Twill Weave Carbon Fiber, 12K Carbon Fiber, knitted carbon fabric, or nonwoven carbon fabric. And, carbon fiber material such as the following can be used and woven into the desired weave: TORAY T300, TORAY M46J, TORAY T800.

The liquid electrolyte can be the liquid monomer mixture of Example 1.

The carbon fiber disk was placed into the cup of a 2032-type coin cell. A separator disk ranging in diameter from 8 mm to 17 mm can be placed on top of this. The diameter of the separator disk is larger than the diameter of the carbon fiber disk. The separator was made of glass microfiber filters (WHATMAN GF/D filters) but can also be made of any fiberglass fabric, glass microfiber, or microporous polyolefin sheets. 8-10 drops of the liquid electrolyte solution were deposited onto the separator using a plastic transfer pipet (cyedropper). A disk of lithium metal, measuring 6-16 mm in diameter, was placed on top of the separator. A stainless steel disk of roughly the same diameter was placed on top of the lithium disk. The remaining three components of the coin cell fixture (wave spring, gasket, and cap) were put into place, and the coin cell was crimped with a coin cell crimper.

Figure 5:
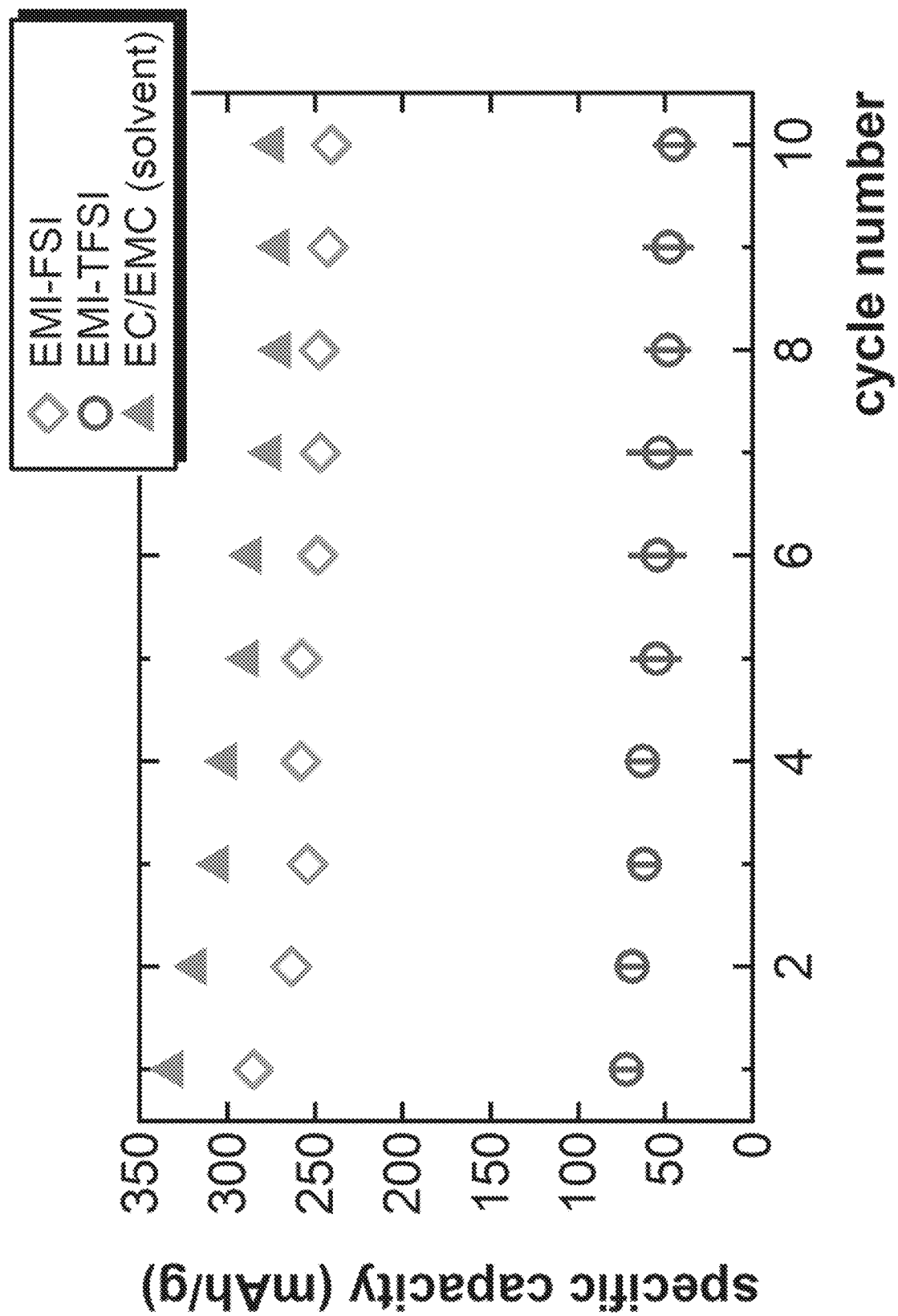
FIG. 5 is a graph showing the specific delithiation capacity during galvanostatic cycling of a carbon fiber electrode ("1K" plain weave carbon fiber fabric) versus a lithium counter-electrode with 3 liquid electrolytes: EMI-FSI (21 wt % LiFSI in 79 wt % 1-ethyl-3-methylimidazolium bis(fluorosulfonyl) imide), EMI-TFSI (19 wt % LiTFSI in 81 wt % 1-ethyl-3-methylimidazolium bis(trifluoromethanesulfonyl) imide), and EC/EMC (1 mole per liter of lithium hexafluorophosphate in a mixture of ethylene carbonate and ethyl methyl carbonate) in coin cells. Specific delithiation capacity is relative to the mass of carbon fiber. The cycling current was 10 milliamps per gram of carbon fiber with an upper voltage limit of 1.5 V and a lower voltage limit of 0.1 V.

FIG. 5 shows the specific delithiation capacity during galvanostatic cycling of a carbon fiber anode ("1K" plain weave carbon fiber fabric) versus a lithium metal cathode with 3 liquid electrolytes: EMI-FSI (21 wt % LiTFSI in 79 wt % 1-ethyl-3-methylimidazolium bis(fluorosulfonyl)imide), EMI-TFSI (19 wt % LiTFSI in 79 wt % 1-ethyl-3-methylimidazolium bis(trifluoromethanesulfonyl)imide), and EC/EMC (1 mole per liter of lithium hexafluorophosphate in a mixture of ethylene carbonate and ethyl methyl carbonate) in coin cells. Specific delithiation capacity is relative to the mass of carbon fiber. The cycling current was 10 milliamps per gram of carbon fiber with an upper voltage limit of 1.5 V and a lower voltage limit of 0.1 V. The carbon fiber electrodes in EC/EMC deliver a higher specific delithiation capacity than the carbon fiber electrodes in EMI-FSI or EMI-TFSI.

Example 4

Fabrication of Full Cells for Carbon Fiber Anode with Liquid Monomer Mixture

All materials and assembly occurred in a dry glove box filled with argon or helium gas. For the positive electrode, a sheet (or "tape") containing battery-grade carbon powder, carbon black, or acetylene black, and binder (for example KYNAR FLEX 2801) was punched into a disk ranging in diameter from 6 mm to 16 mm. The battery-grade carbon powder was, for example, mesoporous carbon microbeads or coated spherical graphite. Alternatively, a sheet of carbon fiber fabric can be used.

For the negative electrode (anode), a sheet of carbon fiber fabric was punched or cut into a disk roughly the same diameter as the positive electrode (cathode). Alternatively, a sheet (or "tape") containing battery-grade carbon powder, carbon black or acetylene black, and binder can be used.

The liquid electrolytes can be a mixture of ionic liquid and metal salt.

The positive electrode disk was placed into the cup of a 2032-type coin cell. A separator disk ranging in diameter from 8 mm to 17 mm was placed on top of this. The diameter of the separator disk was larger than that of the carbon disks. The separator was made of glass microfiber filters (WHATMAN GF/D filters) but can also be made of any fiberglass fabric, glass microfiber, or microporous polyolefin sheets. 8-10 drops of the liquid electrolyte solution were deposited onto the separator using a plastic transfer pipet (eyedropper). The negative electrode disk was placed on top of the separator. A stainless steel disk of roughly the same diameter was placed on top of the negative electrode disk. The remaining three components of the coin cell fixture (wave spring, gasket, and cap) were put into place, and the coin cell was crimped with a coin cell crimper.

Figure 6:
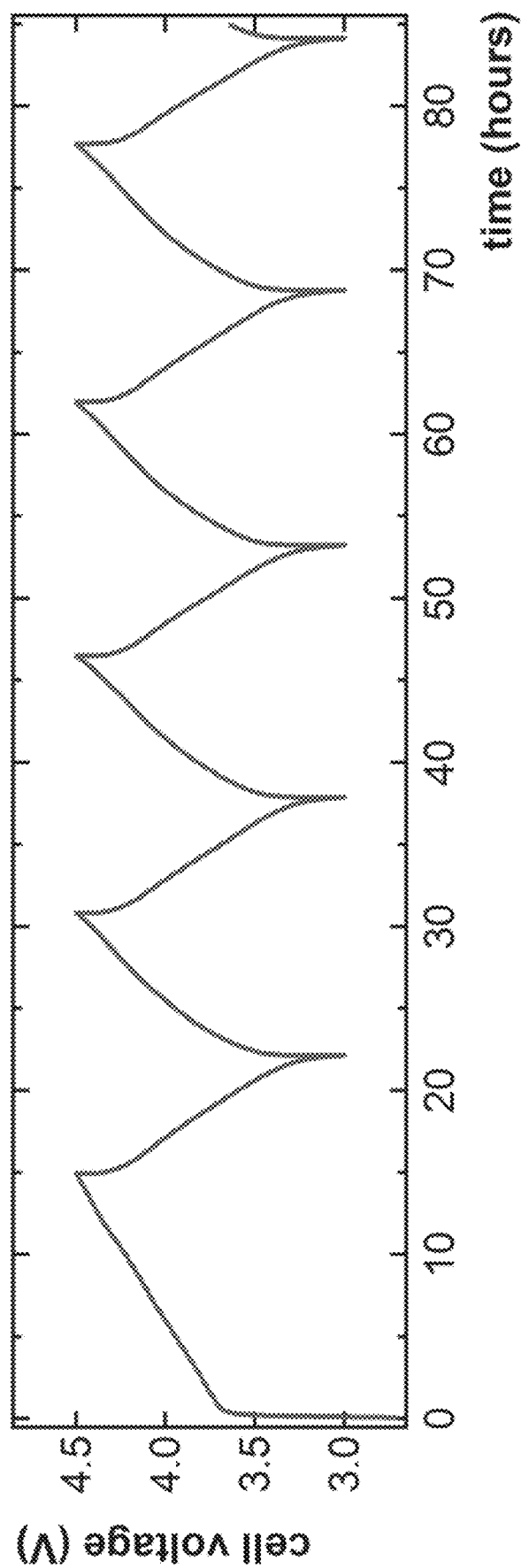
FIG. 6 shows a voltage profile during galvanostatic cycling of a dual-carbon battery chemistry in a coin cell with a liquid electrolyte (19 wt % LiTFSI and 81 wt % 1-ethyl-3-methylimidazolium bis(trifluoromethanesulfonyl)imide). The positive electrode is graphite and the negative electrode is carbon fiber ("1K" plain weave carbon fiber fabric). The cycling current was 10 milliamps per gram of carbon fiber with an upper voltage limit of 4.5 V and a lower voltage limit of 3.0 V.

FIG. 6 shows the voltage profile during galvanostatic cycling of dual-carbon battery chemistry in a coin cell with a liquid electrolyte (21 wt % LiTFSI and 79 wt % 1-ethyl-3-methylimidazolium bis(trifluoromethanesulfonyl)imide). The positive electrode (cathode) is graphite and the negative electrode (anode) is carbon fiber ("1K" plain weave carbon fiber fabric). The cycling current was 10 milliamps per gram of carbon fiber with an upper voltage limit of 4.5 V and a lower voltage limit of 3.0 V.

Figure 7:
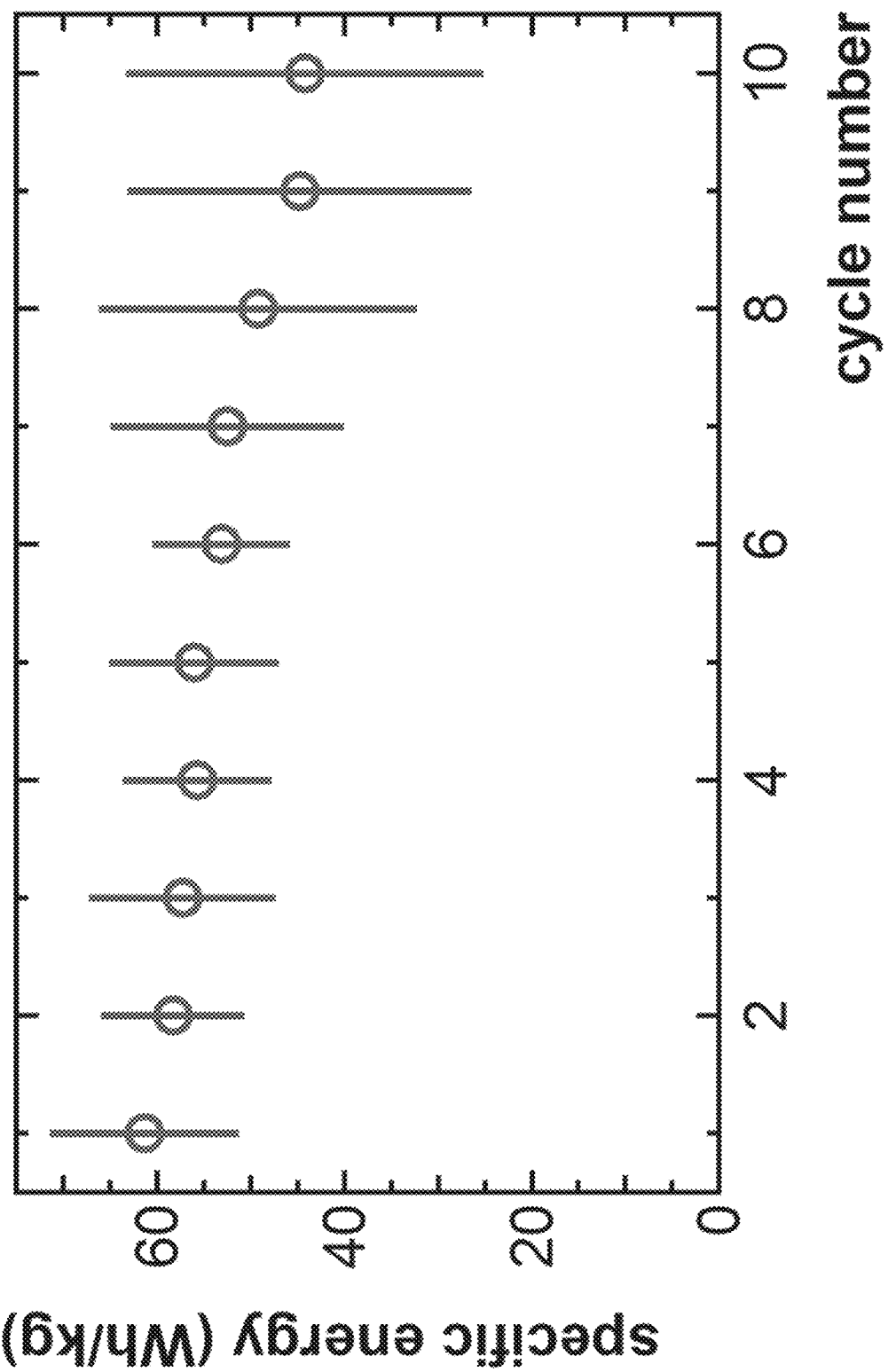
FIG. 7 is a graph of specific energy during galvanostatic cycling of a dual-carbon battery chemistry in a coin cell with a liquid electrolyte (19 wt % LiTFSI and 81 wt % 1-ethyl-3-methylimidazolium bis(trifluoromethanesulfonyl)imide). The positive electrode is graphite and the negative electrode is carbon fiber ("1K" plain weave carbon fiber fabric). The cycling current was 10 milliamps per gram of carbon fiber with an upper voltage limit of 4.5 V and a lower voltage limit of 3.0 V.
Figure 8:
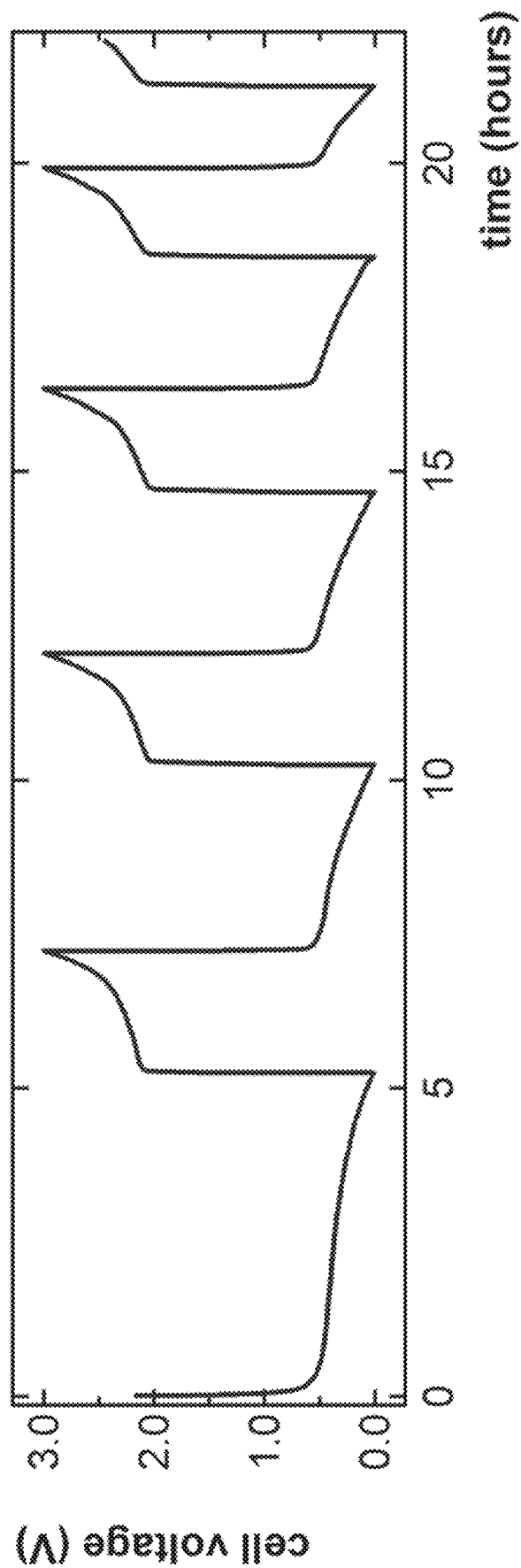
FIG. 8 is a voltage profile during galvanostatic cycling of a carbon fiber electrode ("1K" plain weave carbon fiber fabric) versus a lithium counter-electrode with a gel electrolyte (17 wt % LiTFSI, 49 wt % 1-ethyl-3-methylimidazolium bis(trifluoromethanesulfonyl) imide, 8.7 wt % tetraethylene glycol methacrylate, and 25 wt % methoxy polyethylene glycol (550) monoacrylate) in a coin cell. The cycling current was 10 milliamps per gram of carbon fiber with an upper voltage limit of 3.0 V and a lower voltage limit of 0.1 V.
Figure 9:
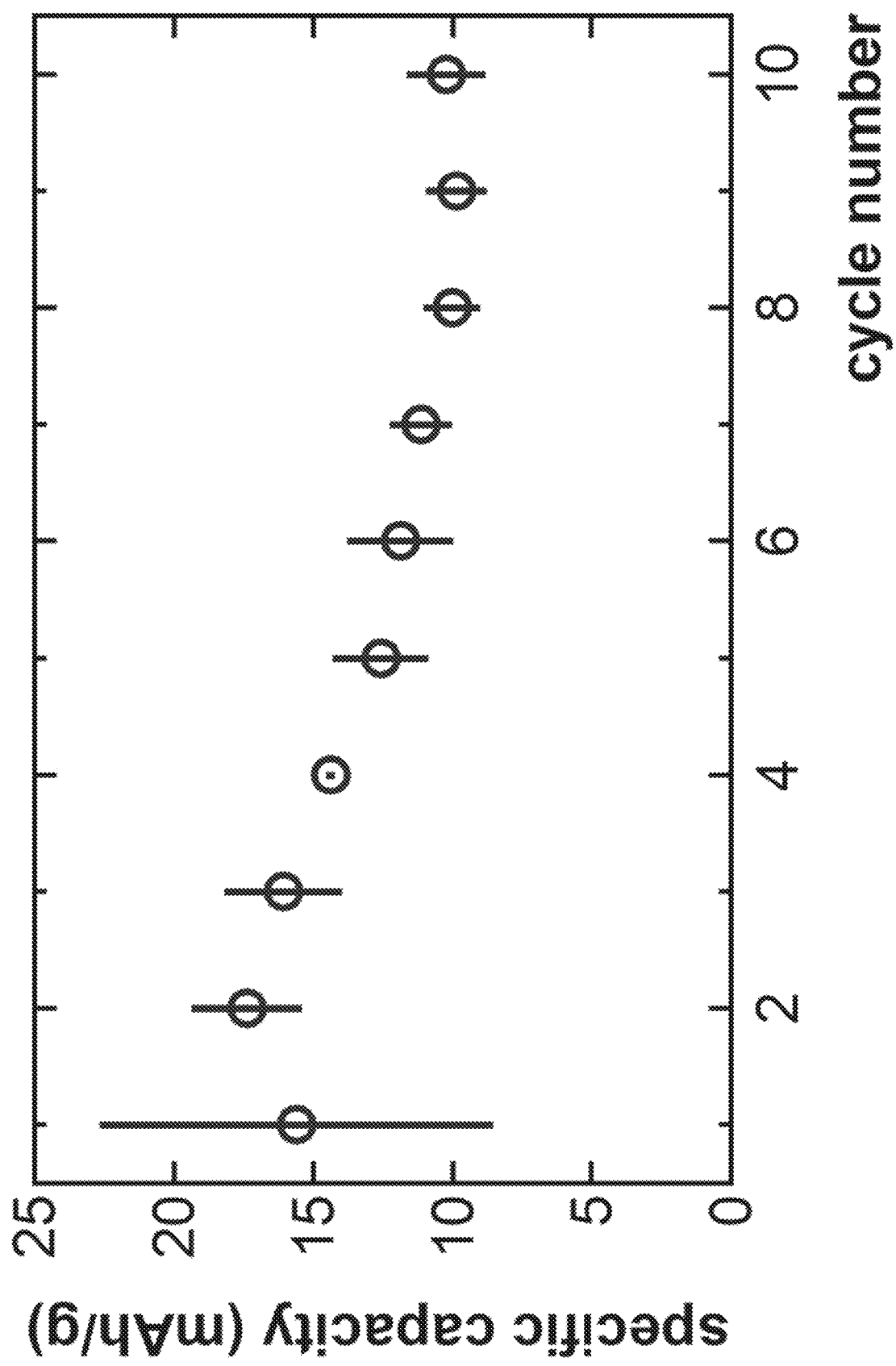
FIG. 9 is a graph showing the specific delithiation capacity during galvanostatic cycling of a carbon fiber electrode ("1K" plain weave carbon fiber fabric) versus a lithium counter-electrode with a gel electrolyte (17 wt % LiTFSI, 49 wt % 1-ethyl-3-methylimidazolium bis(trifluoromethanesulfonyl)imide, 8.7 wt % tetraethylene glycol methacrylate, and 25 wt % methoxy polyethylene glycol (550) monoacrylate) in a coin cell. The cycling current was 10 milliamps per gram of carbon fiber with an upper voltage limit of 3.0 V and a lower voltage limit of 0.1 V.

FIG. 7 shows the specific energy during galvanostatic cycling of a dual-carbon battery chemistry in a coin cell with a liquid electrolyte (21 wt % LiTFSI and 79 wt % 1-ethyl-3-methylimidazolium bis(trifluoromethanesulfonyl)imide). The positive electrode (cathode) is graphite and the negative electrode (anode) is carbon fiber ("1K" plain weave carbon fiber fabric). The cycling current was 10 milliamps per gram of carbon fiber with an upper voltage limit of 4.5 V and a lower voltage limit of 3.0 V. The specific energy is measured relative to the mass of the electrodes.

Example 5

Fabrication of Cells for Carbon Fiber Electrodes with Gel Polymer Electrolyte

The carbon electrode material of interest can be punched or cut into a disk ranging in diameter from 6 mm to 16 mm. The carbon material can consist of any carbon fiber material and/or fabric as described above. Alternatively, the carbon material can be a sheet (or "tape") containing battery-grade carbon powder, carbon black, or acetylene black, and binder (for example KYNAR FLEX 2801). The battery-grade carbon powder can be, for example, mesoporous carbon microbeads or coated spherical graphite. Alternatively, the carbon material can be a sheet of battery-grade carbon powder coated onto a metal foil.

The carbon electrode disk can be placed on a polytetrafluoroethylene (PTFE) sheet, which can be placed on a flat piece of heat-resistant glass. The PTFE sheet and heat-resistant glass can be large enough to provide a minimum 1-inch border around the carbon disk on all sides. Multiple disks can be placed on a single PTFE sheet and glass, and the multiple disks can be placed at least 0.5 inches apart from one another. A separator disk ranging in diameter from 8 mm to 17 mm can be placed on top of this to completely cover it. The diameter of the separator disk can be larger than that of the carbon disk. The separator can be made of fiberglass fabric but can also be made of glass microfiber filters (WHATMAN GF/D filters), glass microfiber, or microporous polyolefin sheets. The liquid monomer mixture can be the liquid monomer mixture of Example 1. The liquid mixture of monomer(s), metal salt, ionic liquid, and polymer initiator can be spread out or poured over the stacked carbon and separator layers. Generally, 25-50 milligrams of the liquid mixture are required per square-cm of separator sheet. Another PTFE sheet can be placed on top of the assembly, and another glass plate can be placed on top of the PTFE. Weights can be placed on top of this entire assembly to keep the layers flat. The plates and materials can be placed in an oven and heated to form the gel polymer electrolyte.

The cured electrode-separator-electrolyte assembly can be removed from the PTFE sheets and glass plates. Extra electrolyte around the edges can be trimmed. The assembly can be placed in an oven and heated again at 120° C. for at least one hour, then immediately moved into a dry glove box filled with helium or argon gas. The assembly can be placed into the cup of a 2032-type coin cell with the electrode side down. A disk of lithium metal, roughly the same diameter as the carbon electrode, can be placed on top of the separator. A stainless steel disk of roughly the same diameter can be placed on top of the lithium disk. The remaining three components of the coin cell fixture (wave spring, gasket, and cap) can be put into place, and the coin cell can be crimped with a coin cell crimper.

Example 6

Fabrication of Full Textile Battery Cells with Gel Polymer Electrolyte

For the positive electrode, a sheet (or "tape") containing battery-grade carbon powder, carbon black, or acetylene black, and binder (for example KYNAR FLEX 2801) can be punched into a disk ranging in diameter from 6 mm to 16 mm. The battery-grade carbon powder can be, for example, mesoporous carbon microbeads or coated spherical graphite. Alternatively, a sheet of carbon fiber fabric can be used. Any combination of the carbon fiber, carbon powder, carbon black, or acetylene black, and binder can be used.

For the negative electrode, a sheet of carbon fiber fabric can be punched or cut into a disk roughly the same diameter as the positive electrode. Alternatively, a sheet (or "tape") containing battery-grade carbon powder, carbon black, or acetylene black, and binder can be used. Any combination of the carbon fiber, carbon powder, carbon black, or acetylene black, and binder can be used.

For the separator, a disk ranging in diameter from 8 mm to 17 mm can be used. The diameter of the separator disk is larger than that of the electrode disks by at least 1 mm. The separator can be made of fiberglass fabric but can also be made of glass microfiber filters (WHATMAN GF/D filters), glass microfiber, or microporous polyolefin sheets.

The positive electrode disk can be placed on a polytetrafluoroethylene (PTFE) sheet, which can be placed on a flat piece of heat-resistant glass. The PTFE sheet and heat-resistant glass are large enough to provide a minimum 1-inch border around the carbon disk on all sides. Multiple disks can be placed on a single PTFE sheet and glass, and the multiple disks should be placed at least 0.5 inches apart from one another. A separator disk ranging in diameter from 8 mm to 17 mm can be placed on top of this to completely cover it. The diameter of the separator disk is larger than that of the carbon disk. The separator can be made of fiberglass fabric but can also be made of glass microfiber filters (WHATMAN GF/D filters), glass microfiber, or microporous polyolefin sheets. The liquid monomer mixture of Example 1 can be used. The liquid mixture of monomer(s), metal salt, ionic liquid, and polymer initiator can be spread out or poured over the stacked carbon and separator layers. Generally, 25-50 milligrams of the liquid mixture are required per square centimeter of separator sheet. The negative electrode disk can be placed in a concentric way on top of the wetted separator disk. Another PTFE sheet can be placed on top of the assembly, and another glass plate can be placed on top of the PTFE. Weights can be placed on top of this entire assembly to keep the layers flat. The plates and materials can be placed in an oven and heated to form the polymerized solid electrolyte.

Figure 10:
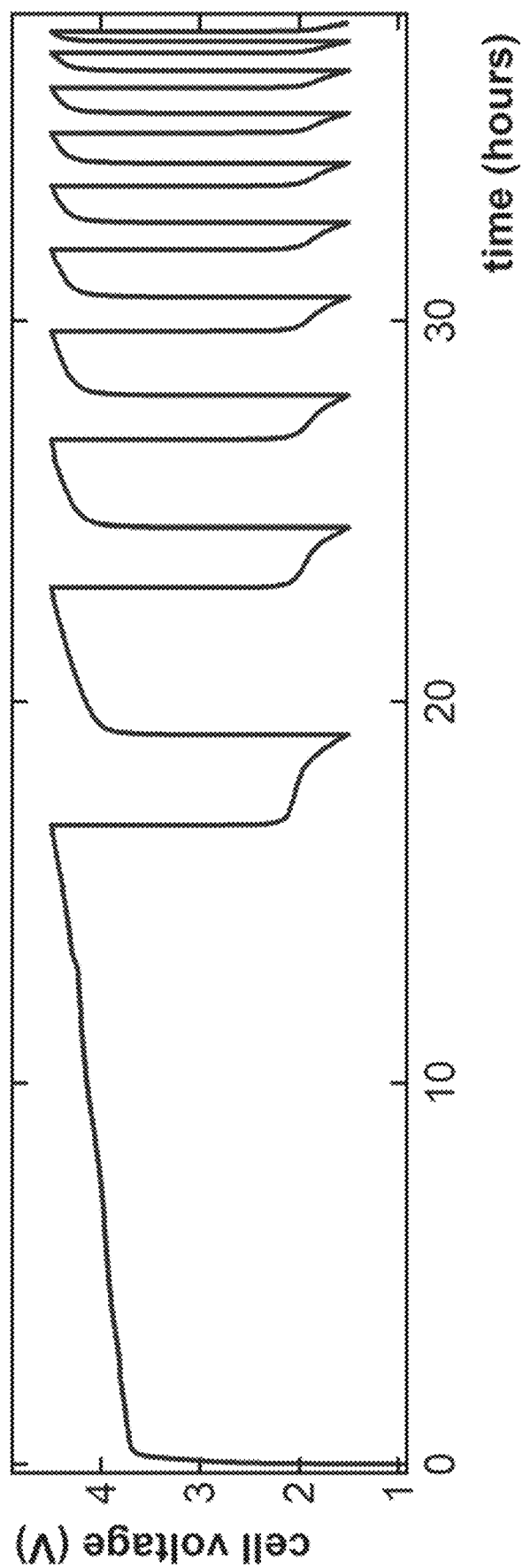
FIG. 10 is a voltage profile during galvanostatic cycling of a dual-carbon battery with a gel electrolyte (17 wt % LiTFSI, 40 wt % 1-ethyl-3-methylimidazolium bis(trifluoromethanesulfonyl) imide, 8.8 wt % tetraethylene glycol methacrylate, and 34 wt % methoxy polyethylene glycol (550) monoacrylate) in a coin cell. The positive electrode was graphite and the negative electrode was carbon fiber ("1K" plain weave carbon fiber fabric). The cycling current was 140 microamps per square centimeter of electrode area with an upper voltage limit of 4.5 V and a lower voltage limit of 1.5 V.
Figure 11:
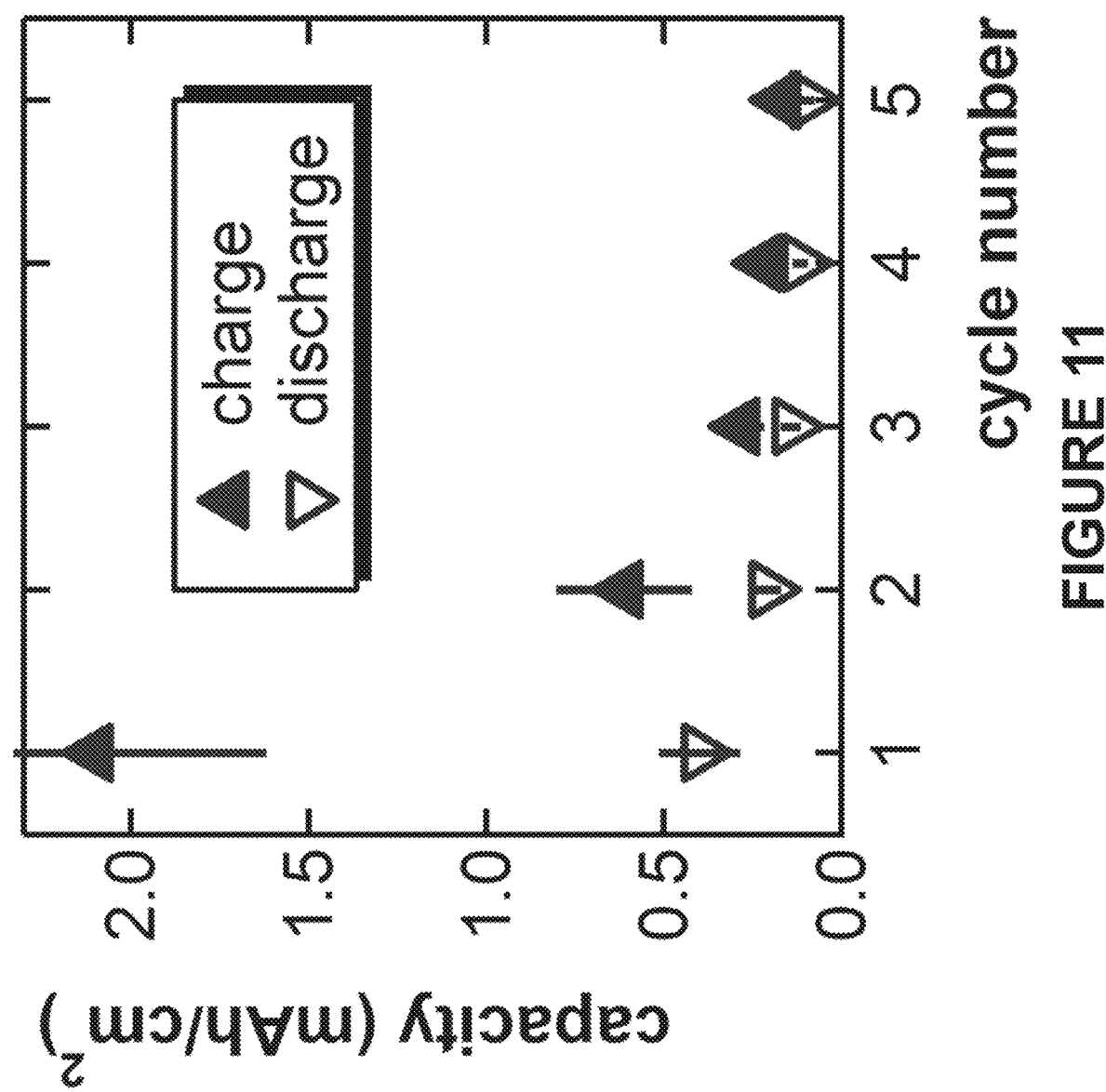
FIG. 11 is a graph showing the area-specific capacity during galvanostatic cycling of a dual-carbon battery with an electrolyte (17 wt % LiTFSI, 40 wt % 1-ethyl-3-methylimidazolium bis(trifluoromethanesulfonyl)imide, 8.8 wt % tetraethylene glycol methacrylate, and 34 wt % methoxy polyethylene glycol (550) monoacrylate) in a coin cell. The positive electrode was graphite and the negative electrode was carbon fiber ("1K" plain weave carbon fiber fabric). The cycling current was 140 microamps per square centimeter of electrode area with an upper voltage limit of 4.5 V and a lower voltage limit of 1.5 V. Marker and error bars are the average and standard deviation, respectively, of measurements from five replicate cells.
Figure 12:
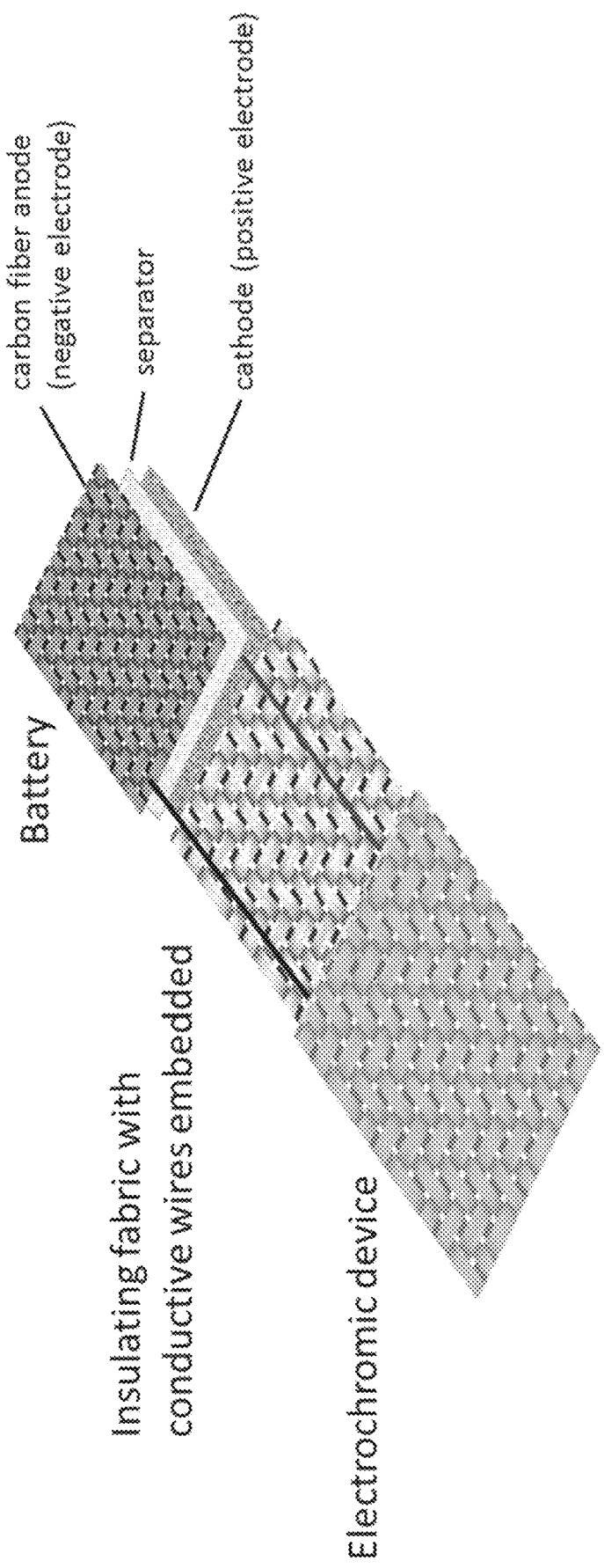
FIG. 12 is a depiction of a multilayer electrochemical cell (battery) attached by wires to an electrochromic fabric device. The electrochromic fabric can change color when the battery supplies power. In the depiction, the positive and negative terminals of the battery are connected to the positive and negative terminals of the electrochromic fabric device by wires embedded in a connecting piece of fabric. The electrochromic device and battery could be integrated onto a single piece of fabric, or one of them could be detachable (e.g., detach the battery to recharge it). This could be used for a wearable application (e.g., smart apparel) or a non-wearable application (e.g., a flexible display or a device on a fabric tent).
Figure 13:
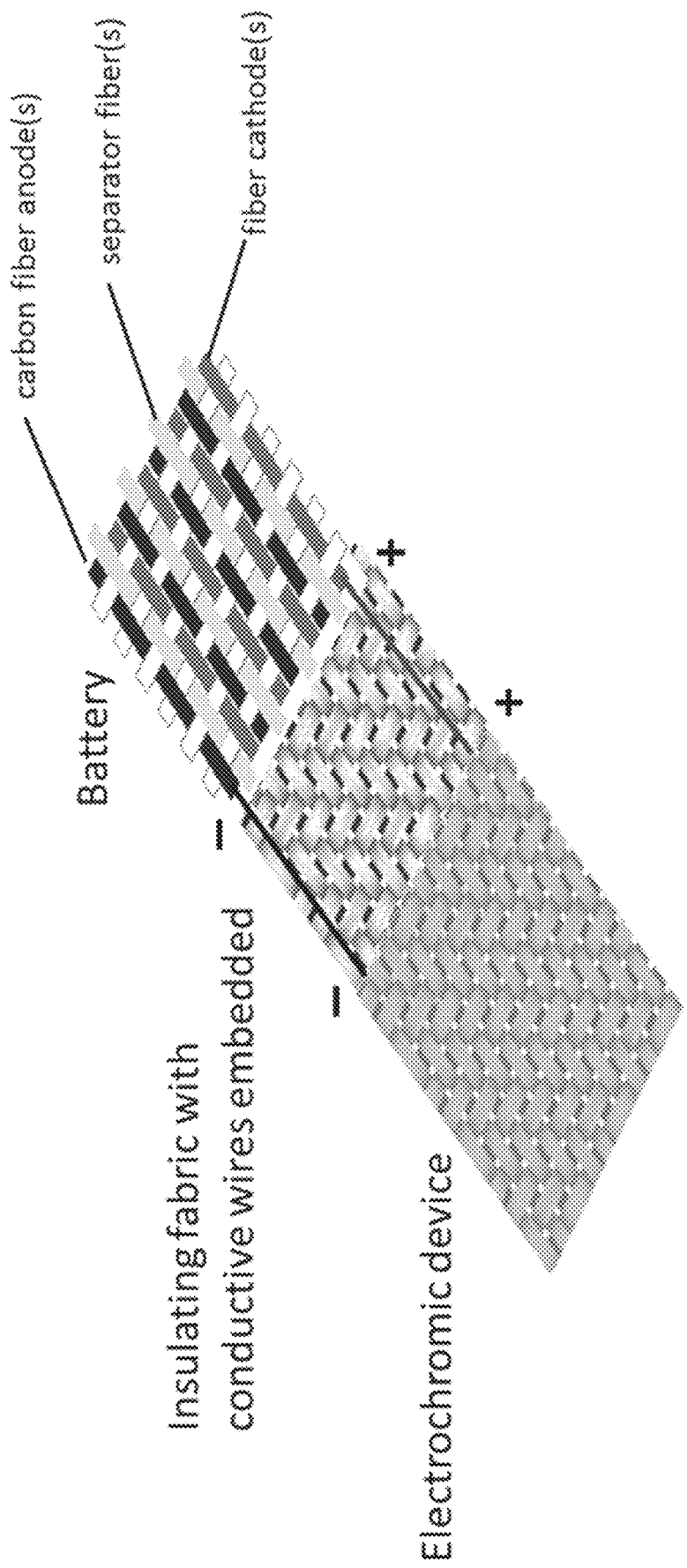
FIG. 13 is a depiction of a single-layer electrochemical cell (battery) connected by wires to an electrochromic fabric device. The electrochromic fabric can change color when the battery supplies power. In the depiction, the positive and negative terminals of the battery are connected to the positive and negative terminals of the electrochromic fabric device by wires embedded in a connecting piece of fabric. The electrochromic device and battery could be integrated onto a single piece of fabric, or one of them could be detachable (e.g., detach the battery to recharge it). This could be used for a wearable application (e.g., smart apparel) or a non-wearable application (e.g., a flexible display or a device on a fabric tent).

The cured electrode-separator-electrolyte assembly can be removed from the PTFE sheets and glass plates. Extra electrolyte around the edges can be trimmed. The assembly can be placed in an oven and heated again at 120° C. for at least one hour, then immediately moved into a dry glove box filled with helium or argon gas. The assembly can be placed into the cup of a 2032-type coin cell with the positive electrode side down. A stainless steel disk of roughly the same diameter as the negative electrode can be placed on top of the negative electrode disk. The remaining three components of the coin cell fixture (wave spring, gasket, and cap) can be put into place, and the coin cell can be crimped with a coin cell crimper. Results of testing are shown in FIGS. 10 and 11.

Alternatively, the textile battery assembly can be prepared using rectangular sheets or sheets of any size or shape. The separator sheet must always be larger than the electrode sheets by at least 1 mm in each dimension. Since the coin cell hardware is not used in this case, metallic battery tabs made of aluminum, copper, or nickel must also be incorporated into the assembly to allow electrical connection with the cell. An example is a 4 mm-width aluminum tab with adhesive polymer tape from MTI Corporation, but any similar battery tab can be used. Aluminum can be used for the positive electrode (cathode) and copper or nickel can be used for the negative electrode (anode). Adhesive KAPTON tape can be placed on both sides of the tab except for a minimum 1-cm length at the end of the tab (this tape will be removed from the final product and is used to prevent the epoxy from sticking to the tab). Each tab can be inserted between the corresponding electrode layer and separator layer so that the two tabs do not come into contact with each other. The tab can be inserted with at least one centimeter length of the tab in contact with the electrode sheet. The exposed part of the tab that is not between the carbon sheets should all be covered with KAPTON tape. Following the curing of the liquid monomer mixture, the KAPTON tape can be removed from the tabs and the gel polymer electrolyte can be trimmed from the edges. Instead of being sealed in a coin cell, this type of textile battery should be sealed by other means such as in a laminated aluminum film pouch. Alternately, an impermeable coating or sealant can be used.

Example 7

Testing of Textile Battery Cells with Gel Polymer Electrolyte

The coin cells (half cells or full cells) and other types of battery cells can be tested with a galvanostat or battery cycler. Galvanostatic cycling can be performed on the cells at a current density of 0.1 to 1.0 milliamps per square centimeter of electrode area. The battery is charged and discharged in this manner with an upper voltage limit and for at least 10 cycles. The resulting capacity and voltage values can be used to calculate specific capacity, specific energy, and coulombic efficiency over multiple cycles.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:
1. An electrochemical cell, comprising:
(a) a positive electrode;
(b) a negative electrode; and
(c) an electrolyte between and/or infiltrating the (a) positive electrode and (b) the negative electrode comprising:
(i) at least one metal salt; and
(ii) at least one ionic liquid;
wherein at least one electrode comprises woven carbon fiber, wherein the diameter of the carbon fiber is between about 2 µm and about 22 µm, and wherein the electrochemical cell is integrated into a fabric.

2. The electrochemical cell of claim 1, wherein the electrolyte further comprises:
(iii) at least one polymerized monomer.

3. The electrochemical cell of claim 1, wherein the at least one metal salt comprises an anion selected from the group consisting of bis(trifluoromethane sulfonyl)imide ($TFSI^-$), trifluoromethane sulfonate ($TF^-$), bis(fluorosulfonyl) imide ($FSI^-$), tetrafluorophosphate ($BF_4^-$), hexafluorophosphate ($PF_6^-$), bis(pentafluoroethane sulfonyl)imide ($BETI^-$), 4,5-dicyano-2-trifluoromethanoimidazole ($DCMI^-$), [fluoro (nonafluorobutane) sulfonyl]imide ($FNF^-$), perchlorate ($ClO_4^-$), sulfate ($SO_4^-$), and nitrate ($NO_3^-$).

4. The electrochemical cell of claim 1, wherein the at least one metal salt comprises a metal ion selected from the group consisting of $Li^+$, $Na^+$, $K^+$, $Mg^{2+}$, and $Al^{3+}$.

5. The electrochemical cell of claim 1, wherein the at least one metal salt is selected from the group consisting of LiTFSI, LiTF, NaTFSI, NaFSI, KTFSI, KBETI, and $Mg(TFSI)_2$.

6. The electrochemical cell of claim 1, wherein the at least one ionic liquid comprises a cation selected from the group consisting of imidazolium, pyrrolidinium, pyridinium, phosphonium, ammonium, and sulfonium.

7. The electrochemical cell of claim 1, wherein the ionic liquid comprises an anion selected from the group consisting of tosylate ($-SO_2C_6H_4CH_3$), methanesulfonate ($-OSO_2CH_3$), bis(trifluoromethylsulfonyl) imide ($TFSI^-$), tetrafluorophosphate ($BF_4^-$), hexafluorophosphate ($PF_6^-$), halide, triflate ($TF^-$), [fluoro (nonafluorobutane) sulfonyl] imide ($FNF^-$), chlorate ($ClO_4^-$), and sulfate ($SO_4^-$).

8. The electrochemical cell of claim 1, wherein the at least one ionic liquid comprises 1-ethyl-3-methylimidazolium bis(trifluoromethanesulfonyl)imide or 1-ethyl-3-methylimidazolium bis(fluorosulfonyl) imide.

9. The electrochemical cell of claim 2, wherein the at least one polymerized monomer is a polymerized acrylic monomer or a polymerized epoxide monomer.

10. The electrochemical cell of claim 2, wherein the weight averaged molecular weight of the at least one monomer before polymerizing is between about 50 g/mol and about 10,000 g/mol.

11. The electrochemical cell of claim 2, wherein the electrolyte further comprises:
(iv) at least one polymer initiator.

12. The electrochemical cell of claim 11, wherein the polymer initiator is a thermal initiator selected from the group consisting of tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy) butane, 1,1-bis(tert-butylperoxy) cyclohexane, 2,5-bi (tert-butylperoxy)-2,5-dimethylhexane, 2,5-bi (tert-butylperoxy)$_{2,5}$-dimethylhexane, 2,5-bi (tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

13. The electrochemical cell of claim 1, wherein the positive electrode comprises lithium, magnesium, aluminum, zinc, chromium, iron, nickel, tin, lead, copper, silver, palladium, mercury, platinum, gold, a metal alloy, a metal oxide, a phosphate, a sulfide, graphite, carbon fiber, carbon powder, carbon black, acetylene black, or a combination thereof.

14. The electrochemical cell of claim 1, wherein the positive electrode comprises graphite.

15. The electrochemical cell of claim 1, wherein the negative electrode comprises lithium, magnesium, aluminum, zinc, chromium, iron, nickel, tin, lead, copper, silver, palladium, mercury, platinum, gold, a metal alloy, a metal oxide, silicon, graphite, carbon fiber, carbon powder, carbon black, acetylene black, or a combination thereof.

16. The electrochemical cell of claim 1, wherein the negative electrode comprises woven carbon fiber.

17. The electrochemical cell of claim 1, further comprising:
(d) a separator between (a) the positive electrode and (b) the negative electrode.

18. The electrochemical cell of claim 17, wherein the separator comprises cotton, a synthetic fiber, linen, a polymer fiber, a fiberglass fiber, a microporous polymer material, or a combination thereof.

19. The electrochemical cell of claim 1, wherein the positive electrode comprises graphite, the negative electrode comprises woven carbon fiber, and the electrolyte comprises the metal salt LiTFSI, the ionic liquid 1-ethyl-3-methylimidazolium bis(trifluoromethanesulfonyl)imide, and the monomer tetraethylene glycol dimethacrylate.

20. The electrochemical cell of claim 1, wherein the positive electrode comprises graphite, the negative electrode comprises woven carbon fiber, and the electrolyte comprises the metal salt LiTFSI, the ionic liquid 1-ethyl-3-methylimidazolium bis(trifluoromethanesulfonyl)imide, the monomer tetraethylene glycol dimethacrylate, and the monomer methoxy polyethylene glycol methacrylate.

* * * * *